United States Patent
Axelrod

(10) Patent No.: US 7,180,524 B1
(45) Date of Patent: Feb. 20, 2007

(54) ARTISTS' COLOR DISPLAY SYSTEM

(76) Inventor: Dale Axelrod, 522 E. "D" St., Petaluma, CA (US) 94952-3212

( * ) Notice: Subject to any disclaimer, the term of this patent is extended or adjusted under 35 U.S.C. 154(b) by 429 days.

(21) Appl. No.: 10/260,159

(22) Filed: Sep. 30, 2002

(51) Int. Cl.
G09G 5/02 (2006.01)

(52) U.S. Cl. ............... 345/593; 345/594; 345/597; 382/165; 382/168; 434/98; 715/810; 715/835

(58) Field of Classification Search ............... 345/589, 345/593, 594, 597; 382/165, 168; 434/98; 715/810, 835
See application file for complete search history.

(56) References Cited

U.S. PATENT DOCUMENTS

| | | |
|---|---|---|
| 173,408 A | 2/1876 | Leggett |
| 824,374 A | 6/1906 | Munsell |
| 918,068 A | 4/1909 | Maratta |
| 1,125,078 A | 1/1915 | Dunn |
| 1,483,529 A | 2/1924 | Tanner |
| 1,529,125 A | 3/1925 | Goodwin |
| 1,617,024 A | 2/1927 | Munsell et al. |
| 1,753,619 A | 4/1930 | Norberg |
| 1,805,520 A | 5/1931 | Grumbacher |
| 2,409,285 A | 10/1946 | Jacobson |
| 2,729,898 A | 1/1956 | Rahr |
| 2,825,150 A | 3/1958 | Steiner |
| 2,866,277 A | 12/1958 | Wise |
| 3,229,385 A | 1/1966 | DePauw |
| 3,384,983 A | 5/1968 | Olson |
| 3,628,260 A | 12/1971 | Jacobson |
| 3,722,109 A | 3/1973 | Jacobson |
| 3,777,414 A | 12/1973 | Robinson |
| 3,815,265 A | 6/1974 | DePauw |
| 3,849,911 A | 11/1974 | Longenecker |
| 5,033,963 A | 7/1991 | Bourges |
| 5,161,974 A | 11/1992 | Bourges |
| 5,174,758 A | 12/1992 | Abramson |
| 5,209,664 A | 5/1993 | Wilcox |
| 5,254,978 A | 10/1993 | Beretta |
| 5,311,212 A | 5/1994 | Beretta |
| 5,546,528 A | 8/1996 | Johnson |
| 5,842,866 A | 12/1998 | Chow |
| 5,859,644 A | 1/1999 | Stokes et al. |

(Continued)

OTHER PUBLICATIONS

Adobe Systems, Inc. (San Jose, CA), *Tabbed Palette Patent FAQS Page*, p. 2.

(Continued)

*Primary Examiner*—Kee M. Tung
*Assistant Examiner*—Antonio Caschera

(57) ABSTRACT

An assortment of color elements is grouped within a plurality of color families which are organized in accordance with a circular color chart (FIG. 10-A) and a columnar chart (FIG. 11-A). Except for the neutral-gray color family, a pair of boundary-hues respectively defines the extent of acceptable hue variation within each group, resulting in an included range of hue within each color family, and an excluded range of hue in between neighboring color families. Variant-hue charts enhance color comparison and selection within each main color family by displaying contrasting variations of all three color attributes, that is, value, saturation, and hue, within a single chart. Variant-hue charts also consolidate color elements into a compact format, and provide a graphical user interface for computer color selection.

8 Claims, 34 Drawing Sheets
(15 of 34 Drawing Sheet(s) Filed in Color)

U.S. PATENT DOCUMENTS

| | | | |
|---|---|---|---|
| 5,860,518 | A | 1/1999 | Axelrod |
| 5,898,436 | A | 4/1999 | Stewart et al. |
| 5,903,255 | A | 5/1999 | Busch et al. |
| 5,909,220 | A * | 6/1999 | Sandow ............... 345/589 |
| 6,226,010 | B1 | 5/2001 | Long |
| 6,234,801 | B1 | 5/2001 | Hsu |
| 6,697,079 | B2 * | 2/2004 | Rose ............... 345/593 |

OTHER PUBLICATIONS

Albers, Josef. *Interaction of Color*, New Haven and London: Yale University Press, 1963, pp. 34-36, 80-81, and plate XIV-1.

Birren, Faber. *History of Color in Painting*, New York: Van Nostrand Reinhold, 1965, pp. 22-29, 56, and 122-123.

Color Aid Corp. (New York, NY). *Color-aid Charts 1 and 2*, 1989.

Color Aid Corp. (New York, NY). *The New Color-aid Booklet*, 1997, p. 8.

Color Aid Corp. (New York, NY). Color Circle (1975), Step-By-Step Graphics. Peoria IL: Dynamic Graphics, Inc., 1991, p. 63.

Dixon Ticonderoga Co. (Heathrow, FL). *Prang Color Wheel*.

German Institute for Quality Assurance & Certification EV. *RAL Design System*, Sankt Augustin, Germany, 1927.

Gerritssen, J. Frans. *Color Cylinder*, Holland, 1976.

Hensche, Henry. *The Art of Seeing and Painting*. Thibodaux, LA: Portier Gorman, 1988: p. 90.

Hope, Augustine and Margaret Walch. *The Color Compendium*. New York: Van Nostrand Reinhold, 1990: pp. 286-295 and 334.

Itten, Johannes. *The Elements of Color*. New York: Van Nostrand Reinhold, 1970: pp. 30-31.

Judd, Deane B. & G. Wyszechki. *Color in Business, Science, & Industry*. New York: John Wiley & Sons, 1963: pp. 223-225.

Jusko, Don. *Real Color Wheel*. 1997.

Kelly, K. L. and D. B. Judd. *Color Names Dictionary*. Washington: National Bureau of Standards, Publication 440, 1976: p. 3.

M. Grumbacher, Inc. (New York, NY). *Color Compass*, 1977: pp. 6 and 10.

Minolta Camera Co., Ltd. (Osaka, Japan). *Precise Color Communication*, 1986: pp. 4-7 and 16-17.

Powell, William. *Color Mixing Recipe Cards*, Laguna Hills CA: Walter Foster Publishing, Inc., 1994, cover, contents page, pp. 1, 6.

Prestype®, Inc. (Carlstadt, NJ), *ChromaRama*, 1983.

Ridgway, Robert. *Color Standards and Nomenclature*. Baltimore, 1912.

Scandanavian Colour Institute AB. *NCS-Natural Color System*, Edition 2. Stockholm, Sweden, 1995.

Sloan, John. *Gist of Art*. New York: Dover, 1977 (Reprint of 1939 edition): pp. 119-121.

Streight, Steven. *Color Communication Systems*, Step-By-Step Graphics. (see Cite No. 40), vol. 7, No. 2, 1991, pp. 168-173.

Tru-Color Systems, Inc. (Danville, IN). *TCS Digital Color Wheel*, 2001.

Varley, Helen, ed. *Colour*. London: Mitchell Beazley Artists House, 1980: p. 84.

Weinman, Lynda. *Coloring Web Graphics*.2. Indianapolis: New Riders, 1997: pp. 26-27.

Welton, Jude. *Impressionism*. New York: Dorling Kindersley, 1993: p. 20.

Bendito, Petronio. RGB3 Project. 2001. Retrieved Mar. 6, 2006 from http://web.ics.purdue.edu/~pbendito/RGB/RGB_Perceptual_System.htm.

* cited by examiner

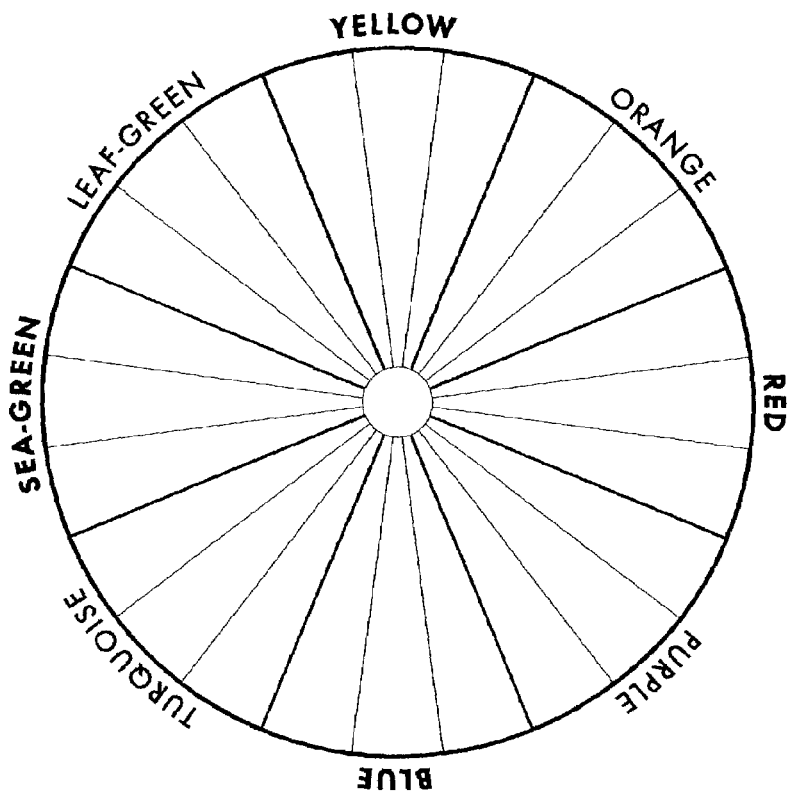
FIG 3-A
(PRIOR ART)
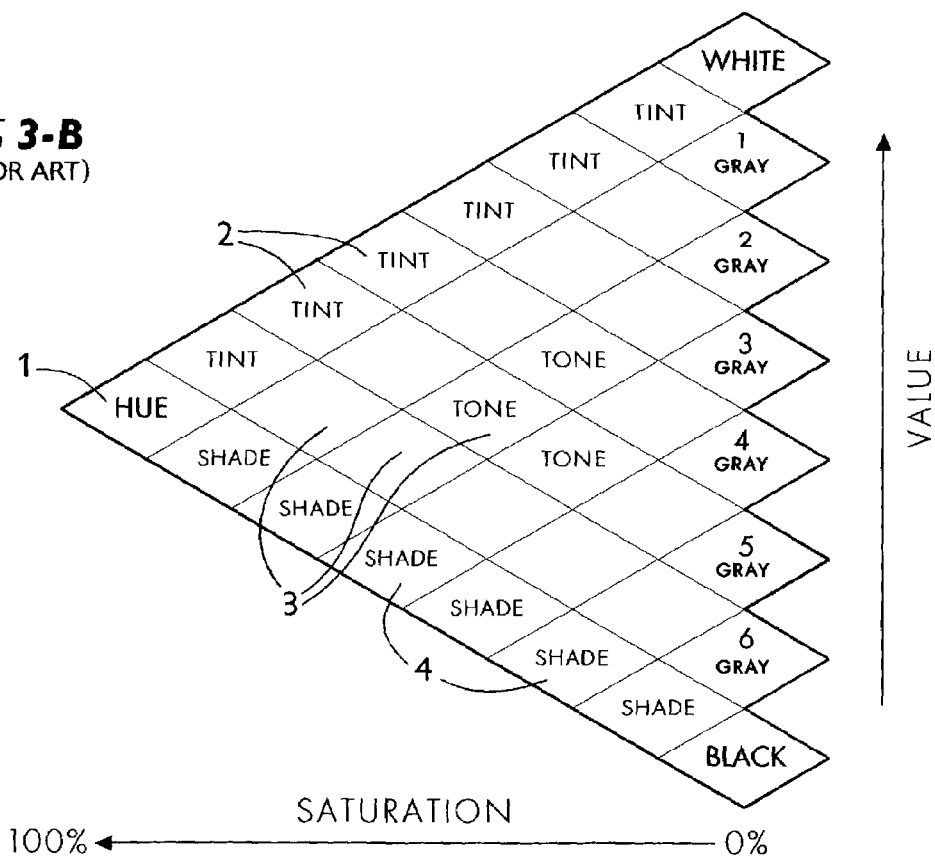
FIG 3-B
(PRIOR ART)

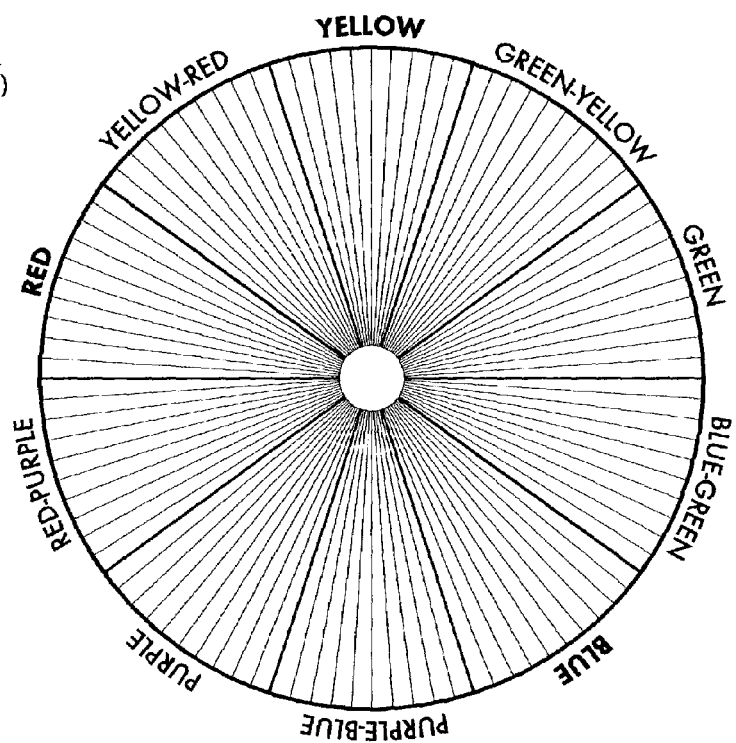
FIG 4-A
(PRIOR ART)
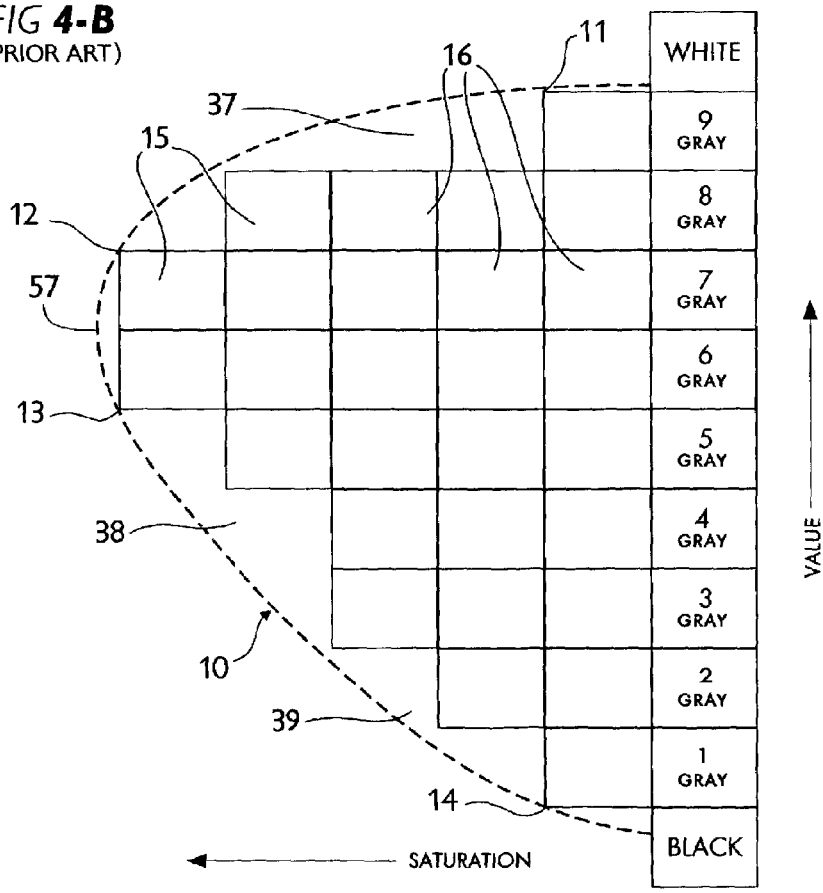
FIG 4-B
(PRIOR ART)

FIG 5-A
(PRIOR ART)
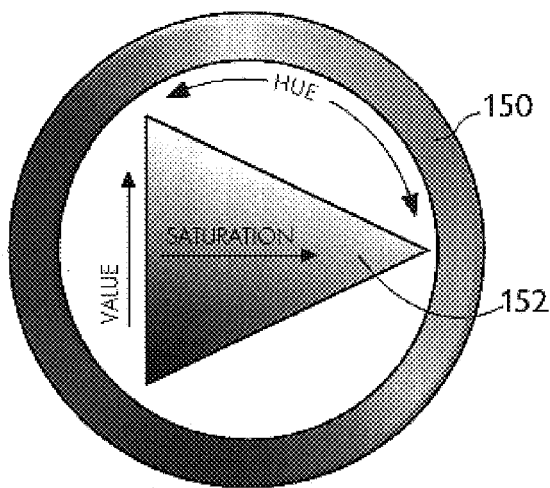
FIG 5-B
(PRIOR ART)
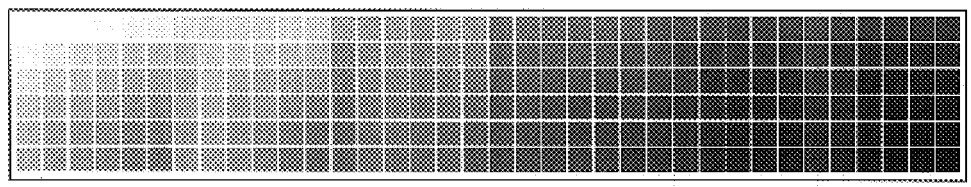
FIG 6
(PRIOR ART)
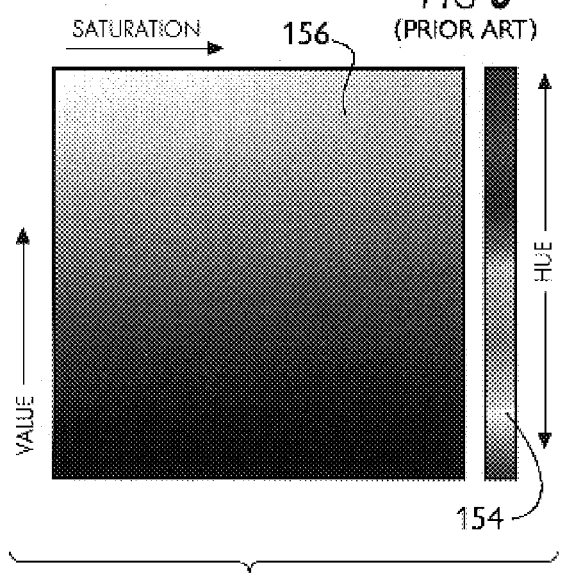
FIG 7
(PRIOR ART)
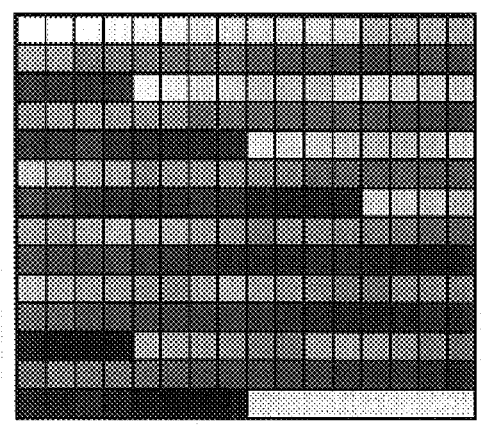

FIG 8-A
(PRIOR ART)
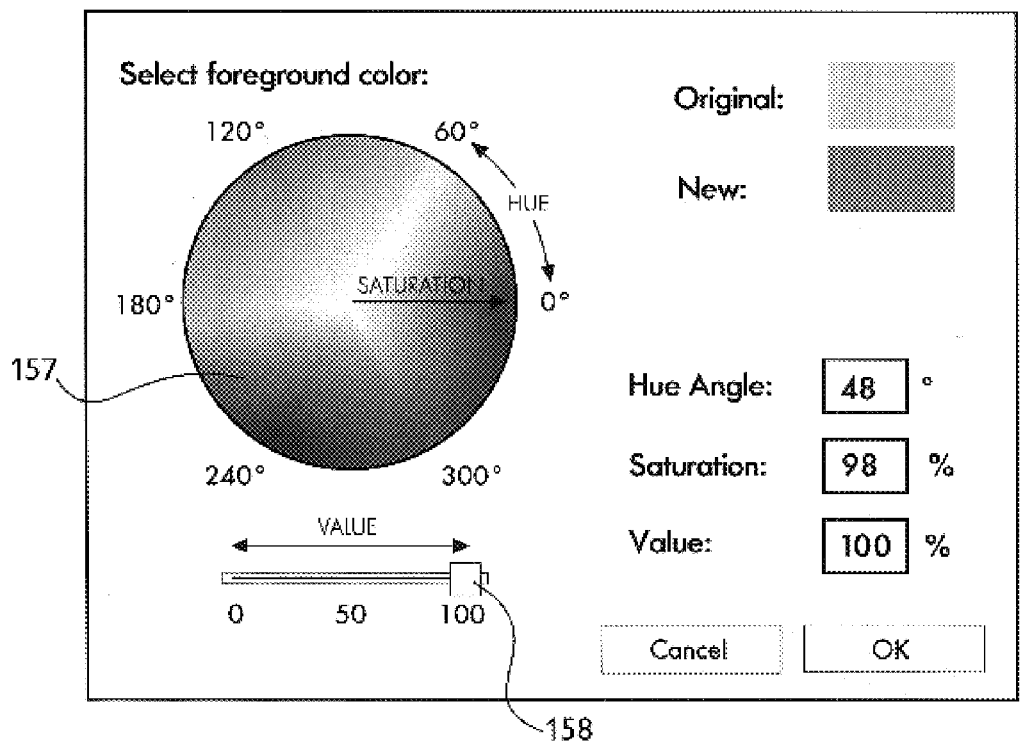
FIG 8-B
(PRIOR ART)
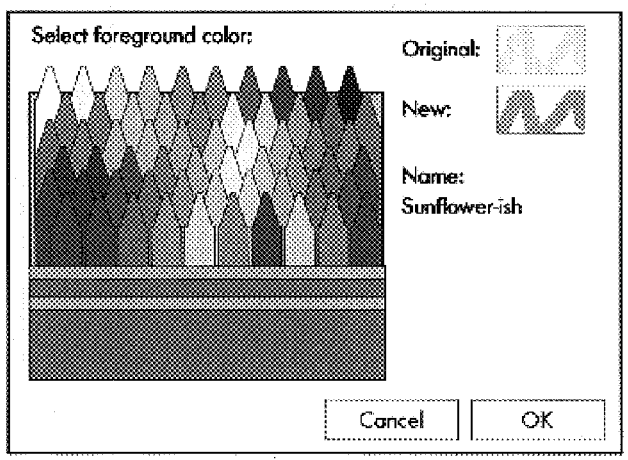
FIG 9
(PRIOR ART)
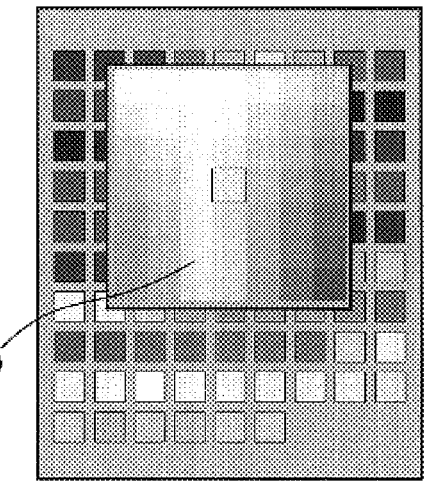

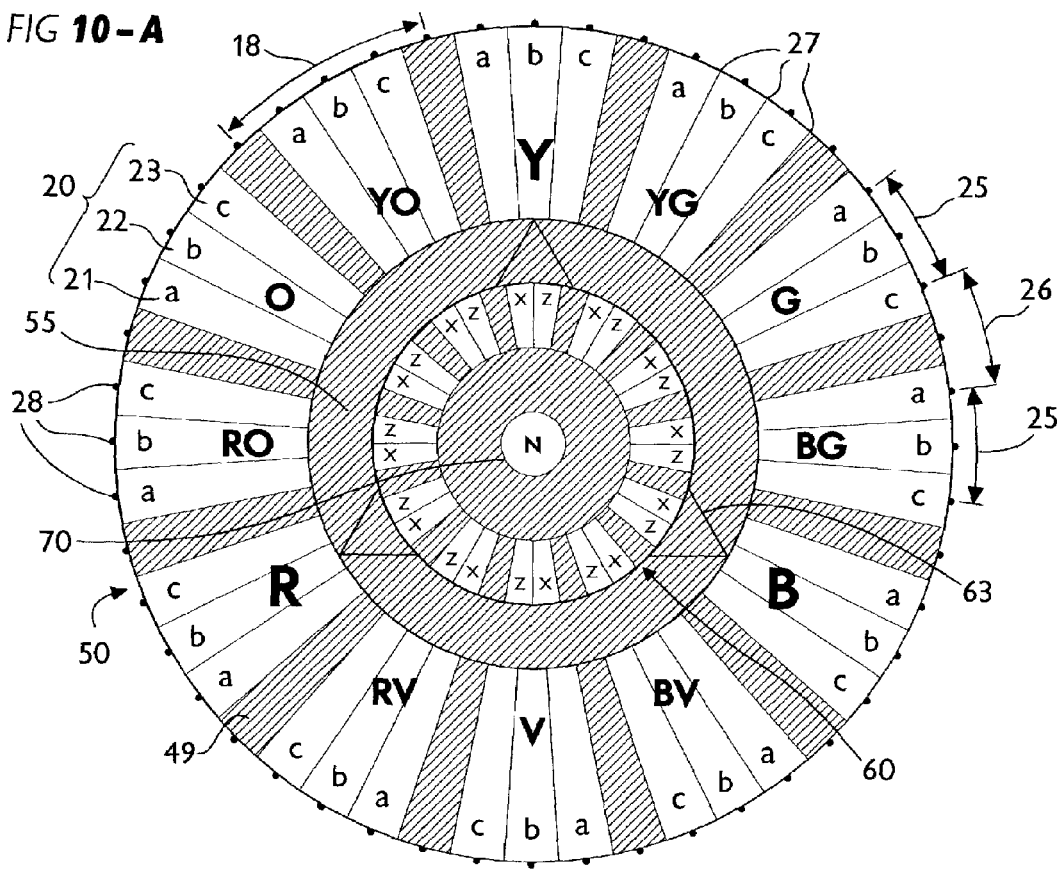
FIG 10-A
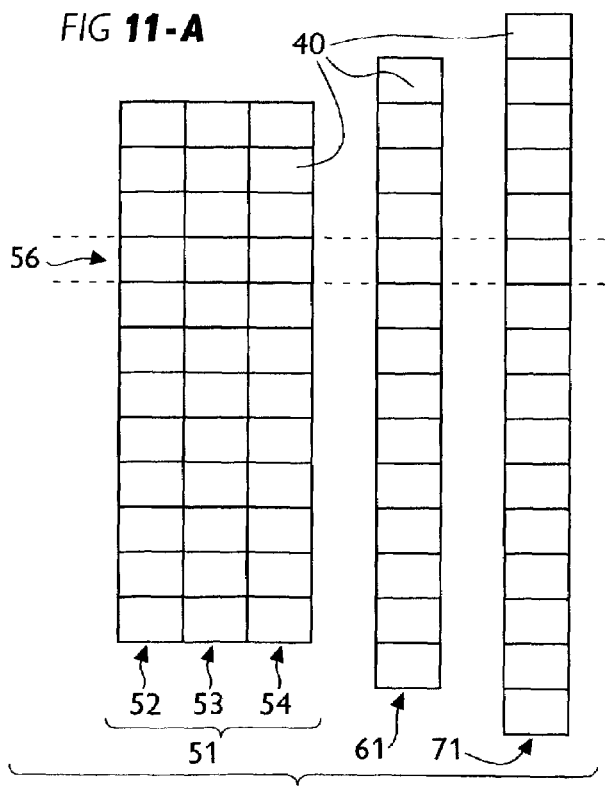
FIG 11-A
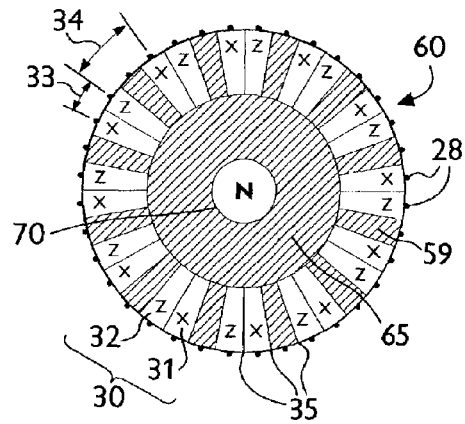
FIG 10-B

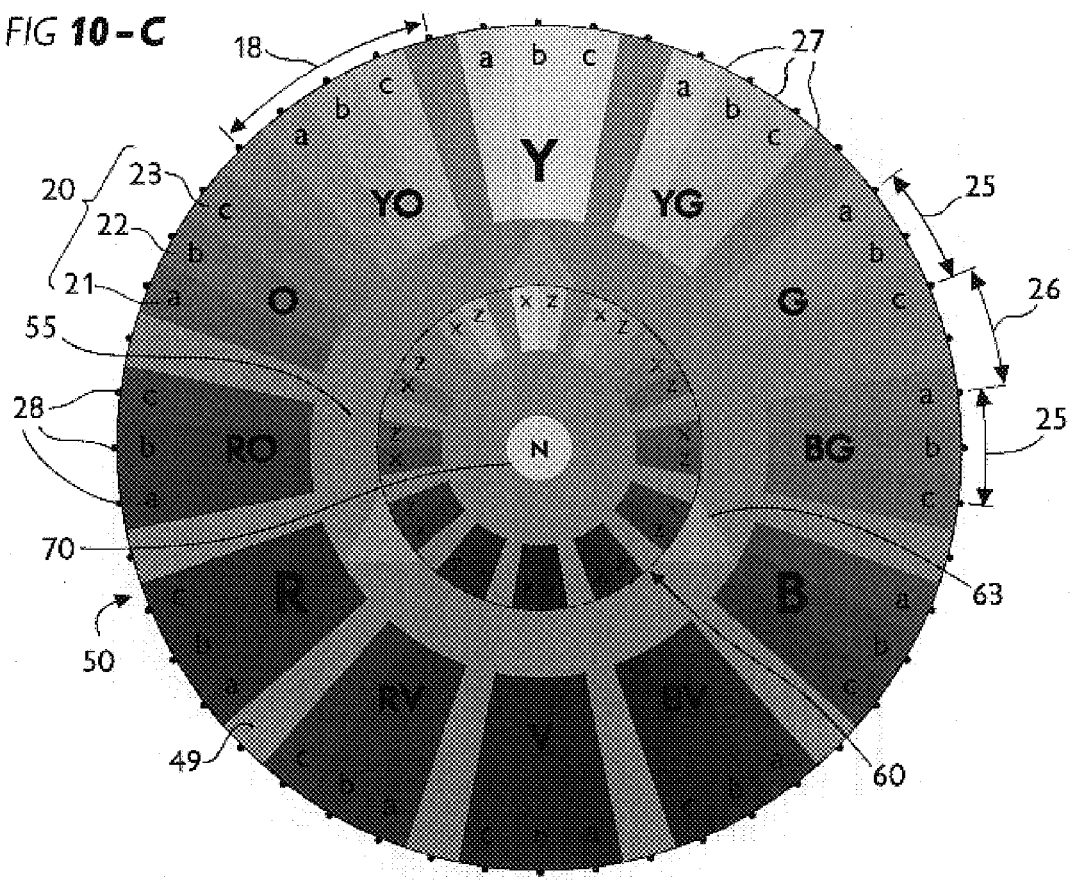
FIG 10-C
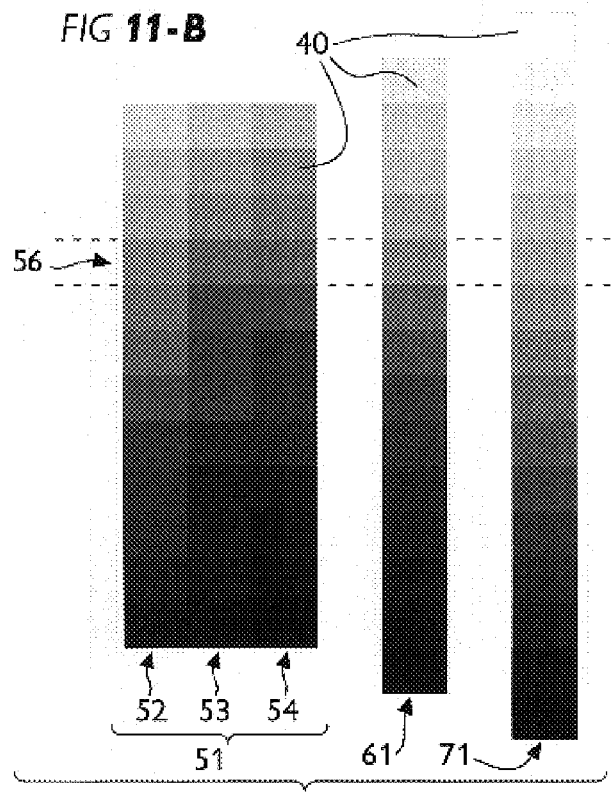
FIG 11-B
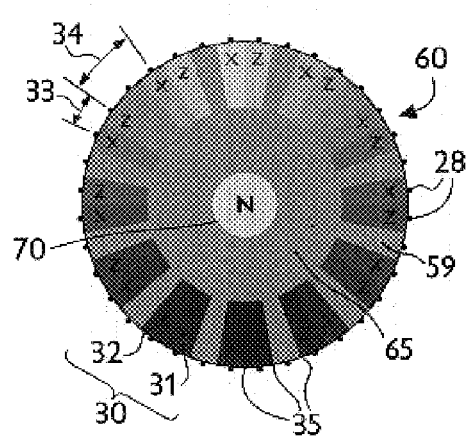
FIG 10-D

FIG 12-E
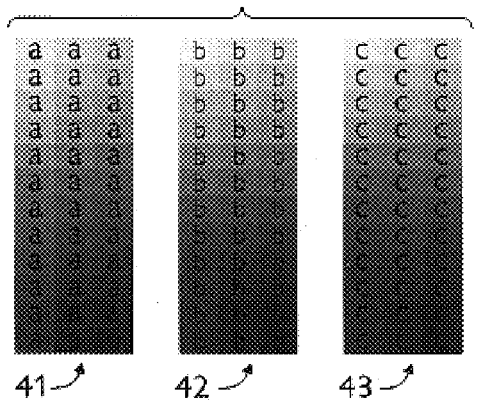
41  42  43
FIG 12-G
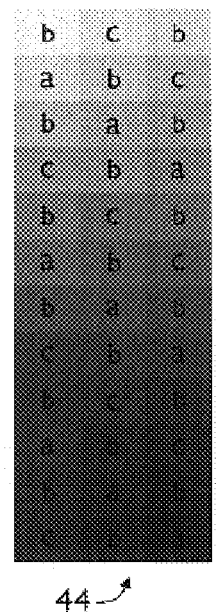
44
FIG 12-H
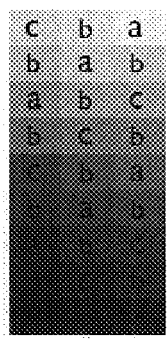
45
FIG 12-F
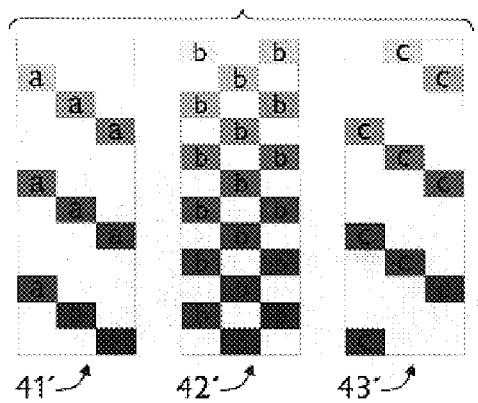
41'  42'  43'
FIG 13-D  FIG 13-E
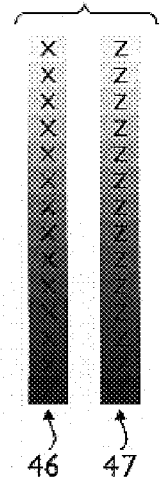 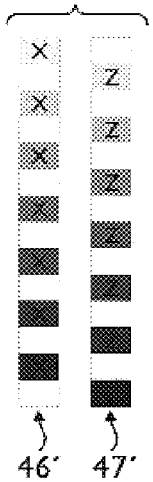
46  47    46'  47'
FIG 13-F
48
FIG 14-B
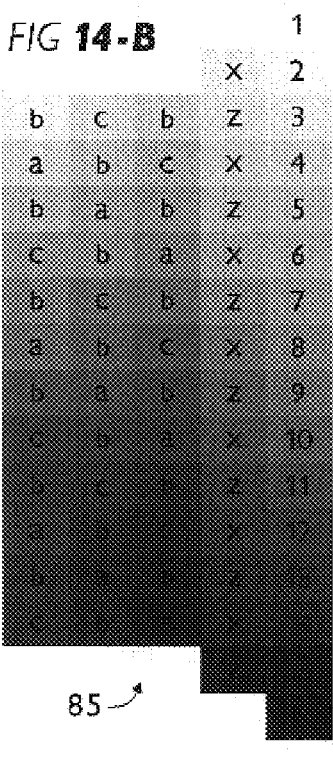
85

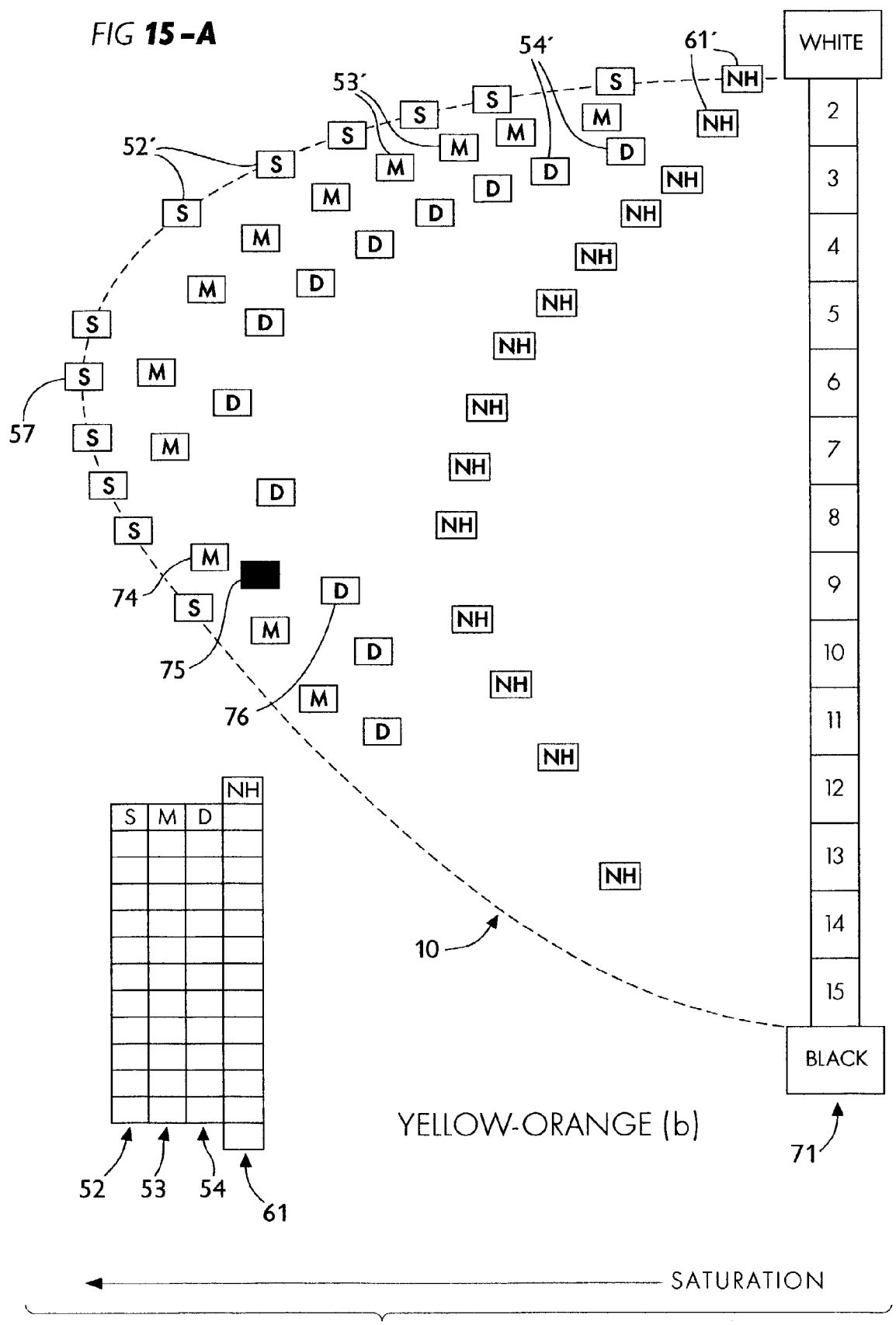
FIG 15-A

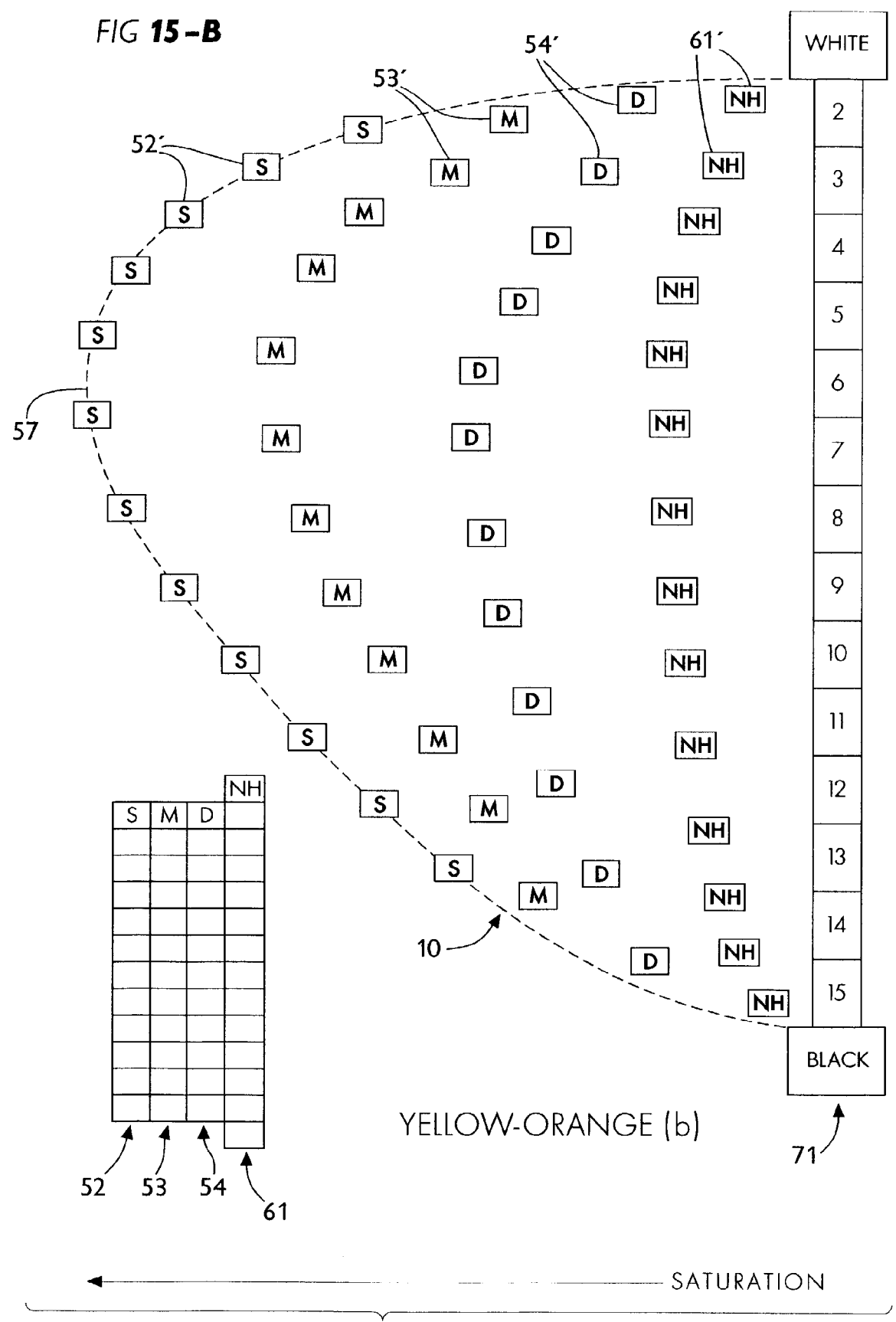

FIG 17-A
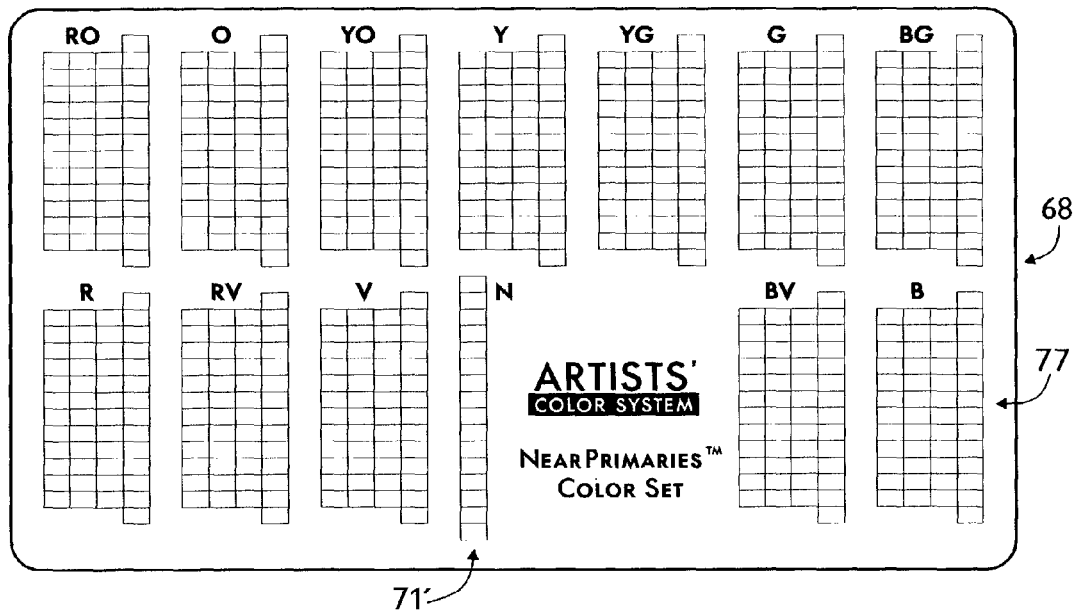
FIG 18-A
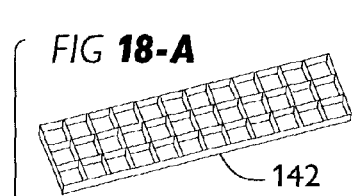
FIG 19-A
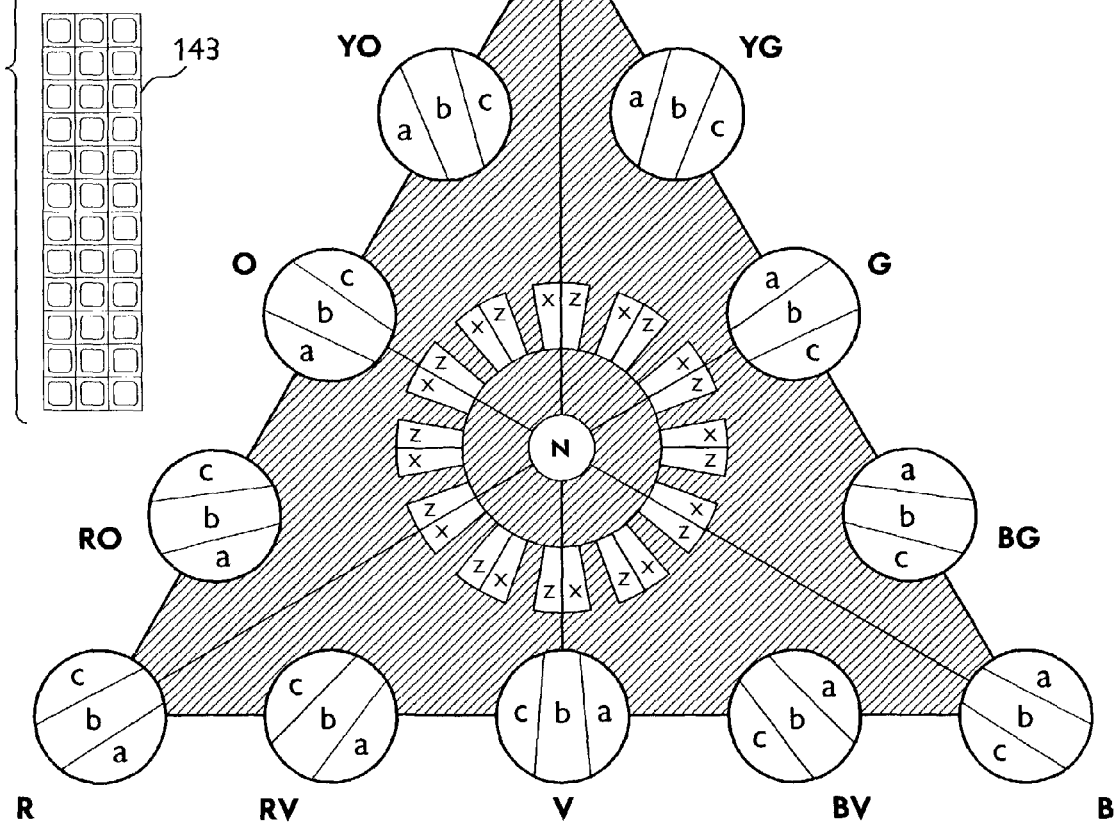

FIG 17-B
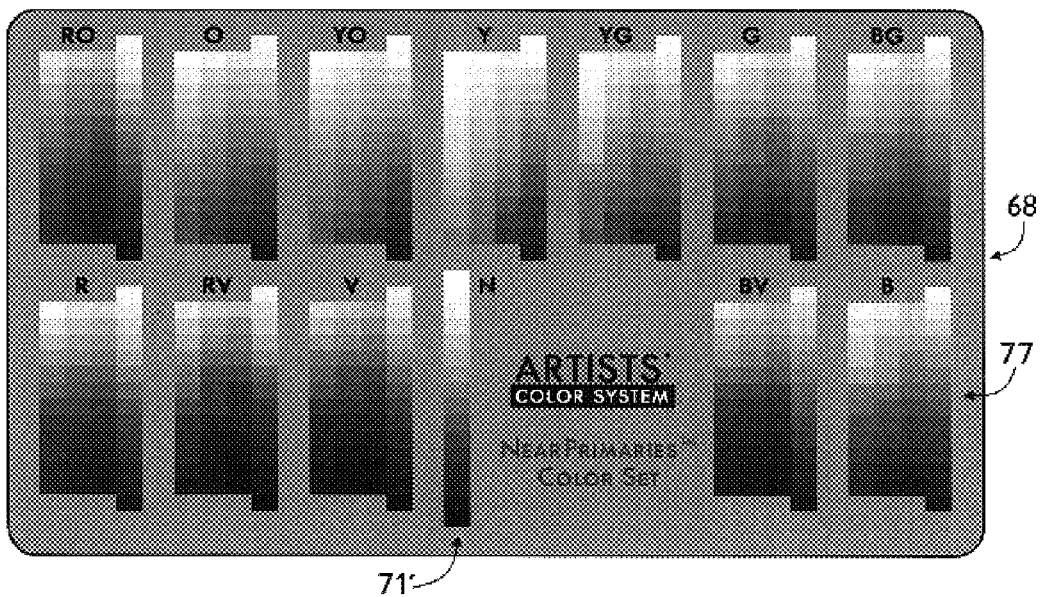
FIG 18-B
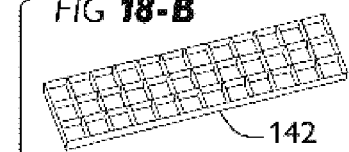
FIG 19-B
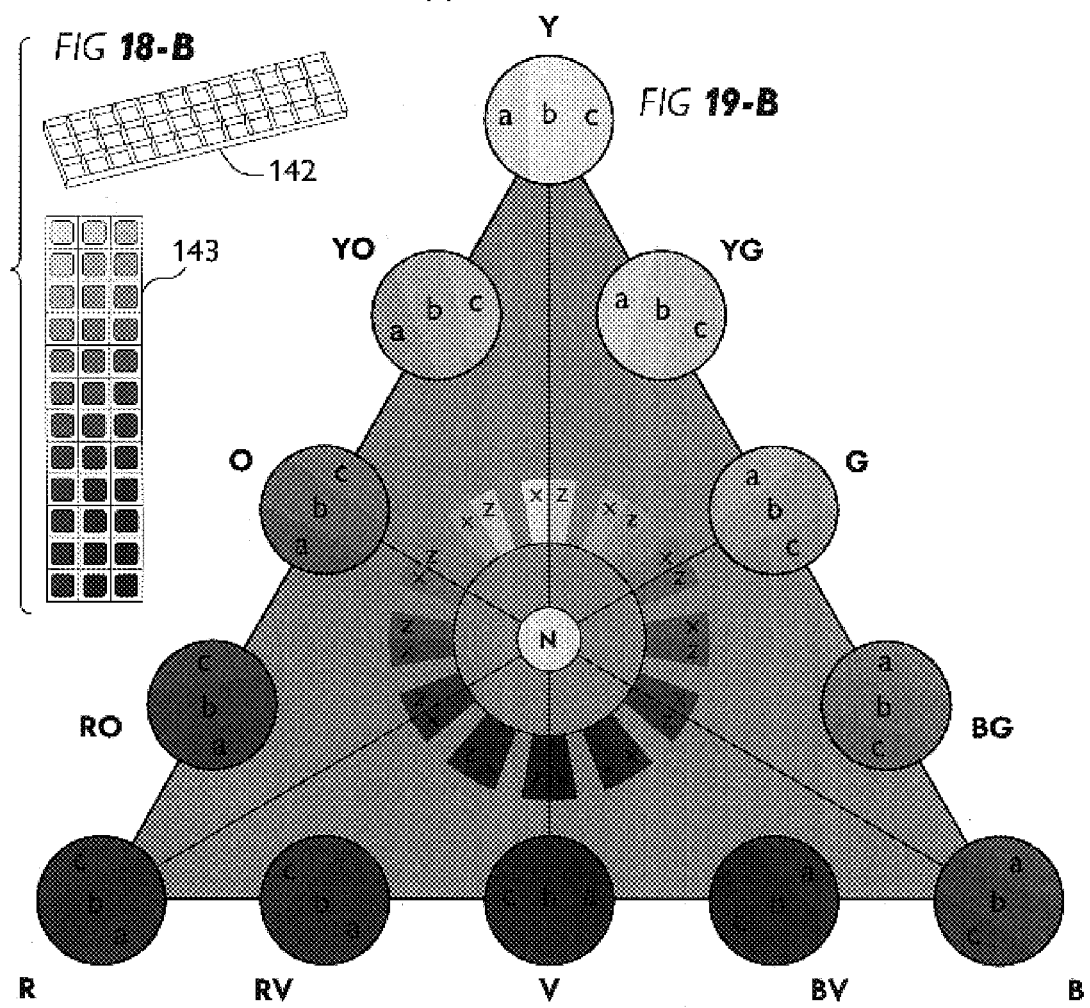

FIG 22-A
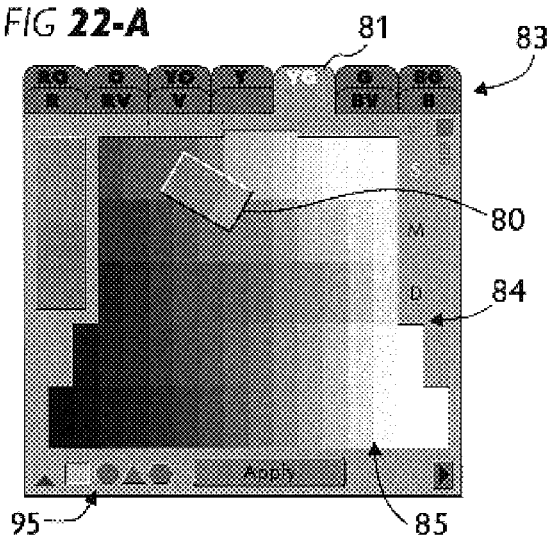
FIG 22-E
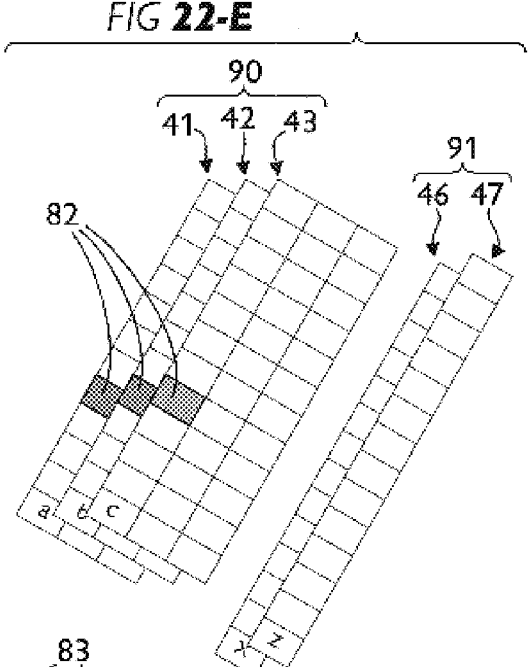
FIG 22-B
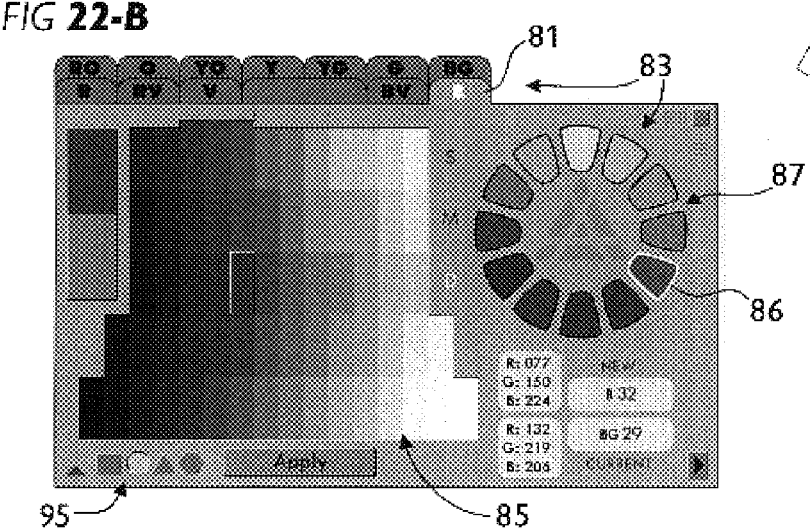
FIG 22-D
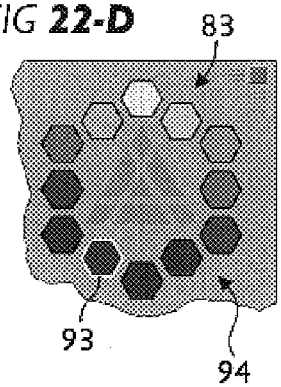
FIG 22-C
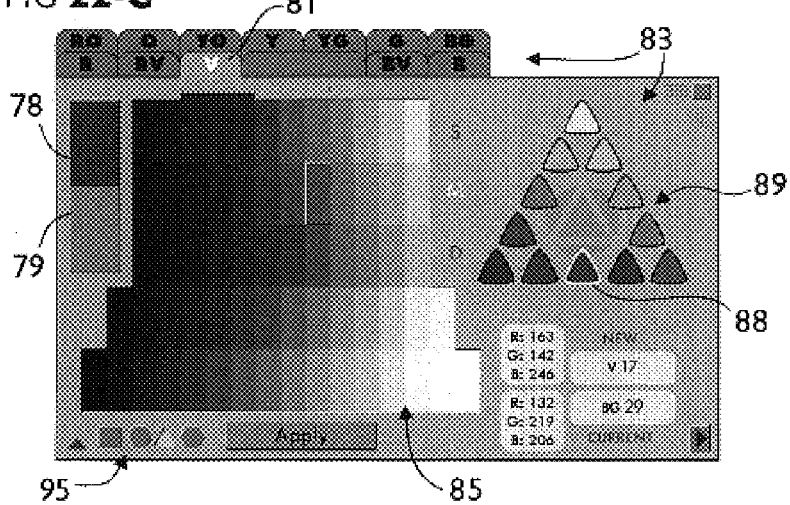

FIG 22-F
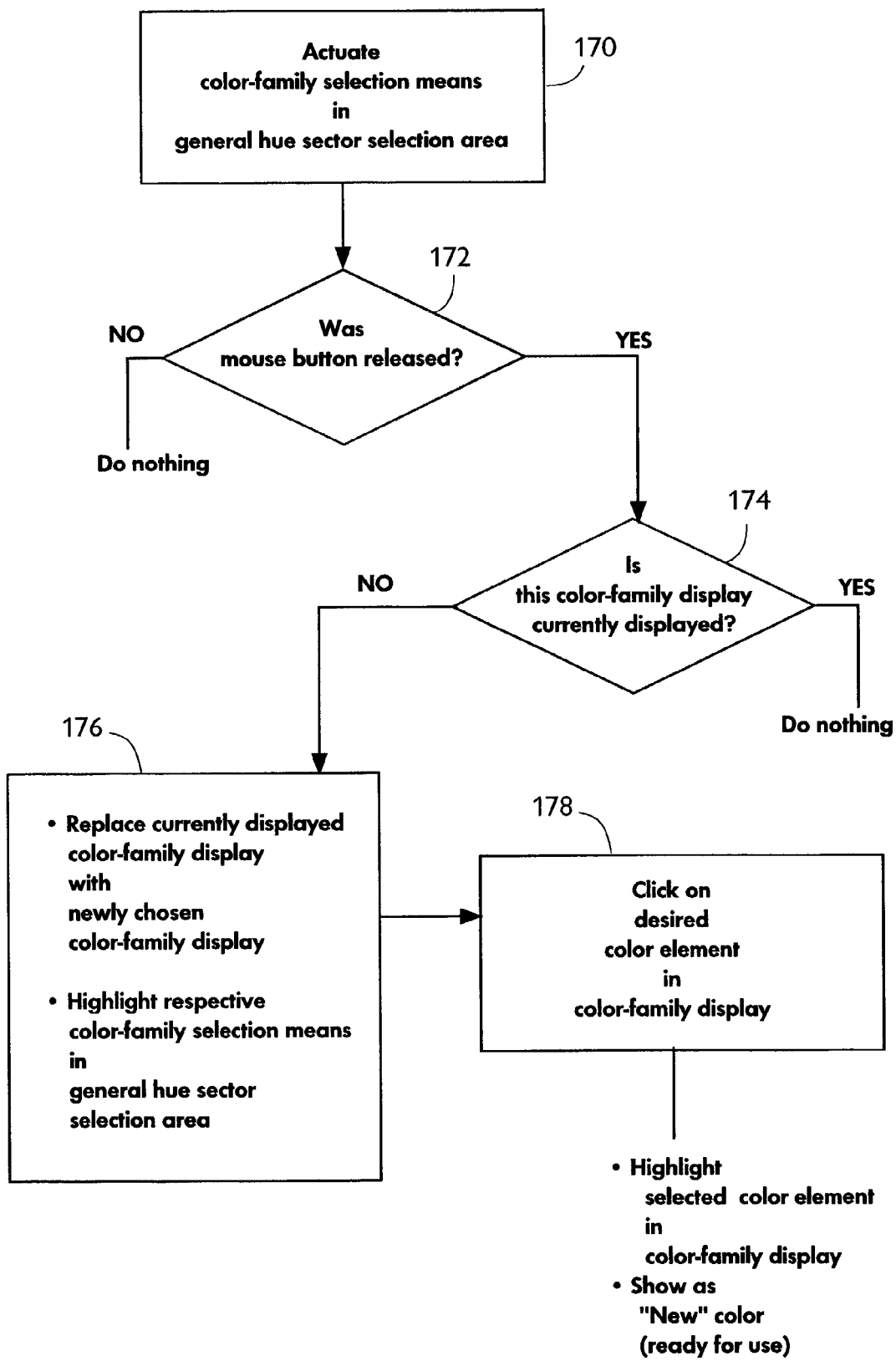

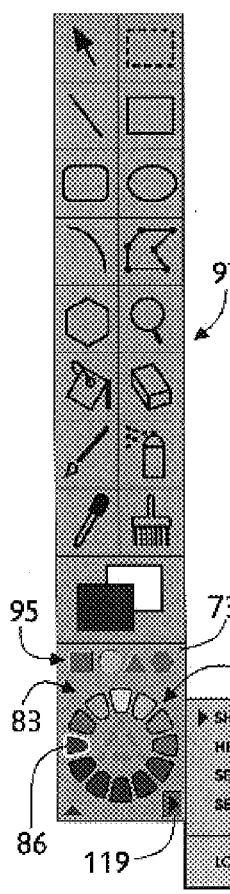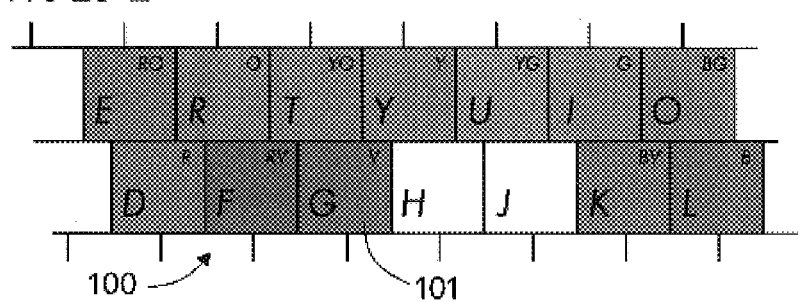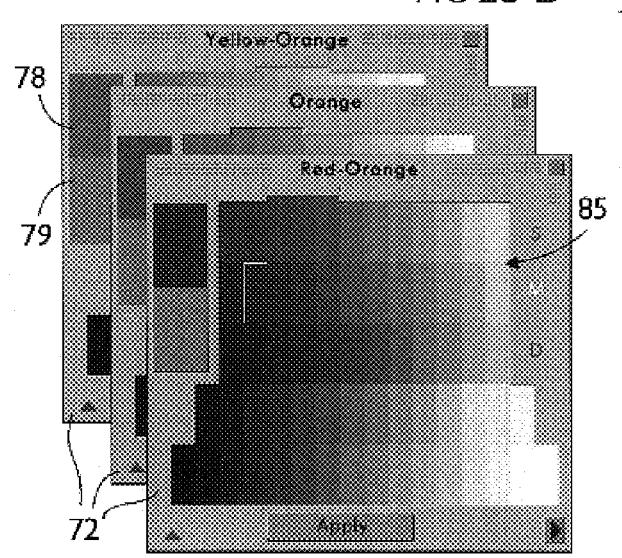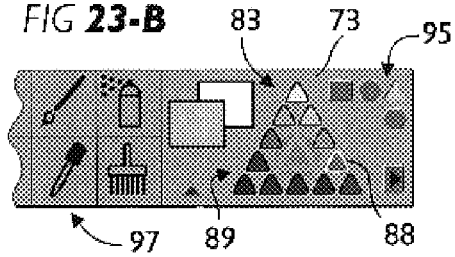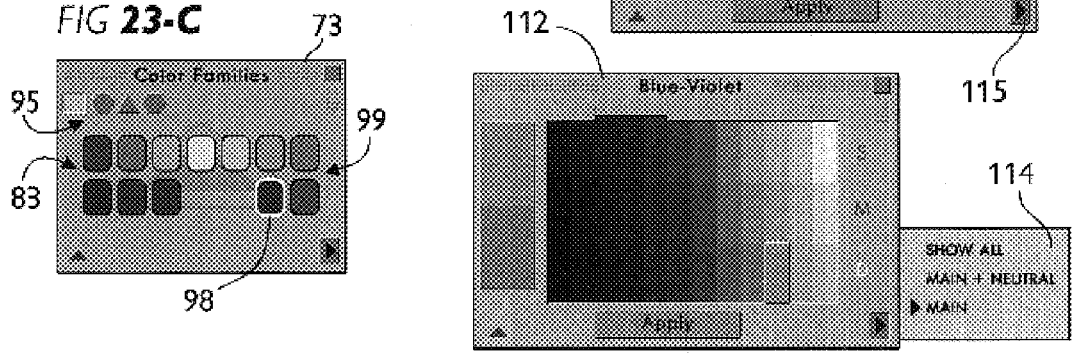

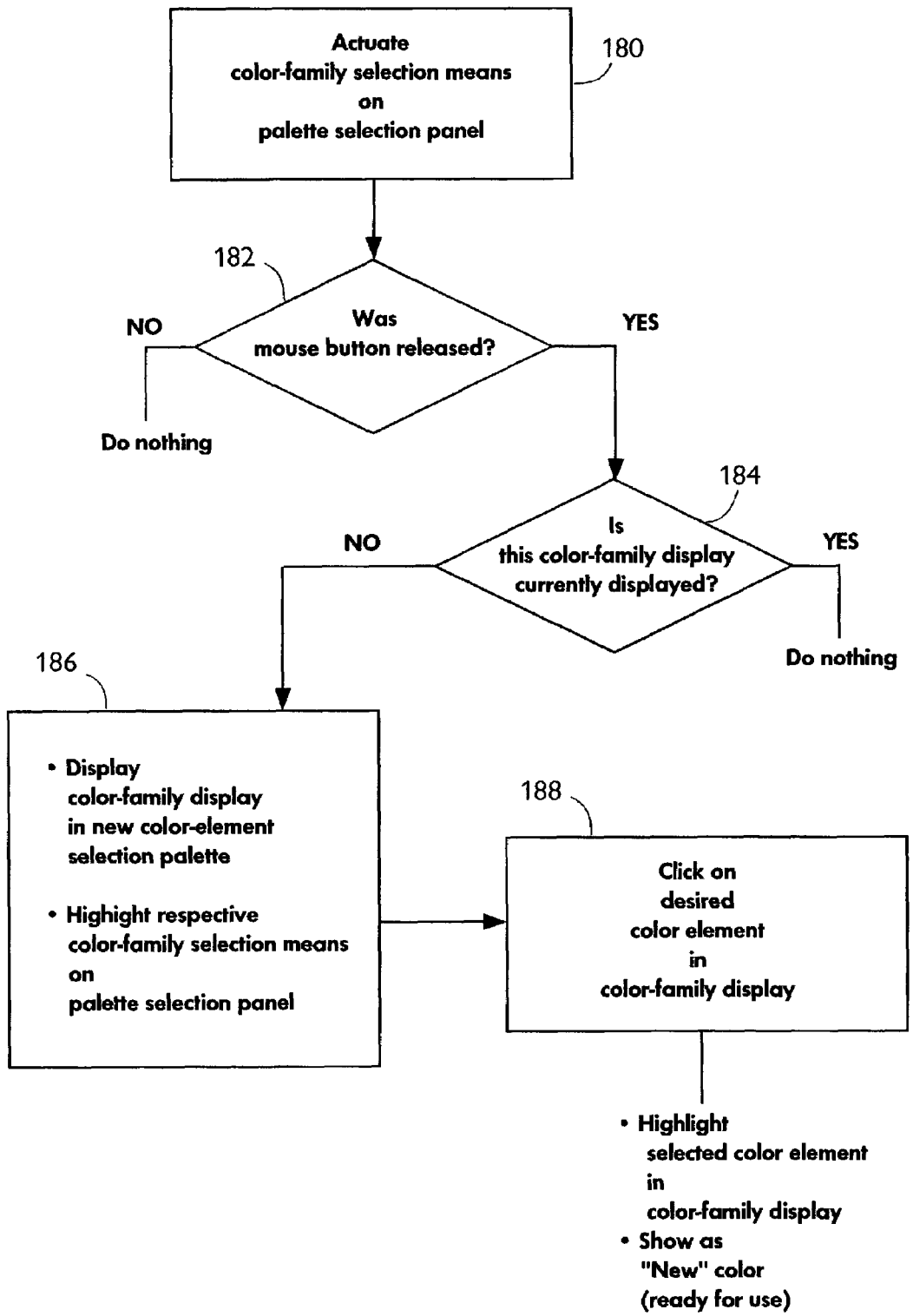
FIG 23-F

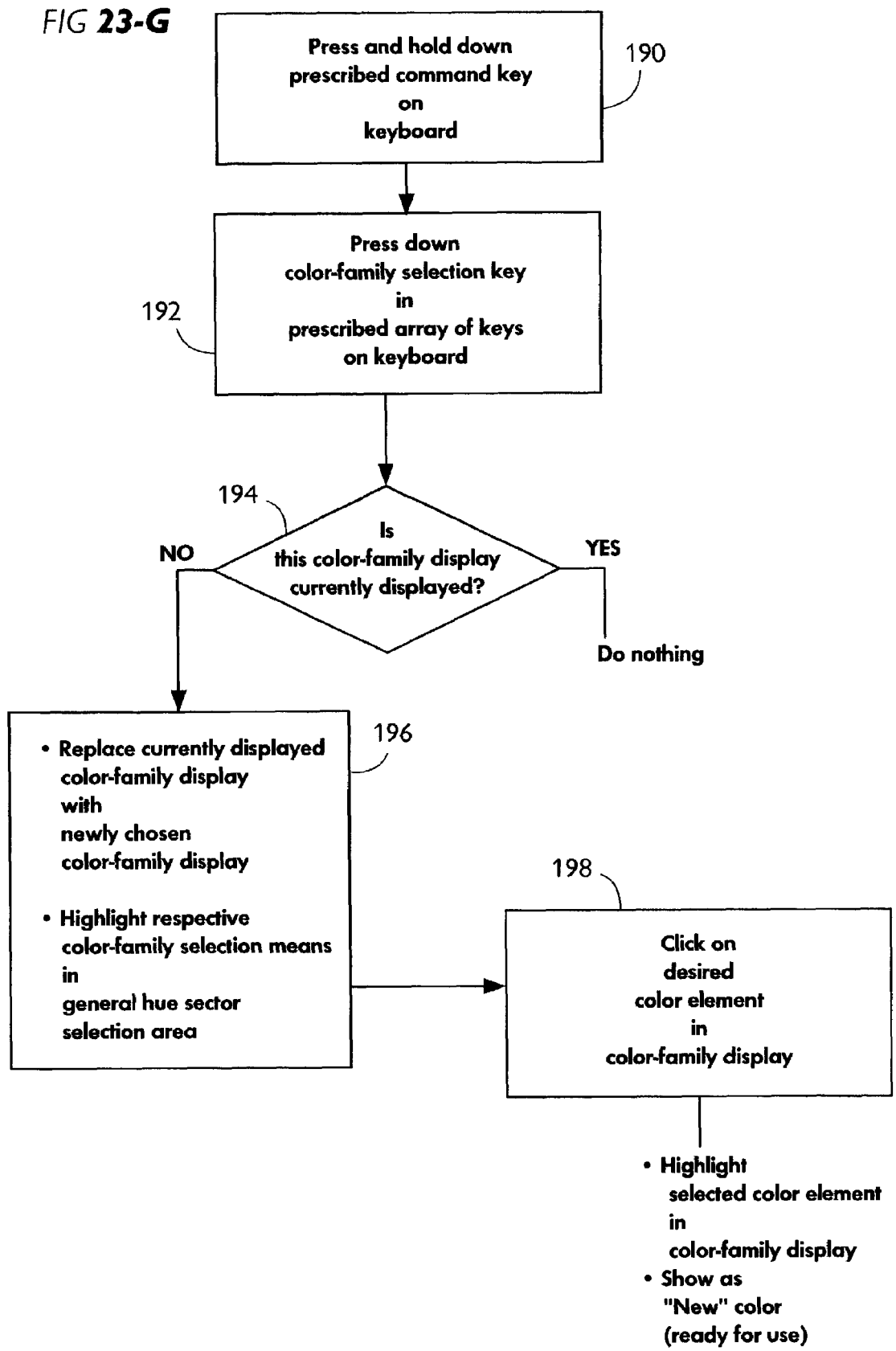
FIG 23-G

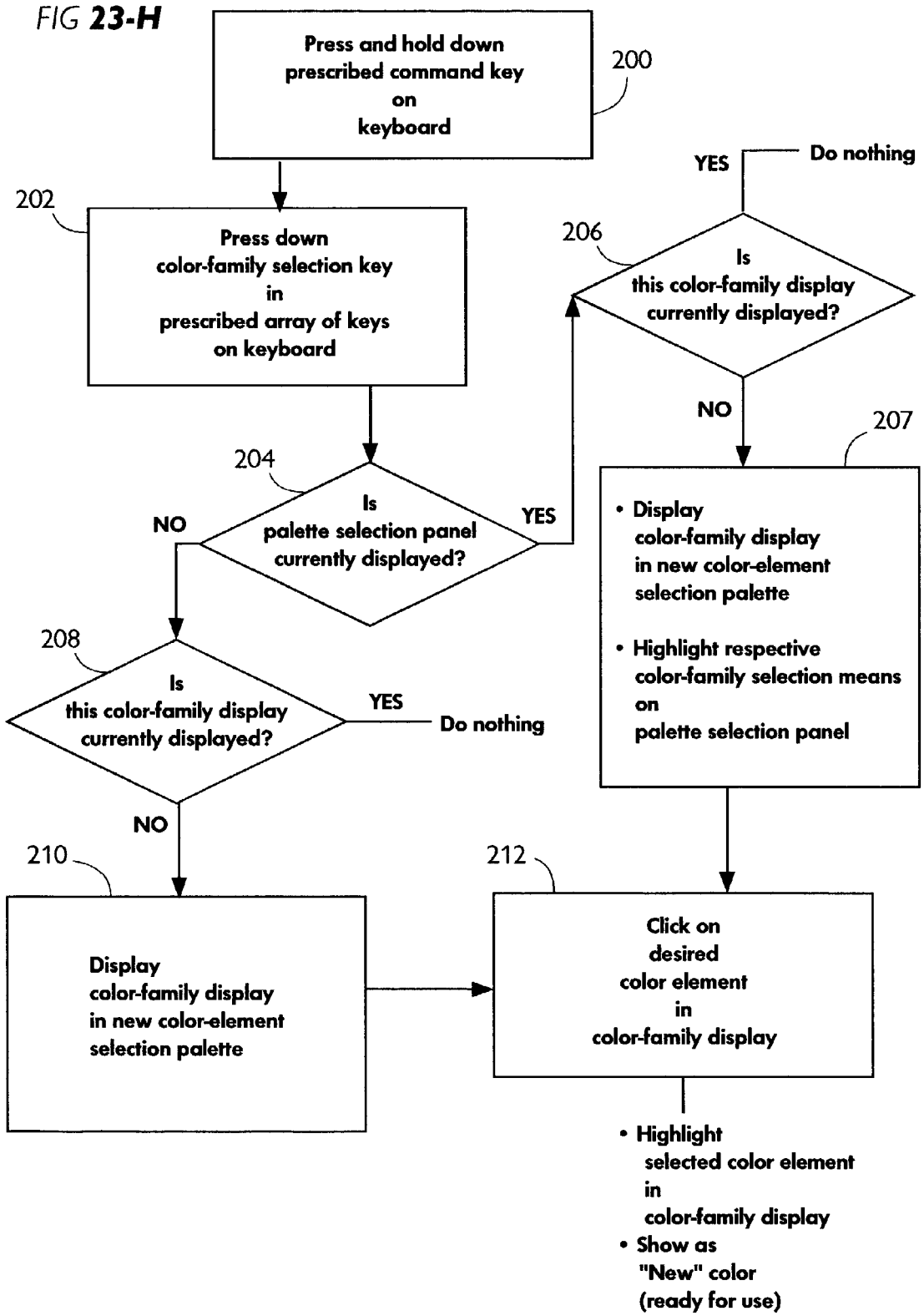
FIG 23-H

| ARTISTS' COLOR SYSTEM | MONITOR | | |
|---|---|---|---|
| | R | G | B |
| R 1 | 243 | 215 | 249 |
| R 2 | 240 | 191 | 241 |
| R 3 | 241 | 160 | 230 |
| R 4 | 233 | 128 | 192 |
| R 5 | 232 | 97 | 198 |
| R 6 | 217 | 75 | 184 |
| R 7 | 214 | 33 | 153 |
| R 8 | 190 | 0 | 98 |
| R 9 | 182 | 0 | 98 |
| R 10 | 180 | 0 | 120 |
| R 11 | 168 | 0 | 93 |
| R 12 | 158 | 0 | 82 |
| R 13 | 240 | 201 | 236 |
| R 14 | 236 | 176 | 230 |
| R 15 | 225 | 149 | 215 |
| R 16 | 228 | 127 | 204 |
| R 17 | 212 | 90 | 157 |
| R 18 | 205 | 66 | 161 |
| R 19 | 186 | 52 | 149 |
| R 20 | 183 | 24 | 125 |
| R 21 | 169 | 5 | 97 |
| R 22 | 152 | 0 | 88 |
| R 23 | 142 | 0 | 85 |
| R 24 | 127 | 9 | 79 |
| R 25 | 234 | 194 | 232 |
| R 26 | 223 | 169 | 204 |
| R 27 | 216 | 144 | 203 |
| R 28 | 204 | 121 | 186 |
| R 29 | 199 | 94 | 165 |
| R 30 | 185 | 72 | 131 |
| R 31 | 171 | 49 | 123 |
| R 32 | 156 | 41 | 116 |
| R 33 | 140 | 24 | 96 |
| R 34 | 126 | 21 | 79 |
| R 35 | 110 | 18 | 73 |
| R 36 | 88 | 23 | 66 |
| R-N 1 | 238 | 224 | 243 |
| R-N 2 | 232 | 213 | 228 |
| R-N 3 | 218 | 203 | 226 |
| R-N 4 | 206 | 189 | 196 |
| R-N 5 | 189 | 173 | 184 |
| R-N 6 | 172 | 151 | 152 |
| R-N 7 | 153 | 132 | 143 |
| R-N 8 | 144 | 114 | 110 |
| R-N 9 | 127 | 101 | 110 |
| R-N 10 | 118 | 85 | 86 |
| R-N 11 | 104 | 76 | 94 |
| R-N 12 | 90 | 68 | 73 |
| R-N 13 | 75 | 61 | 69 |
| R-N 14 | 60 | 37 | 55 |

FIG 28-A

| ARTISTS' COLOR SYSTEM | MONITOR | | |
|---|---|---|---|
| | R | G | B |
| RO 1 | 230 | 194 | 184 |
| RO 2 | 233 | 180 | 182 |
| RO 3 | 227 | 156 | 134 |
| RO 4 | 224 | 138 | 92 |
| RO 5 | 222 | 119 | 86 |
| RO 6 | 221 | 93 | 112 |
| RO 7 | 223 | 66 | 53 |
| RO 8 | 225 | 22 | 33 |
| RO 9 | 210 | 19 | 55 |
| RO 10 | 198 | 11 | 73 |
| RO 11 | 187 | 0 | 57 |
| RO 12 | 179 | 5 | 48 |
| RO 13 | 232 | 193 | 178 |
| RO 14 | 223 | 161 | 136 |
| RO 15 | 220 | 137 | 146 |
| RO 16 | 213 | 122 | 88 |
| RO 17 | 205 | 103 | 61 |
| RO 18 | 203 | 84 | 62 |
| RO 19 | 198 | 67 | 89 |
| RO 20 | 195 | 40 | 49 |
| RO 21 | 181 | 19 | 46 |
| RO 22 | 166 | 0 | 53 |
| RO 23 | 160 | 0 | 59 |
| RO 24 | 140 | 19 | 50 |
| RO 25 | 221 | 180 | 169 |
| RO 26 | 209 | 161 | 127 |
| RO 27 | 201 | 137 | 102 |
| RO 28 | 199 | 117 | 123 |
| RO 29 | 186 | 90 | 66 |
| RO 30 | 176 | 71 | 47 |
| RO 31 | 172 | 53 | 53 |
| RO 32 | 162 | 40 | 71 |
| RO 33 | 149 | 31 | 52 |
| RO 34 | 142 | 24 | 47 |
| RO 35 | 122 | 23 | 49 |
| RO 36 | 103 | 24 | 52 |
| RO-N 1 | 239 | 224 | 232 |
| RO-N 2 | 230 | 214 | 212 |
| RO-N 3 | 222 | 205 | 204 |
| RO-N 4 | 205 | 186 | 180 |
| RO-N 5 | 185 | 166 | 155 |
| RO-N 6 | 169 | 152 | 123 |
| RO-N 7 | 156 | 133 | 108 |
| RO-N 8 | 144 | 119 | 86 |
| RO-N 9 | 133 | 101 | 79 |
| RO-N 10 | 120 | 90 | 66 |
| RO-N 11 | 106 | 73 | 63 |
| RO-N 12 | 94 | 67 | 58 |
| RO-N 13 | 72 | 48 | 54 |
| RO-N 14 | 59 | 38 | 48 |

FIG 28-B

| ARTISTS' COLOR SYSTEM | MONITOR R | G | B |
|---|---|---|---|
| O 1 | 245 | 234 | 220 |
| O 2 | 244 | 216 | 189 |
| O 3 | 241 | 201 | 157 |
| O 4 | 238 | 189 | 102 |
| O 5 | 237 | 175 | 94 |
| O 6 | 234 | 155 | 75 |
| O 7 | 236 | 142 | 46 |
| O 8 | 239 | 118 | 0 |
| O 9 | 239 | 101 | 0 |
| O 10 | 238 | 75 | 0 |
| O 11 | 219 | 75 | 0 |
| O 12 | 187 | 95 | 23 |
| O 13 | 237 | 221 | 197 |
| O 14 | 231 | 200 | 162 |
| O 15 | 225 | 182 | 130 |
| O 16 | 220 | 175 | 105 |
| O 17 | 213 | 158 | 61 |
| O 18 | 213 | 146 | 60 |
| O 19 | 212 | 137 | 60 |
| O 20 | 209 | 123 | 39 |
| O 21 | 199 | 100 | 19 |
| O 22 | 196 | 75 | 21 |
| O 23 | 189 | 61 | 27 |
| O 24 | 167 | 69 | 34 |
| O 25 | 232 | 214 | 192 |
| O 26 | 215 | 194 | 147 |
| O 27 | 208 | 177 | 120 |
| O 28 | 203 | 162 | 98 |
| O 29 | 196 | 146 | 69 |
| O 30 | 187 | 137 | 48 |
| O 31 | 185 | 121 | 48 |
| O 32 | 184 | 106 | 44 |
| O 33 | 172 | 88 | 38 |
| O 34 | 154 | 86 | 35 |
| O 35 | 143 | 62 | 39 |
| O 36 | 129 | 50 | 43 |
| O-N 1 | 238 | 230 | 232 |
| O-N 2 | 229 | 219 | 209 |
| O-N 3 | 211 | 200 | 188 |
| O-N 4 | 198 | 188 | 166 |
| O-N 5 | 185 | 170 | 144 |
| O-N 6 | 170 | 158 | 110 |
| O-N 7 | 161 | 141 | 98 |
| O-N 8 | 147 | 127 | 77 |
| O-N 9 | 141 | 110 | 71 |
| O-N 10 | 126 | 97 | 58 |
| O-N 11 | 121 | 85 | 57 |
| O-N 12 | 97 | 80 | 56 |
| O-N 13 | 85 | 64 | 56 |
| O-N 14 | 63 | 49 | 47 |

FIG 28-C

| ARTISTS' COLOR SYSTEM | MONITOR R | G | B |
|---|---|---|---|
| YO 1 | 240 | 236 | 190 |
| YO 2 | 238 | 225 | 156 |
| YO 3 | 236 | 208 | 135 |
| YO 4 | 235 | 198 | 80 |
| YO 5 | 238 | 184 | 45 |
| YO 6 | 236 | 168 | 36 |
| YO 7 | 235 | 150 | 20 |
| YO 8 | 228 | 141 | 0 |
| YO 9 | 201 | 144 | 16 |
| YO 10 | 193 | 131 | 18 |
| YO 11 | 179 | 120 | 24 |
| YO 12 | 159 | 118 | 30 |
| YO 13 | 233 | 223 | 186 |
| YO 14 | 225 | 210 | 138 |
| YO 15 | 222 | 195 | 112 |
| YO 16 | 220 | 184 | 94 |
| YO 17 | 213 | 174 | 63 |
| YO 18 | 209 | 158 | 37 |
| YO 19 | 208 | 147 | 29 |
| YO 20 | 200 | 126 | 15 |
| YO 21 | 178 | 126 | 26 |
| YO 22 | 164 | 122 | 29 |
| YO 23 | 150 | 112 | 33 |
| YO 24 | 130 | 100 | 36 |
| YO 25 | 221 | 209 | 172 |
| YO 26 | 210 | 196 | 133 |
| YO 27 | 201 | 185 | 89 |
| YO 28 | 198 | 174 | 80 |
| YO 29 | 196 | 161 | 65 |
| YO 30 | 188 | 148 | 42 |
| YO 31 | 177 | 135 | 36 |
| YO 32 | 171 | 123 | 32 |
| YO 33 | 161 | 116 | 36 |
| YO 34 | 134 | 109 | 39 |
| YO 35 | 119 | 101 | 37 |
| YO 36 | 109 | 87 | 39 |
| YO-N 1 | 241 | 234 | 234 |
| YO-N 2 | 229 | 226 | 210 |
| YO-N 3 | 210 | 205 | 189 |
| YO-N 4 | 195 | 192 | 166 |
| YO-N 5 | 182 | 174 | 140 |
| YO-N 6 | 168 | 163 | 111 |
| YO-N 7 | 156 | 146 | 95 |
| YO-N 8 | 144 | 134 | 77 |
| YO-N 9 | 134 | 115 | 67 |
| YO-N 10 | 119 | 104 | 57 |
| YO-N 11 | 108 | 90 | 55 |
| YO-N 12 | 92 | 85 | 53 |
| YO-N 13 | 80 | 69 | 53 |
| YO-N 14 | 56 | 54 | 47 |

FIG 28-D

| ARTISTS' COLOR SYSTEM | MONITOR | | |
|---|---|---|---|
| | R | G | B |
| Y 1 | 243 | 246 | 185 |
| Y 2 | 240 | 239 | 119 |
| Y 3 | 236 | 233 | 82 |
| Y 4 | 236 | 226 | 60 |
| Y 5 | 240 | 214 | 36 |
| Y 6 | 247 | 204 | 17 |
| Y 7 | 239 | 198 | 14 |
| Y 8 | 216 | 191 | 24 |
| Y 9 | 206 | 177 | 26 |
| Y 10 | 203 | 160 | 23 |
| Y 11 | 191 | 161 | 27 |
| Y 12 | 165 | 148 | 34 |
| Y 13 | 232 | 238 | 182 |
| Y 14 | 223 | 229 | 130 |
| Y 15 | 222 | 220 | 90 |
| Y 16 | 219 | 209 | 71 |
| Y 17 | 212 | 200 | 49 |
| Y 18 | 214 | 186 | 45 |
| Y 19 | 210 | 175 | 35 |
| Y 20 | 204 | 163 | 25 |
| Y 21 | 174 | 153 | 34 |
| Y 22 | 172 | 143 | 31 |
| Y 23 | 160 | 137 | 34 |
| Y 24 | 139 | 130 | 38 |
| Y 25 | 224 | 228 | 184 |
| Y 26 | 207 | 215 | 133 |
| Y 27 | 201 | 205 | 89 |
| Y 28 | 200 | 196 | 72 |
| Y 29 | 197 | 183 | 63 |
| Y 30 | 190 | 173 | 45 |
| Y 31 | 186 | 164 | 43 |
| Y 32 | 178 | 148 | 39 |
| Y 33 | 151 | 135 | 39 |
| Y 34 | 124 | 118 | 40 |
| Y 35 | 106 | 101 | 41 |
| Y 36 | 96 | 88 | 41 |
| Y-N 1 | 242 | 241 | 232 |
| Y-N 2 | 228 | 233 | 211 |
| Y-N 3 | 210 | 209 | 188 |
| Y-N 4 | 194 | 198 | 164 |
| Y-N 5 | 175 | 177 | 135 |
| Y-N 6 | 158 | 164 | 106 |
| Y-N 7 | 144 | 145 | 90 |
| Y-N 8 | 134 | 136 | 74 |
| Y-N 9 | 120 | 115 | 65 |
| Y-N 10 | 110 | 109 | 59 |
| Y-N 11 | 91 | 92 | 54 |
| Y-N 12 | 81 | 89 | 53 |
| Y-N 13 | 71 | 75 | 52 |
| Y-N 14 | 49 | 58 | 48 |

FIG 28-E

| ARTISTS' COLOR SYSTEM | MONITOR | | |
|---|---|---|---|
| | R | G | B |
| YG 1 | 226 | 244 | 172 |
| YG 2 | 211 | 241 | 179 |
| YG 3 | 195 | 236 | 180 |
| YG 4 | 188 | 230 | 107 |
| YG 5 | 198 | 212 | 53 |
| YG 6 | 168 | 207 | 55 |
| YG 7 | 133 | 204 | 68 |
| YG 8 | 132 | 168 | 37 |
| YG 9 | 134 | 143 | 38 |
| YG 10 | 111 | 144 | 38 |
| YG 11 | 73 | 144 | 36 |
| YG 12 | 92 | 124 | 38 |
| YG 13 | 209 | 226 | 187 |
| YG 14 | 202 | 218 | 150 |
| YG 15 | 178 | 205 | 131 |
| YG 16 | 165 | 205 | 140 |
| YG 17 | 155 | 187 | 82 |
| YG 18 | 152 | 166 | 54 |
| YG 19 | 135 | 163 | 55 |
| YG 20 | 100 | 160 | 52 |
| YG 21 | 103 | 137 | 43 |
| YG 22 | 106 | 120 | 40 |
| YG 23 | 75 | 107 | 40 |
| YG 24 | 44 | 111 | 40 |
| YG 25 | 196 | 220 | 191 |
| YG 26 | 185 | 203 | 157 |
| YG 27 | 167 | 182 | 119 |
| YG 28 | 150 | 175 | 107 |
| YG 29 | 130 | 170 | 95 |
| YG 30 | 124 | 152 | 68 |
| YG 31 | 119 | 137 | 51 |
| YG 32 | 100 | 130 | 54 |
| YG 33 | 81 | 130 | 54 |
| YG 34 | 81 | 113 | 45 |
| YG 35 | 72 | 90 | 44 |
| YG 36 | 44 | 73 | 42 |
| YG-N 1 | 239 | 239 | 225 |
| YG-N 2 | 221 | 227 | 214 |
| YG-N 3 | 212 | 214 | 198 |
| YG-N 4 | 189 | 198 | 179 |
| YG-N 5 | 176 | 183 | 153 |
| YG-N 6 | 158 | 173 | 137 |
| YG-N 7 | 146 | 156 | 109 |
| YG-N 8 | 126 | 146 | 96 |
| YG-N 9 | 117 | 129 | 78 |
| YG-N 10 | 100 | 122 | 73 |
| YG-N 11 | 90 | 104 | 63 |
| YG-N 12 | 75 | 93 | 60 |
| YG-N 13 | 68 | 79 | 57 |
| YG-N 14 | 42 | 59 | 49 |

FIG 28-F

| ARTISTS' COLOR SYSTEM | MONITOR | | |
|---|---|---|---|
| | R | G | B |
| G 1 | 195 | 231 | 211 |
| G 2 | 173 | 225 | 208 |
| G 3 | 132 | 214 | 163 |
| G 4 | 95 | 198 | 99 |
| G 5 | 72 | 188 | 116 |
| G 6 | 58 | 175 | 137 |
| G 7 | 42 | 162 | 91 |
| G 8 | 37 | 146 | 58 |
| G 9 | 26 | 136 | 80 |
| G 10 | 22 | 122 | 88 |
| G 11 | 17 | 105 | 68 |
| G 12 | 19 | 83 | 49 |
| G 13 | 185 | 222 | 193 |
| G 14 | 151 | 208 | 178 |
| G 15 | 129 | 204 | 179 |
| G 16 | 104 | 188 | 133 |
| G 17 | 73 | 167 | 77 |
| G 18 | 54 | 155 | 91 |
| G 19 | 47 | 152 | 117 |
| G 20 | 35 | 131 | 76 |
| G 21 | 22 | 116 | 54 |
| G 22 | 20 | 100 | 66 |
| G 23 | 15 | 88 | 69 |
| G 24 | 18 | 80 | 57 |
| G 25 | 171 | 213 | 192 |
| G 26 | 148 | 194 | 149 |
| G 27 | 116 | 188 | 139 |
| G 28 | 94 | 176 | 147 |
| G 29 | 67 | 154 | 91 |
| G 30 | 66 | 141 | 67 |
| G 31 | 43 | 131 | 76 |
| G 32 | 36 | 124 | 94 |
| G 33 | 27 | 109 | 69 |
| G 34 | 24 | 84 | 51 |
| G 35 | 20 | 70 | 54 |
| G 36 | 22 | 63 | 55 |
| G-N 1 | 224 | 234 | 233 |
| G-N 2 | 211 | 224 | 226 |
| G-N 3 | 196 | 208 | 196 |
| G-N 4 | 176 | 192 | 182 |
| G-N 5 | 162 | 180 | 158 |
| G-N 6 | 146 | 168 | 146 |
| G-N 7 | 130 | 155 | 115 |
| G-N 8 | 108 | 140 | 110 |
| G-N 9 | 99 | 129 | 88 |
| G-N 10 | 83 | 116 | 87 |
| G-N 11 | 73 | 104 | 70 |
| G-N 12 | 60 | 90 | 70 |
| G-N 13 | 52 | 76 | 60 |
| G-N 14 | 39 | 56 | 58 |

FIG 28-G

| ARTISTS' COLOR SYSTEM | MONITOR | | |
|---|---|---|---|
| | R | G | B |
| BG 1 | 211 | 240 | 252 |
| BG 2 | 180 | 233 | 231 |
| BG 3 | 134 | 219 | 220 |
| BG 4 | 108 | 207 | 225 |
| BG 5 | 79 | 192 | 193 |
| BG 6 | 50 | 166 | 154 |
| BG 7 | 43 | 158 | 161 |
| BG 8 | 34 | 150 | 176 |
| BG 9 | 21 | 130 | 147 |
| BG 10 | 16 | 114 | 122 |
| BG 11 | 5 | 102 | 130 |
| BG 12 | 8 | 94 | 131 |
| BG 13 | 193 | 230 | 244 |
| BG 14 | 158 | 217 | 219 |
| BG 15 | 126 | 204 | 195 |
| BG 16 | 103 | 192 | 196 |
| BG 17 | 81 | 178 | 191 |
| BG 18 | 57 | 154 | 154 |
| BG 19 | 46 | 142 | 128 |
| BG 20 | 41 | 135 | 139 |
| BG 21 | 22 | 116 | 143 |
| BG 22 | 17 | 98 | 115 |
| BG 23 | 16 | 88 | 98 |
| BG 24 | 18 | 83 | 96 |
| BG 25 | 175 | 213 | 218 |
| BG 26 | 153 | 201 | 212 |
| BG 27 | 124 | 188 | 186 |
| BG 28 | 100 | 175 | 165 |
| BG 29 | 82 | 162 | 159 |
| BG 30 | 56 | 144 | 149 |
| BG 31 | 45 | 130 | 124 |
| BG 32 | 37 | 119 | 108 |
| BG 33 | 27 | 105 | 111 |
| BG 34 | 28 | 88 | 100 |
| BG 35 | 20 | 76 | 85 |
| BG 36 | 24 | 64 | 67 |
| BG-N 1 | 225 | 235 | 246 |
| BG-N 2 | 204 | 222 | 243 |
| BG-N 3 | 195 | 209 | 224 |
| BG-N 4 | 177 | 195 | 206 |
| BG-N 5 | 160 | 182 | 180 |
| BG-N 6 | 142 | 168 | 168 |
| BG-N 7 | 127 | 155 | 142 |
| BG-N 8 | 108 | 145 | 136 |
| BG-N 9 | 92 | 129 | 109 |
| BG-N 10 | 76 | 119 | 107 |
| BG-N 11 | 67 | 105 | 91 |
| BG-N 12 | 54 | 93 | 90 |
| BG-N 13 | 50 | 79 | 75 |
| BG-N 14 | 30 | 54 | 71 |

FIG 28-H

| ARTISTS' COLOR SYSTEM | MONITOR | | |
|---|---|---|---|
| | R | G | B |
| B 1 | 211 | 234 | 255 |
| B 2 | 202 | 219 | 253 |
| B 3 | 160 | 210 | 249 |
| B 4 | 119 | 209 | 247 |
| B 5 | 112 | 184 | 238 |
| B 6 | 98 | 148 | 223 |
| B 7 | 54 | 142 | 216 |
| B 8 | 10 | 124 | 199 |
| B 9 | 25 | 109 | 197 |
| B 10 | 42 | 90 | 192 |
| B 11 | 18 | 82 | 171 |
| B 12 | 17 | 78 | 119 |
| B 13 | 193 | 226 | 247 |
| B 14 | 176 | 208 | 238 |
| B 15 | 156 | 182 | 230 |
| B 16 | 119 | 180 | 226 |
| B 17 | 92 | 174 | 217 |
| B 18 | 70 | 149 | 200 |
| B 19 | 68 | 119 | 188 |
| B 20 | 35 | 114 | 178 |
| B 21 | 19 | 103 | 166 |
| B 22 | 20 | 86 | 155 |
| B 23 | 33 | 65 | 166 |
| B 24 | 33 | 55 | 106 |
| B 25 | 180 | 205 | 234 |
| B 26 | 161 | 198 | 226 |
| B 27 | 136 | 180 | 215 |
| B 28 | 121 | 153 | 201 |
| B 29 | 92 | 150 | 190 |
| B 30 | 62 | 136 | 170 |
| B 31 | 48 | 115 | 156 |
| B 32 | 49 | 95 | 145 |
| B 33 | 30 | 93 | 138 |
| B 34 | 25 | 83 | 119 |
| B 35 | 29 | 62 | 109 |
| B 36 | 33 | 41 | 82 |
| B-N 1 | 229 | 233 | 251 |
| B-N 2 | 209 | 218 | 242 |
| B-N 3 | 191 | 202 | 225 |
| B-N 4 | 163 | 181 | 201 |
| B-N 5 | 147 | 171 | 179 |
| B-N 6 | 127 | 151 | 165 |
| B-N 7 | 101 | 139 | 150 |
| B-N 8 | 92 | 123 | 138 |
| B-N 9 | 67 | 106 | 118 |
| B-N 10 | 65 | 95 | 112 |
| B-N 11 | 53 | 90 | 101 |
| B-N 12 | 51 | 71 | 92 |
| B-N 13 | 42 | 60 | 81 |
| B-N 14 | 41 | 39 | 74 |

FIG 28-I

| ARTISTS' COLOR SYSTEM | MONITOR | | |
|---|---|---|---|
| | R | G | B |
| BV 1 | 214 | 217 | 254 |
| BV 2 | 187 | 189 | 244 |
| BV 3 | 170 | 176 | 238 |
| BV 4 | 146 | 162 | 231 |
| BV 5 | 124 | 135 | 219 |
| BV 6 | 100 | 101 | 200 |
| BV 7 | 82 | 87 | 191 |
| BV 8 | 63 | 77 | 185 |
| BV 9 | 62 | 62 | 171 |
| BV 10 | 63 | 52 | 161 |
| BV 11 | 55 | 45 | 153 |
| BV 12 | 47 | 40 | 140 |
| BV 13 | 189 | 196 | 237 |
| BV 14 | 172 | 178 | 230 |
| BV 15 | 159 | 162 | 224 |
| BV 16 | 136 | 147 | 215 |
| BV 17 | 104 | 127 | 198 |
| BV 18 | 85 | 98 | 177 |
| BV 19 | 75 | 77 | 164 |
| BV 20 | 62 | 72 | 160 |
| BV 21 | 50 | 62 | 152 |
| BV 22 | 54 | 54 | 143 |
| BV 23 | 56 | 37 | 139 |
| BV 24 | 46 | 28 | 114 |
| BV 25 | 176 | 182 | 225 |
| BV 26 | 162 | 173 | 218 |
| BV 27 | 143 | 153 | 208 |
| BV 28 | 123 | 133 | 194 |
| BV 29 | 100 | 118 | 178 |
| BV 30 | 70 | 95 | 153 |
| BV 31 | 64 | 79 | 147 |
| BV 32 | 61 | 68 | 140 |
| BV 33 | 52 | 57 | 131 |
| BV 34 | 46 | 51 | 125 |
| BV 35 | 46 | 37 | 119 |
| BV 36 | 42 | 27 | 96 |
| BV-N 1 | 224 | 227 | 250 |
| BV-N 2 | 206 | 208 | 240 |
| BV-N 3 | 191 | 197 | 227 |
| BV-N 4 | 175 | 179 | 204 |
| BV-N 5 | 151 | 166 | 187 |
| BV-N 6 | 141 | 152 | 166 |
| BV-N 7 | 117 | 137 | 148 |
| BV-N 8 | 107 | 123 | 134 |
| BV-N 9 | 87 | 110 | 121 |
| BV-N 10 | 80 | 96 | 111 |
| BV-N 11 | 62 | 82 | 99 |
| BV-N 12 | 57 | 70 | 94 |
| BV-N 13 | 46 | 58 | 77 |
| BV-N 14 | 37 | 35 | 67 |

FIG 28-J

| ARTISTS' COLOR SYSTEM | MONITOR | | |
|---|---|---|---|
| | R | G | B |
| V 1 | 216 | 211 | 251 |
| V 2 | 196 | 190 | 243 |
| V 3 | 178 | 165 | 234 |
| V 4 | 161 | 136 | 220 |
| V 5 | 143 | 120 | 211 |
| V 6 | 124 | 106 | 202 |
| V 7 | 105 | 76 | 183 |
| V 8 | 95 | 52 | 161 |
| V 9 | 85 | 51 | 160 |
| V 10 | 76 | 48 | 156 |
| V 11 | 70 | 36 | 140 |
| V 12 | 61 | 23 | 114 |
| V 13 | 203 | 192 | 238 |
| V 14 | 180 | 170 | 226 |
| V 15 | 162 | 152 | 219 |
| V 16 | 141 | 126 | 202 |
| V 17 | 127 | 98 | 183 |
| V 18 | 114 | 93 | 180 |
| V 19 | 95 | 79 | 169 |
| V 20 | 85 | 60 | 152 |
| V 21 | 82 | 45 | 136 |
| V 22 | 66 | 40 | 130 |
| V 23 | 59 | 30 | 128 |
| V 24 | 51 | 21 | 104 |
| V 25 | 188 | 180 | 228 |
| V 26 | 170 | 156 | 209 |
| V 27 | 148 | 137 | 198 |
| V 28 | 129 | 121 | 188 |
| V 29 | 111 | 97 | 167 |
| V 30 | 100 | 80 | 150 |
| V 31 | 87 | 74 | 143 |
| V 32 | 75 | 64 | 137 |
| V 33 | 72 | 51 | 129 |
| V 34 | 66 | 33 | 120 |
| V 35 | 55 | 29 | 111 |
| V 36 | 43 | 24 | 88 |
| V-N 1 | 225 | 224 | 245 |
| V-N 2 | 219 | 212 | 238 |
| V-N 3 | 200 | 198 | 226 |
| V-N 4 | 181 | 177 | 193 |
| V-N 5 | 156 | 162 | 178 |
| V-N 6 | 144 | 142 | 157 |
| V-N 7 | 116 | 124 | 146 |
| V-N 8 | 102 | 103 | 116 |
| V-N 9 | 83 | 92 | 117 |
| V-N 10 | 77 | 78 | 97 |
| V-N 11 | 63 | 71 | 104 |
| V-N 12 | 59 | 60 | 92 |
| V-N 13 | 46 | 46 | 86 |
| V-N 14 | 41 | 28 | 70 |

*FIG 28-K*

| ARTISTS' COLOR SYSTEM | MONITOR | | |
|---|---|---|---|
| | R | G | B |
| RV 1 | 233 | 215 | 255 |
| RV 2 | 211 | 193 | 246 |
| RV 3 | 210 | 177 | 241 |
| RV 4 | 211 | 144 | 227 |
| RV 5 | 183 | 133 | 220 |
| RV 6 | 163 | 118 | 211 |
| RV 7 | 162 | 89 | 195 |
| RV 8 | 162 | 51 | 161 |
| RV 9 | 132 | 54 | 164 |
| RV 10 | 115 | 58 | 168 |
| RV 11 | 115 | 36 | 140 |
| RV 12 | 118 | 12 | 95 |
| RV 13 | 223 | 195 | 238 |
| RV 14 | 199 | 168 | 227 |
| RV 15 | 177 | 150 | 219 |
| RV 16 | 170 | 120 | 199 |
| RV 17 | 163 | 84 | 164 |
| RV 18 | 142 | 76 | 167 |
| RV 19 | 125 | 81 | 170 |
| RV 20 | 119 | 50 | 143 |
| RV 21 | 112 | 33 | 102 |
| RV 22 | 103 | 35 | 125 |
| RV 23 | 92 | 30 | 130 |
| RV 24 | 88 | 18 | 102 |
| RV 25 | 207 | 187 | 233 |
| RV 26 | 189 | 154 | 197 |
| RV 27 | 172 | 136 | 198 |
| RV 28 | 151 | 119 | 186 |
| RV 29 | 143 | 91 | 161 |
| RV 30 | 130 | 64 | 123 |
| RV 31 | 114 | 64 | 135 |
| RV 32 | 97 | 59 | 132 |
| RV 33 | 94 | 36 | 107 |
| RV 34 | 83 | 33 | 80 |
| RV 35 | 67 | 28 | 84 |
| RV 36 | 54 | 24 | 87 |
| RV-N 1 | 235 | 227 | 249 |
| RV-N 2 | 219 | 207 | 232 |
| RV-N 3 | 207 | 198 | 224 |
| RV-N 4 | 192 | 182 | 194 |
| RV-N 5 | 168 | 162 | 173 |
| RV-N 6 | 147 | 132 | 142 |
| RV-N 7 | 125 | 115 | 129 |
| RV-N 8 | 108 | 95 | 104 |
| RV-N 9 | 94 | 86 | 101 |
| RV-N 10 | 85 | 74 | 86 |
| RV-N 11 | 76 | 66 | 88 |
| RV-N 12 | 62 | 58 | 72 |
| RV-N 13 | 52 | 47 | 71 |
| RV-N 14 | 44 | 34 | 58 |

| ARTISTS' COLOR SYSTEM | MONITOR | | |
|---|---|---|---|
| | R | G | B |
| N 1 | 250 | 248 | 255 |
| N 2 | 241 | 239 | 252 |
| N 3 | 227 | 225 | 238 |
| N 4 | 209 | 209 | 219 |
| N 5 | 193 | 195 | 205 |
| N 6 | 179 | 183 | 190 |
| N 7 | 163 | 168 | 170 |
| N 8 | 146 | 154 | 150 |
| N 9 | 127 | 138 | 132 |
| N 10 | 110 | 122 | 115 |
| N 11 | 93 | 105 | 97 |
| N 12 | 78 | 90 | 87 |
| N 13 | 67 | 76 | 78 |
| N 14 | 58 | 63 | 67 |
| N 15 | 41 | 41 | 52 |
| N 16 | 27 | 24 | 35 |

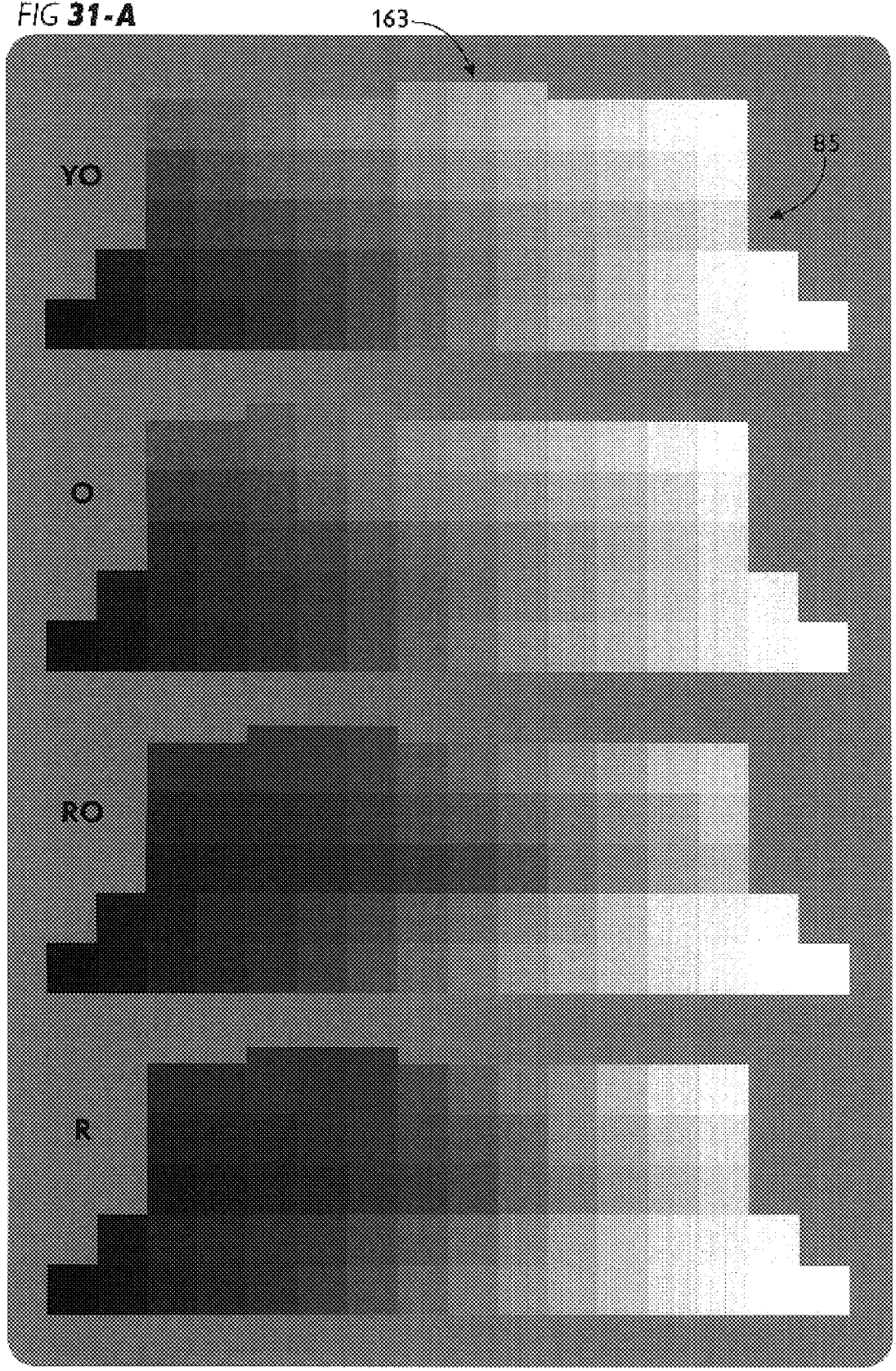
FIG 31-A

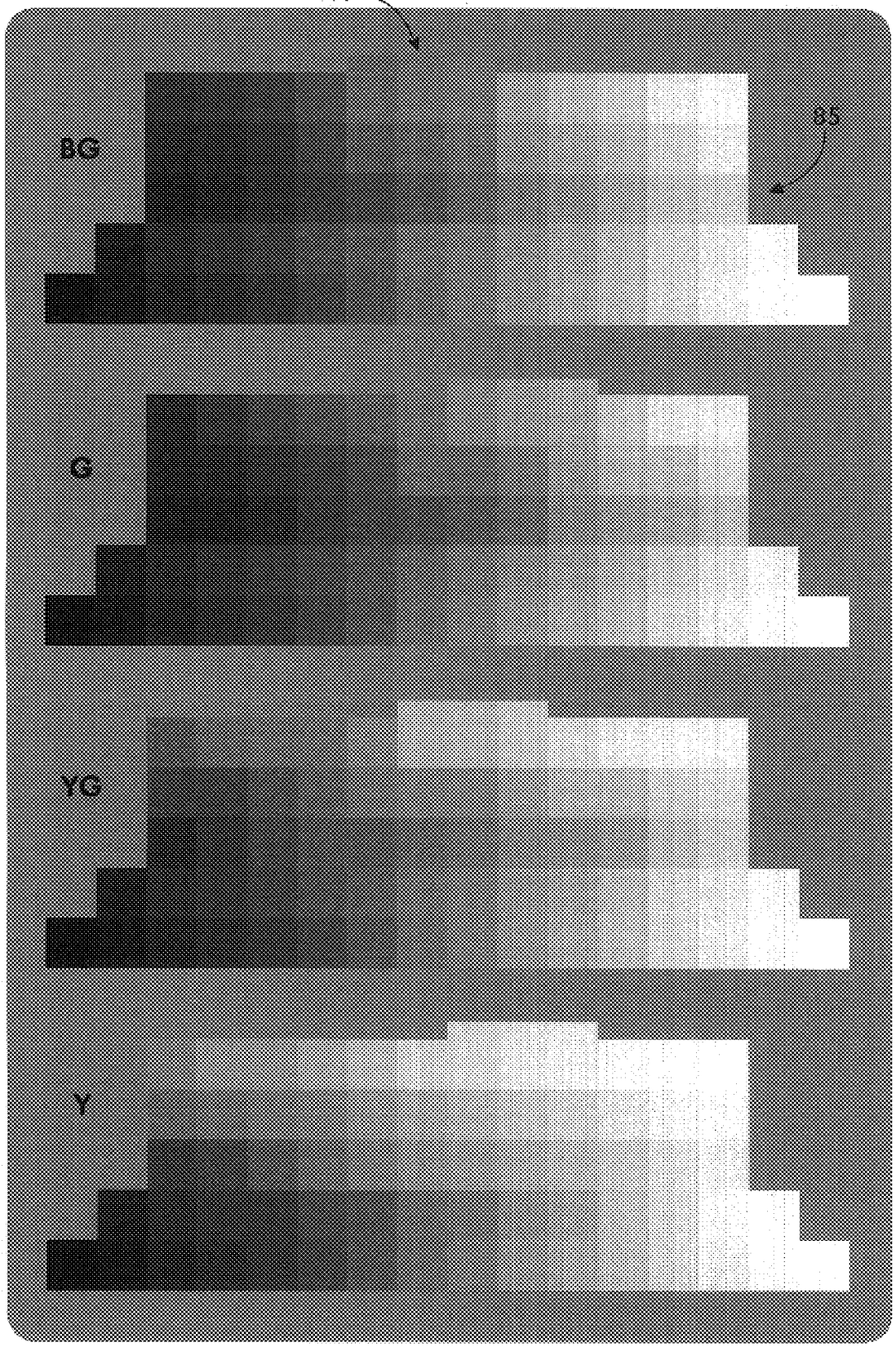
FIG 31-B

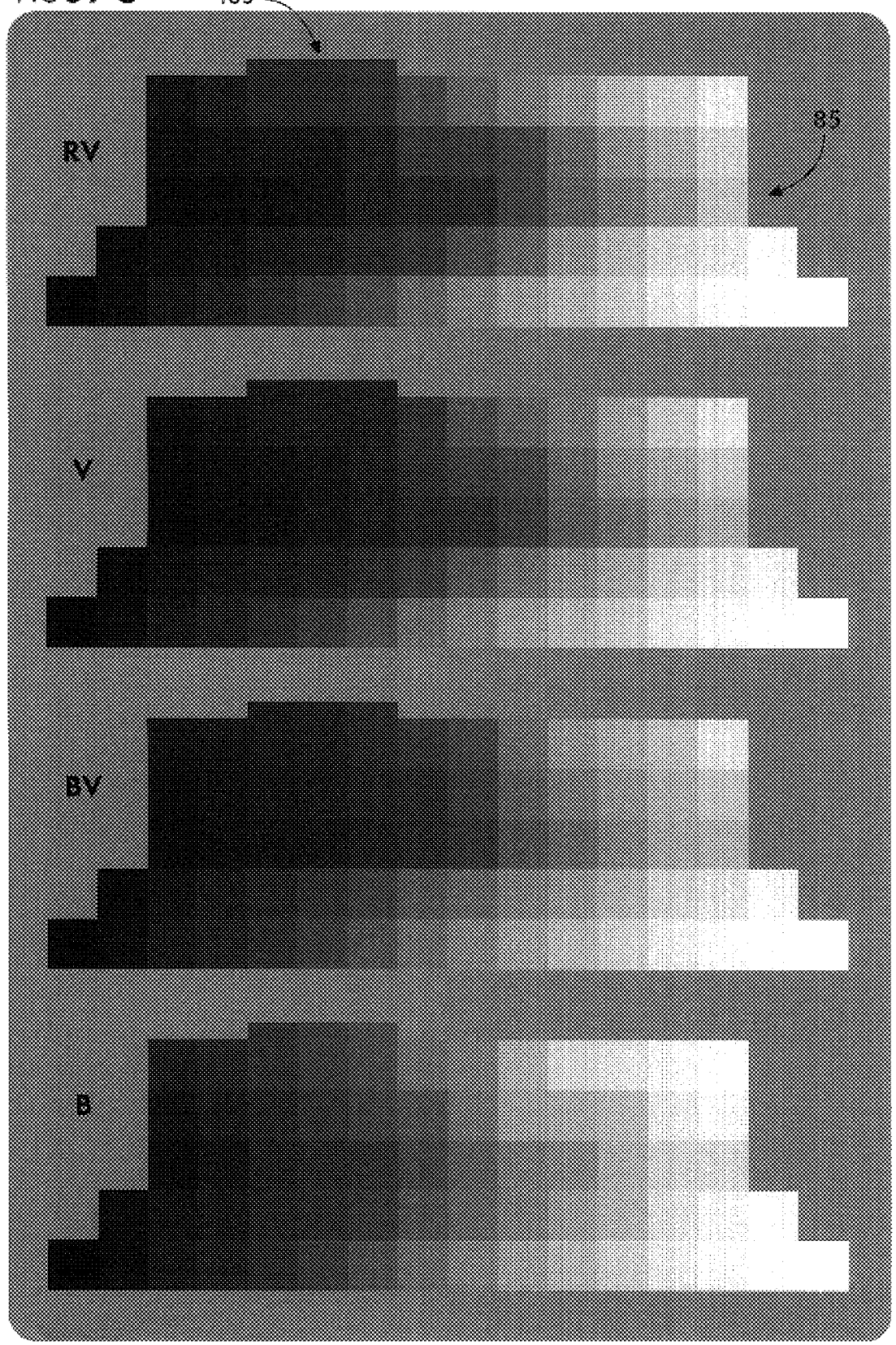
FIG 31-C

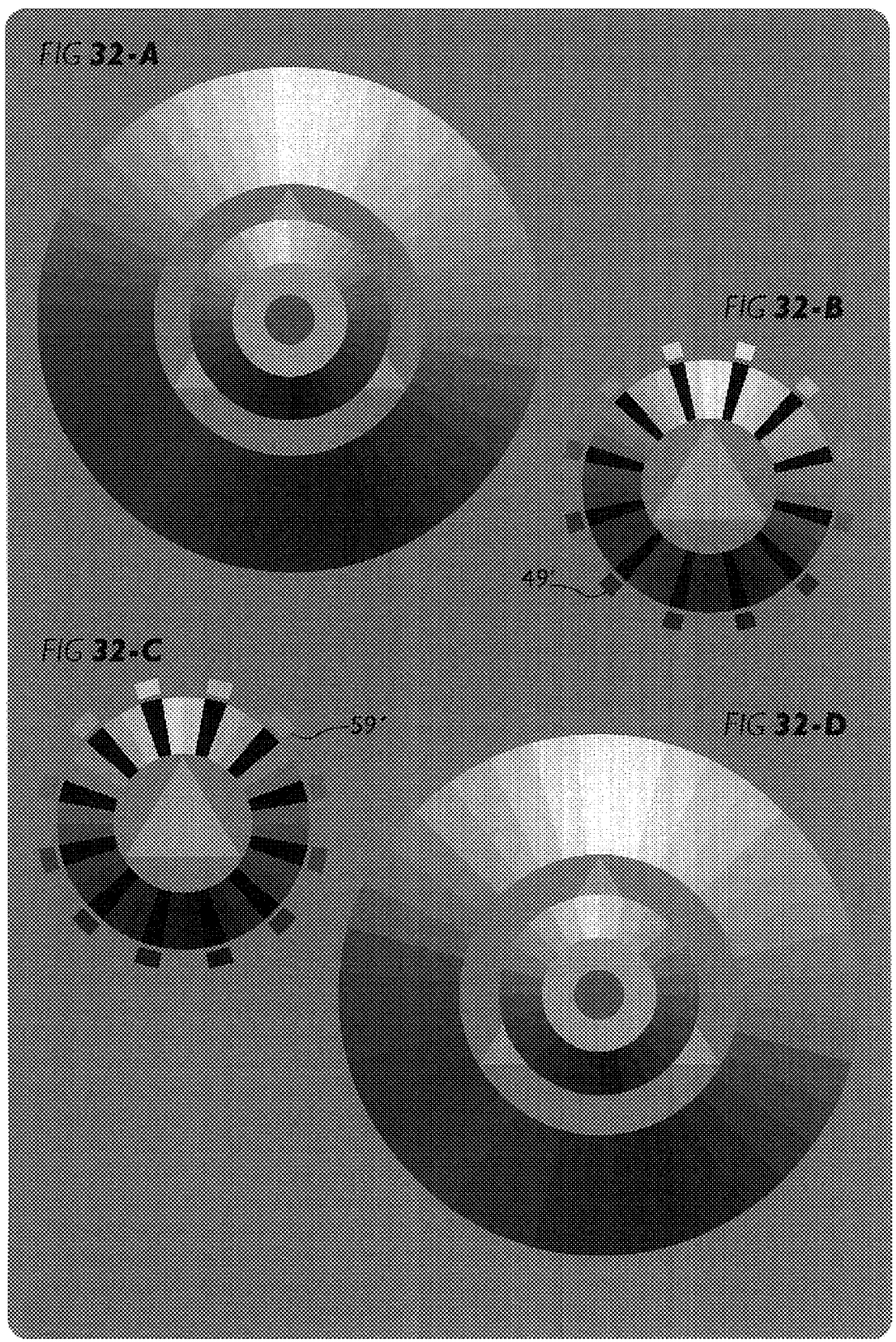

US 7,180,524 B1

ARTISTS' COLOR DISPLAY SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field of Invention

This invention relates to color-appearance systems, specifically to the organization of colors for use by artists.

2. Prior Art

Color-appearance systems are plans by which colors may be defined, arranged, displayed, compared, selected, and in some cases, formulated. Having a color chart, swatch book, or other tabulated reference of displayed color on hand is a convenient way of examining what colors are available. While the human eye is capable of perceiving color with great sensitivity, our color memory is short-lived. Being able to see, compare, and match elements of a color gamut directly can aid an artist or designer in accurately conceiving and assembling color relationships, and in realizing the limits of a specific color medium. Presently there are no color-appearance systems which adequately meet both the traditional and technological needs of today's fine artist. There are ink-based color matching systems tailored to the printing industry and there are pigment-based systems used to specify industrial color matches, but both of these types of systems are too large and complex to be of practical use to the individual working with color on a smaller scale. Also, because these systems are geared toward mass-production colorants, they are not easily adapted to the unique, more expensive, lightfast coloring materials used by artists.

Beyond some published color-mixing recipes and colored paper assortments, no tools are available to aid the artist in effectively dealing with the wide variety of color choices and new media he or she currently encounters, particularly in the realm of computer graphics. Traditional color charts and diagrams, most notably circles and constant-hue charts (FIGS. 1 to 4-B), continue to be useful in providing general color-organizing concepts but often bewilder the artist with a multitude of nonessential color differences.

Personal computer graphics software systems are commercially available and have become increasingly popular with artists, photographers, and other users of digital imaging. A general-purpose graphical user interface (GUI) as used in various computer operating-systems, such as those sold under the trademark, Windows by Microsoft Corporation of Redmond Wash., or Macintosh by Apple Computer, Incorporated of Cupertino Calif., as well as a specialized GUI used within many paint and illustration programs, permits the programmer to designate certain portions of the computer screen as "buttons" which may be "pushed," or color display areas wherein a color may be chosen, or means for displaying "menus" which present lists of actions which can be taken. These on-screen tools are operated by positioning and actuating a pointer device, such as a mouse. When a button, color display area, menu, or other selection device is so actuated, a window is displayed, a color is selected, or some other computer command or interaction is selected and implemented. Choosing a color within this type of GUI is not necessarily easy, however, since the color selection devices (called "color pickers") usually comprise a representative sampling of the over 16 million colors that can be displayed on the computer screen (FIGS. 5-A, 6, and 8-A). To obviate the need to choose from such an overwhelming gamut, another type of color selector in common use is a color swatch set or color palette (FIGS. 5-B, 7, 8-B, and 9). However, the known color palettes and swatch sets, containing relatively smaller assortments of discrete color elements, are not organized in formats with which most artists are comfortable.

The capabilities of GUI programming have become quite sophisticated. For instance, one illustration program (marketed under the trademark CorelDRAW 8 by Corel Corp. of Ottawa, Ontario, Canada) provides a color picker that allows a user to select a color in the normal manner, by placing a mouse's pointer (or cursor) over a color element and "clicking" (i.e., pressing down and quickly releasing a button on the mouse). However, it also has a feature in which the user depresses the button on the mouse and continues to hold it down. This special action (known as a "mouse press") triggers the display of a "popup" palette 160 (FIG. 9) of neighboring colors, allowing the examination and further selection of color variations very close to the originally selected color. The intention of this device is to provide additional ease of use; what is missing is a recognizable organizational framework for artists.

While there are earlier examples of circular color organizations, Newton's (FIG. 1) is generally acknowledged to be the first color circle to accurately present the sequence of the visible spectrum. Published in his Opticks, London 1704, his simple diagram is the precursor to a host of two- and three-dimensional color charts, models, and maps. Of these, three significant circular systems, directed to the artist's use of color, are those of Chevreul, Ostwald, and a color system currently marketed under the trademark Munsell by GretagMacbeth, of New Windsor, N.Y.

Chevreul's pioneering work of 1839, The Law of Simultaneous Contrast of Colors, contains one of the most influential color circles in history (FIG. 2). Based upon the three subtractive (or pigment-based) primaries (red-yellow-blue), Chevreul's circle places complementary colors opposite one another. Because it is subdivided into 72 contiguous hues it is an awkward organizational tool.

Ostwald's color system (FIGS. 3-A and 3-B), introduced in 1917, places 24 hues spaced in equidistant steps on a circular chart (FIG. 3-A). While simpler than Chevreul's color circle, its adherence to Hering's four-color scheme of "psychological" primaries (red-yellow-green-blue) makes the Ostwald arrangement relate more closely to human color vision than to mixtures of pigments.

The widely accepted Munsell color system (FIGS. 4-A and 4-B) has evolved from U.S. Pat. No. 824,374 to Munsell (1906) and U.S. Pat. No. 1,617,024 to Munsell (1927), which disclose circular and constant-hue color charts, and a system of color notation. It is a globally recognized standard for providing a means of color specification. However, in order to express the spectrum with only ten basic hues, its hue circle (FIG. 4-A) radically compresses the "red-orange-range-yellow-orange" range into a single "yellow-red" hue. Consequently, the Munsell color system fails to adequately reflect the full range of pigments available to artists.

Commercial color-appearance systems often build up large numbers of component color samples by basing their range upon the ability of the human eye to differentiate color according to what is called "just noticeable difference." That is, as soon as a color becomes just noticeably different, either in value, saturation, or hue, it becomes an additional color element in the system. (Estimates of the number of color variations that the human eye can differentiate range between 17,000 and 10 million.) For example, the Japan Color Research Institute, Tokyo (1978), provides a color reference system sold under the trademark Chroma Cosmos 5000. This is one of several color reference systems or multi-paged atlases which, by reason of their large quantity of finely-differentiated color elements (numbering in this case 5000), are too complex for general artistic use. Other similar color systems widely accepted in Europe include those sold under the trademark RAL Design System, from the German Institute for Quality Assurance and Certification e.V. of Sankt Augustin, Germany with 1688 colors, and under the trademark Natural Color System, from The Scandinavian Colour Institute of Stockholm, Sweden with 1750 colors.

A color matching and specification system aimed at decorative artists and craftspeople, currently marketed under the trademark TCS Color Matching System by Tru-Color Systems, Inc. of Danville, Ind., USA, diagrams the visible spectrum divided into 108 contiguous hues on a color circle. Organized into the 12 traditional artists' color families, with 3 additional color families (black, white, and brown) organized separately, the software implementation of the system proposes several methods of achieving harmonious color schemes. By subdividing the hues of each of its color families into 9 contiguous steps of both value and saturation, the TCS system contemplates a potential assortment of 10,208 separately identified colors.

Recognizing the impracticality of choosing visually from among the over 16 million colors available in the typical computer program, U.S. Pat. No. 5,903,255 to Busch et al. (1999) discloses a hexagonal-honeycomb color picker aimed at simplifying computer color selection. Since users generally prefer to select colors by seeing them, rather than by specifying numerical values, and since the smoothly-blended colors presented by some computer programs for color selection have the disadvantage of not allowing the user to visualize or pick a discrete color, the system of this patent utilizes a diagram of honeycomb-cells for displaying a small subset of predetermined colors. The subset, however, comprises only 144 distinct colors, and such an abridged representation of the computer color gamut, while suitable for selecting colors for maps, charts, and business graphics, is inadequate for artistic use.

U.S. Pat. No. 5,254,978 to Beretta (1993) discloses a reference color selection system which creates palettes of calorimetrically measured colors, including artists pigments, and arranges them in a database for access and use in computer graphics programs. The interface with which colors are selected, however, is not formatted in an arrangement of color familiar to artists. This system also takes into account that some strongly saturated artists' colors will fall outside the calibrated monitor's gamut, and their coordinates will need to be modified with suitable gamut mapping or clipping algorithms to bring them back within the boundary of what can be displayed on screen with relative accuracy.

Another U.S. Pat. No. 5,311,212 to Beretta (1994), shows a system, typical of many other prior-art systems, that automatically generates computer color choices for unskilled color users. This patent is incorporated by reference for providing an excellent exposition of the computing environments and methods in which digital color palettes are referenced by onscreen color selection devices, in this case according to algorithms for choosing and displaying harmonious color schemes. However the formulaic theory of color harmony on which these algorithms is based provides only trite color combinations unsuited to most fine arts applications.

In contrast to large, complicated color systems, many patents have issued which organize simplified arrangements of artists' colors according to a single diagram. U.S. Pat. No. 1,805,520 to Grumbacher (1931), for example, is a watercolor palette which places the three subtractive primaries (red-yellow-blue) on a twelve-hued circle. While an efficient format for organizing basic, wet-media elements, this palette has no provision for arranging more comprehensive color assortments.

Another simple palette, disclosed in U.S. Pat. No. 5,209,664 to Wilcox (1993), proposes that the three traditional, subtractive primaries are inadequate for color mixing. Postulating that red, yellow, and blue are never true primaries, but that each always exhibits either a warm or cool bias, Wilcox offers a six-primary format as a more comprehensive arrangement, which overcomes such biases. Hence his palette accommodates three pairs of "biased" primary colors, i.e., an orange-red and a violet-red pair, an orange-yellow and a green-yellow pair, and a green-blue and a violet-blue pair. No accommodation is made, however, for including median primaries, that is primaries which have no perceptible warm or cool bias. Also, as in the Grumbacher patent, supra, and other similar palettes, no provision is made for arranging larger color assortments.

Of all patents which have issued addressing color aesthetics and artistic use, a few are directed specifically to the organization and production of artists' colorants:

For example, U.S. Pat. No. 918,068 to Maratta (1909), discloses color charts presenting the spectrum of artists' pigments in mixtures of two saturation levels. These charts aid the artist in the selection of harmonious color combinations. Maratta's self-manufactured line of paints, containing 24 equally-spaced hues (red, red-red-orange, red-orange, red-orange-orange, orange, etc.), and accompanying formulas for achieving color harmony, was advocated by a renowned painting teacher, Robert Henri. The Maratta system enjoyed a brief period of popularity, but was eventually rejected by Henri's students as being too technical.

U.S. Pat. No. 3,628,260 to Jacobson (1971) and U.S. Pat. No. 3,722,109 to Jacobson (1973) disclose a color mixing system which proposes that predicted color results are most easily achieved by mixing like values of colors together. A 35-color assortment of paints based on this patent was manufactured in both oil and acrylic and marketed under the trademark Modular by Permanent Pigments, a division of Binney & Smith, Inc., of Cincinnati, Ohio. It failed commercially, largely because of the perception that buying 35 premixed values of just ten different hues was neither economical nor convenient. The chief ingredient in many of the paints was white or gray, and the complete system required an unnecessary number of paint tubes e.g., four tubes of blue, where one would do.

More recently, an approach to artists' colors is proposed by U.S. Pat. No. 5,033,963 to Bourges (1991) and U.S. Pat. No. 5,161,974 to Bourges (1992) which disclose, respectively, a 20-hued color system, and an improvement in which its colors lie entirely within the gamut of standard four-color offset printing. Consequently, to insure reliable color reproduction, this system requires the artist to abandon the broad gamut of traditional pigments, and use instead 20 hues, all derived from the four process colors (cyan, magenta, yellow, and black).

In my previous U.S. Pat. No. 5,860,518 (1999) 1 disclose a computer-displayed color picker based on a compartmented pastel case. In arranging pastel colors within each color compartment, I suggest that the introduction of minor warm and cool variations of the basic hue be allowed in order to add vitality to the resulting color assortment, however I describe no system for defining the extent of these variations.

Other prior-art color systems, charts, and color atlases share many of the general disadvantages cited above. These include needless complexity (or, on the opposite hand, oversimplification), barely distinguishable color variations, inflexible organization, and a restrictive adherence to the limitations of a particular medium or technology. A color-appearance system for modern, practical artistic use should, however, neither overwhelm by sheer number, or subtlety, of choices, nor surrender to the limitations of standard color display and reproduction processes, but instead offer a concise, flexible format for organizing a representative sampling of the wider color universe present in whatever color medium the artist has chosen.

The color system of the present invention addresses these goals and others by redefining the artist's twelve color families, and providing an improved organizational format for traditional coloring materials as well as the colors produced by current technologies.

OBJECTS AND ADVANTAGES

Accordingly, several objects and advantages of my invention are:

(a) to provide an improved color-appearance system which organizes a collection of color standards most useful to artists;

(b) to provide a practical color-appearance system capable of arranging any color medium into a compact, well-organized assortment of strategically selected color elements;

(c) to provide a color-appearance system which fully represents the visible spectrum within an easily managed number of color families;

(d) to provide a color-appearance system whose color families, and constituent color elements, are significantly distinguishable from one another;

(e) to provide a color-appearance system which presents a pair of warm and cool boundary-hues alongside a central, "unbiased" median-hue within specified color families;

(f) to provide a color-appearance system organized in a format familiar to artists;

(g) to provide a color-appearance system whose format is adapted to effectively organize and present color on various digital or other types of electronic display; and (h) to provide a color-appearance system with a color assortment of such moderate size that the accumulated quantity of individual color elements can be conveniently viewed and used in a single chart, digital or electronic display, or physical arrangement.

Further objects and advantages are:

(a) to provide a color-appearance system which exhibits increased color variety by defining a distinctive range of hues within specified color families;

(b) to provide a color-appearance system which enhances color comparison and selection by configuring ranges of hues in prescribed patterns;

(c) to provide a color-appearance system whose color elements can be indexed to and represented by color samples in the form of atlases, swatch books, paint chips, colored papers, computer print-outs, digitally specified on-screen color palettes and selection devices, and other color display means which allow direct, side-by-side color comparison;

(d) to provide a color-appearance system whose color elements can be indexed to and used for specifying fixed-color media such as pastels, mosaic tiles, beads, textiles, and stained glass;

(e) to provide a color-appearance system which, when indexed to color formulation tables, enables its color elements to be matched by means of a variety of mixable media such as pastels, oils, acrylics, and gouache;

(f) to provide a color-appearance system whose color elements, when indexed to digitally displayed colors, link traditional coloring materials to relatively equivalent, on-screen colors for use in computer graphics, tutorial, and database programs;

(g) to provide a color-appearance system which, by indexing color elements to formulas, establishes a database that facilitates the mixing and matching of custom colors, and color combinations, and the recording, tabulation, and transmission of formulas for duplicating such color mixtures, matches, and combinations in a variety of media; and (h) to provide a color-appearance system which is suited to the selection, organization, and use of artists' colors for projects and applications typical of fine arts, and crafts, using traditional materials and techniques, but which may also aid in the selection, organization, and use of professional- and consumer-grade coloring materials in connection with home decorating, architectural design, commercial reproduction, and color merchandising, as well as various other products and services.

Still further objects and advantages will become apparent from a consideration of the ensuing description and drawings.

SUMMARY

My color-appearance system organizes, through various charts, a comprehensive sampling of the visible spectrum into a relatively small number of discrete color elements. A bi-radial Circular Color Chart, by excluding some saturation levels and hue sectors, distinctively defines a neutral core surrounded by color families whose components have prescribed ranges of hue and saturation. A Columnar Chart sets the format for organizing individual color elements within each color family. A series of prescribed patterns are used to arrange color elements in "variant-hue" charts. The variant-hue charts consolidate sampled color elements, and enhance both color comparison and color selection within each respective color family by displaying variations of all three color attributes, that is, value, saturation, and hue, simultaneously. A color picker, arranged in accordance with the system, is used to display and select color elements organized in color families on a computer screen.

DRAWING—FIGURES

The patent or application file contains at least one drawing executed in color. Copies of this patent or patent application publication with color drawing(s) will be provided by the Office upon request and payment of the necessary fee.

In the drawings, closely related figures have the same number but different alphabetic suffixes.

Figure 1:
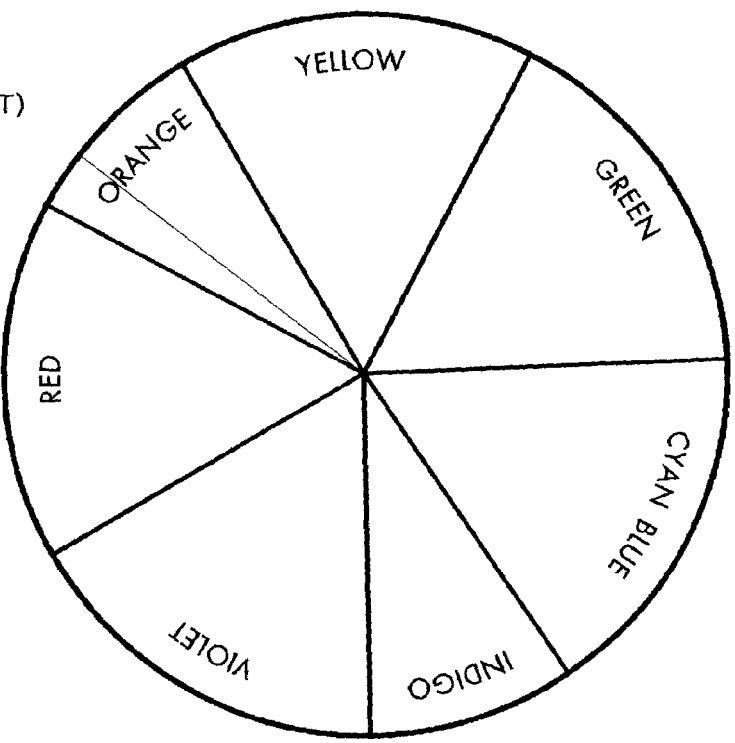
FIG. 1 (prior art) shows a color circle according to Newton.

FIG. 3-A (prior art) shows a color circle according to Ostwald.

FIG. 3-B (prior art) shows a constant-hue chart according to Ostwald.

FIG. 4-A (prior art) shows a color circle according to the Munsell color system.

FIG. 4-B (prior art) shows a constant-hue chart according to the Munsell color system.

FIG. 5-A (prior art) shows a diagram of the "Standard Color palette" from the computer paint program Painter 7 published by Corel Corp. of Ottawa, Ontario, Canada.

FIG. 5-B (prior art) shows a diagram of the "default color set" from the computer paint program Painter 7 published by Corel Corp. of Ottawa, Ontario, Canada.

FIG. 6 (prior art) shows a diagram of the computer-displayed Adobe Color Picker published by Adobe Systems, Inc., San Jose, Calif., USA.

FIG. 7 (prior art) shows a diagram of the computer-displayed "browser-safe" palette, a standardized computer color assortment for use with various Internet browsers.

FIG. 8-A (prior art) shows a diagram of the computer-displayed Apple Color Picker published by Apple Computer, Inc., Cupertino, Calif., USA.

FIG. 8-B (prior art) shows a diagram of the Crayon Picker, a computer-displayed color palette published by Apple Computer, Inc., Cupertino, Calif., USA.

FIG. 9 (prior art) shows a diagram illustrating the "neighboring colors" selection feature of the color palette from the computer illustration program CorelDRAW 8 published by Corel Corp. of Ottawa, Ontario, Canada.

FIG. 10-A shows a bi-radial Circular Color Chart which diagrams the hue and saturation of color families within three active color areas of the present system.

FIG. 10-B (detail of FIG. 10-A) shows division points and organization of a neutral-hue color circle of the present system.

FIGS. 10-C and 10-D show color renditions of FIGS. 10-A and 10-B, respectively.

FIG. 11-A shows a Columnar Chart which diagrams, according to the present system, a columnar organization of color elements within a main color family, a neutral-hue color family, and a neutral-gray color family.

FIG. 11-B shows a color rendition of FIG. 11-A.

FIG. 12-A is a diagram showing three constant-hue charts, respectively representing colorant samplings, according to the present system, of a main color family's median- and boundary-hues.

FIG. 12-B is a diagram showing, according to the present system, a set of consolidation patterns corresponding to the three constant-hue charts shown in FIG. 12-A.

FIG. 12-C is a diagram showing, according to the present system, a variant-hue chart which is derived from the charts shown in FIG. 12-A and the set of consolidation patterns shown in FIG. 12-B.

FIG. 12-D is a diagram showing, according to the present system, an alternative variant-hue chart which may be derived from a set of constant-hue charts alternative to those shown in FIG. 12-A and a set of consolidation patterns alternative to those shown in FIG. 12-B.

FIGS. 12-E to 12-H are color renditions of FIGS. 12-A to 12-D, respectively.

FIG. 13-A is a diagram showing, according to the present system, a set of constant-hue charts respectively representing colorant samplings of a neutral-hue color family's two boundary-hues.

FIG. 13-B is a diagram showing, according to the present system, a set of consolidation patterns corresponding to the two constant-hue charts shown in FIG. 13-A.

FIG. 13-C is a diagram showing, according to the present system, a variant-hue chart which is derived from the charts shown in FIG. 13-A and the set of consolidation patterns shown in FIG. 13-B.

FIGS. 13-D to 13-F are color renditions of FIGS. 13-A to 13-C, respectively.

FIG. 14-A is a diagram showing a color-family display which, by juxtaposing the variant-hue charts of FIGS. 12-C and 13-C with the neutral-gray color family shown in FIG. 11-A, forms a display configuration of color families.

FIG. 14-B is a color rendition of FIG. 14-A.

FIG. 15-A is a diagram showing the points at which the present system samples colorant gamuts in a strongly-saturated manner.

FIG. 15-B is a diagram showing the points at which the present system samples colorant gamuts in an alternative manner.

Figure 16:
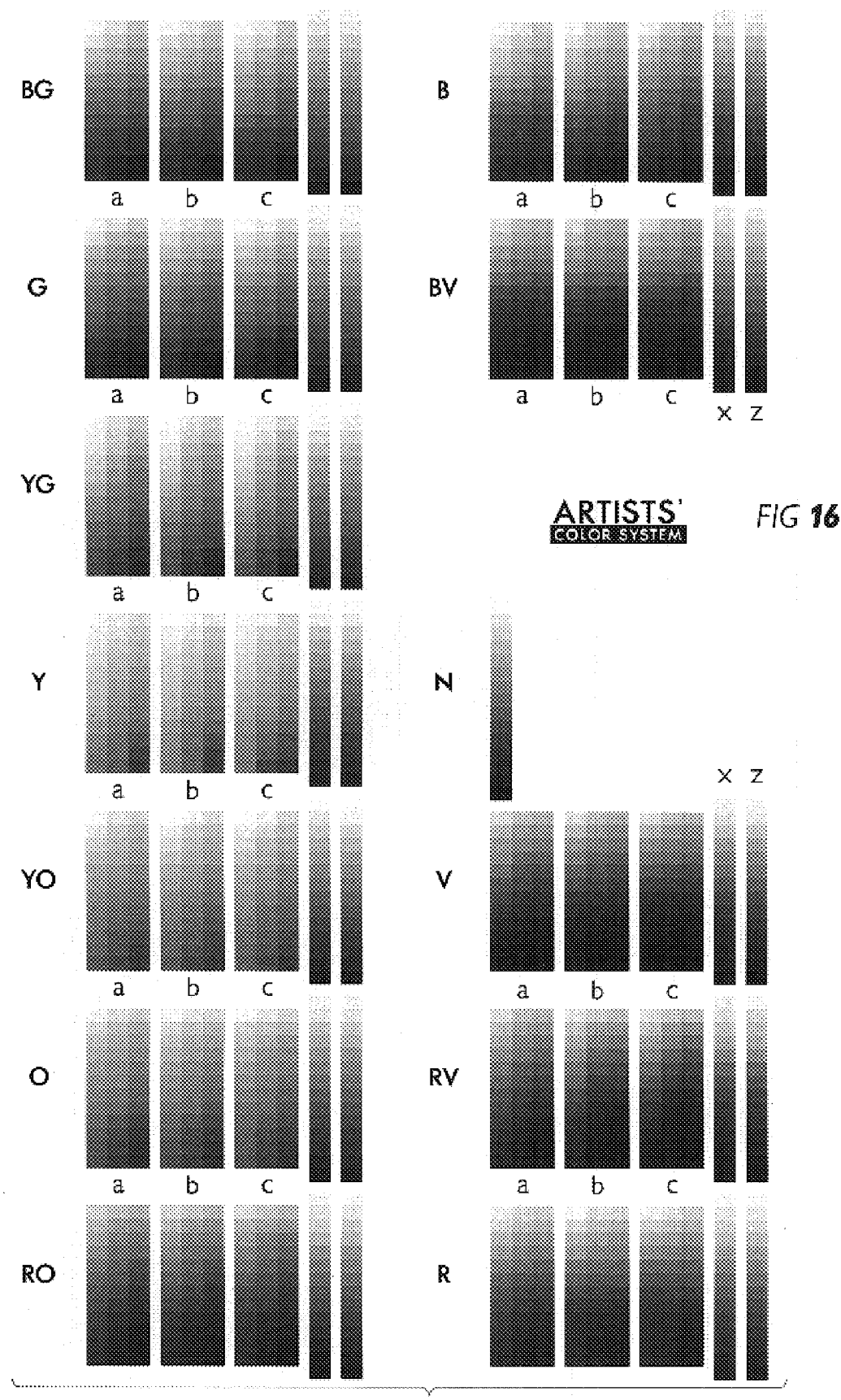

FIG. 16 is a diagram showing an assemblage of constant-hue charts of color families, according to the present system, representing the visible spectrum as a comprehensive table of 1648 color elements.

FIG. 17-A is a Color Map showing, according to the present system, each respective main and neutral-hue color family's variant-hue chart grouped together, and assembled, along with the neutral-gray color family, in a representation of the visible spectrum as an assortment of 616 key color elements.

FIG. 17-B is a color rendition of FIG. 17-A.

FIG. 18-A illustrates physical embodiments, which also may be simulated in the GUI shown on a computer display, of the organizational format of a main color family arranged according to the present system.

FIG. 18-B is a color rendition of FIG. 18-A.

FIG. 19-A is a diagram showing hues of the color families of the present system arranged on the painter's color triangle.

FIG. 19-B is a color rendition of FIG. 19-A.

Figure 20:
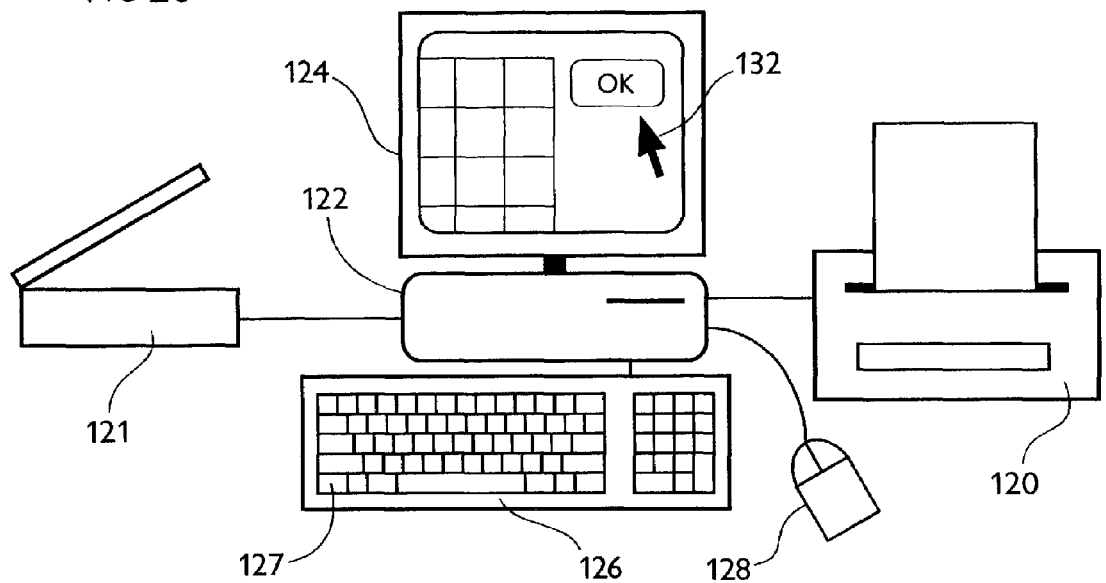

FIG. 20 is a diagram of a typical computer-based image processing system.

Figure 21:
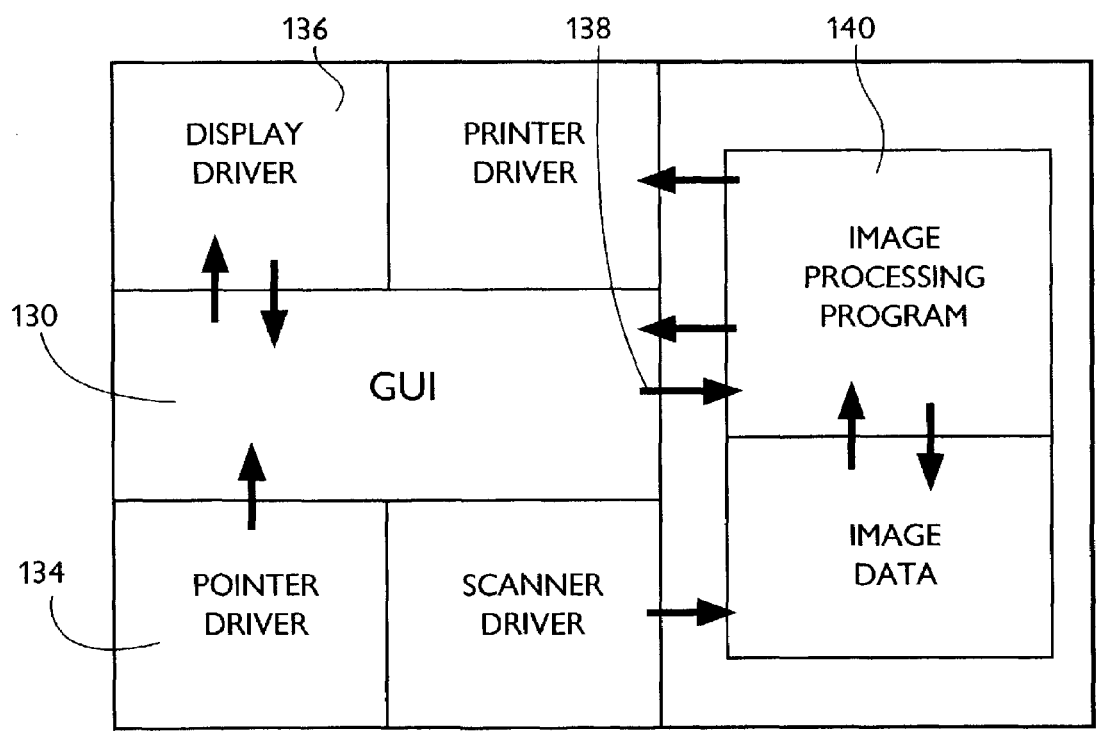

FIG. 21 is a block diagram of various routines associated with a preferred embodiment of a computer-displayed color picker of the present system.

FIG. 22-A shows an embodiment of a computer-displayed color picker whose color elements, organized in a color family display according to the present system, are respectively displayed by actuating a color-family tab, and in which a "hue-range gadget" may be actuated to display and select correspondingly-located color elements from each of the color family's constant-hue charts.

FIG. 22-B shows an embodiment of a computer-displayed color picker whose color elements are organized in a color family display according to the present system, and which may be respectively displayed by actuating a "button" of a color circle.

FIG. 22-C shows an embodiment of a computer-displayed color picker whose color elements are organized in a color family display according to the present system, and which may be respectively displayed by actuating a "button" of a color triangle.

FIG. 22-D (partial cutaway view) shows the portion of an embodiment, according to the present system, wherein color family displays may be respectively selected and displayed by actuating a "button" of a color hexagon.

FIG. 22-E is a diagram of a color family's constant-hue charts, arranged to show the color elements which can be displayed in a "hue-range gadget."

FIG. 22-F is a flow diagram illustrating the "multi-display mode" operation of color pickers, arranged according to the present system, shown in FIGS. 22-A to 22-C.

FIGS. 23-A to 23-D show alternative embodiments of computer color pickers, arranged according to the present system, in which palette selection panels contain arrays of buttons which when activated cause the display of corresponding color-element selection palettes.

FIG. 23-E shows a prescribed array of keys on a computer keyboard used for selecting color families, according to the present system.

FIG. 23-F is a flow diagram illustrating the operation, in "multi-display mode," of color pickers arranged according to the present system, shown in FIGS. 23-A to 23-D.

FIG. 23-G is a flow diagram illustrating the keyboard operation of a color picker, arranged according to the present system, shown in FIGS. 22-A to 22-C.

FIG. 23-H is a flow diagram illustrating the keyboard operation of alternative computer color pickers arranged according to the present system, and operating in "multi-display mode" as shown in FIGS. 23-A to 23-D.

Figure 24:
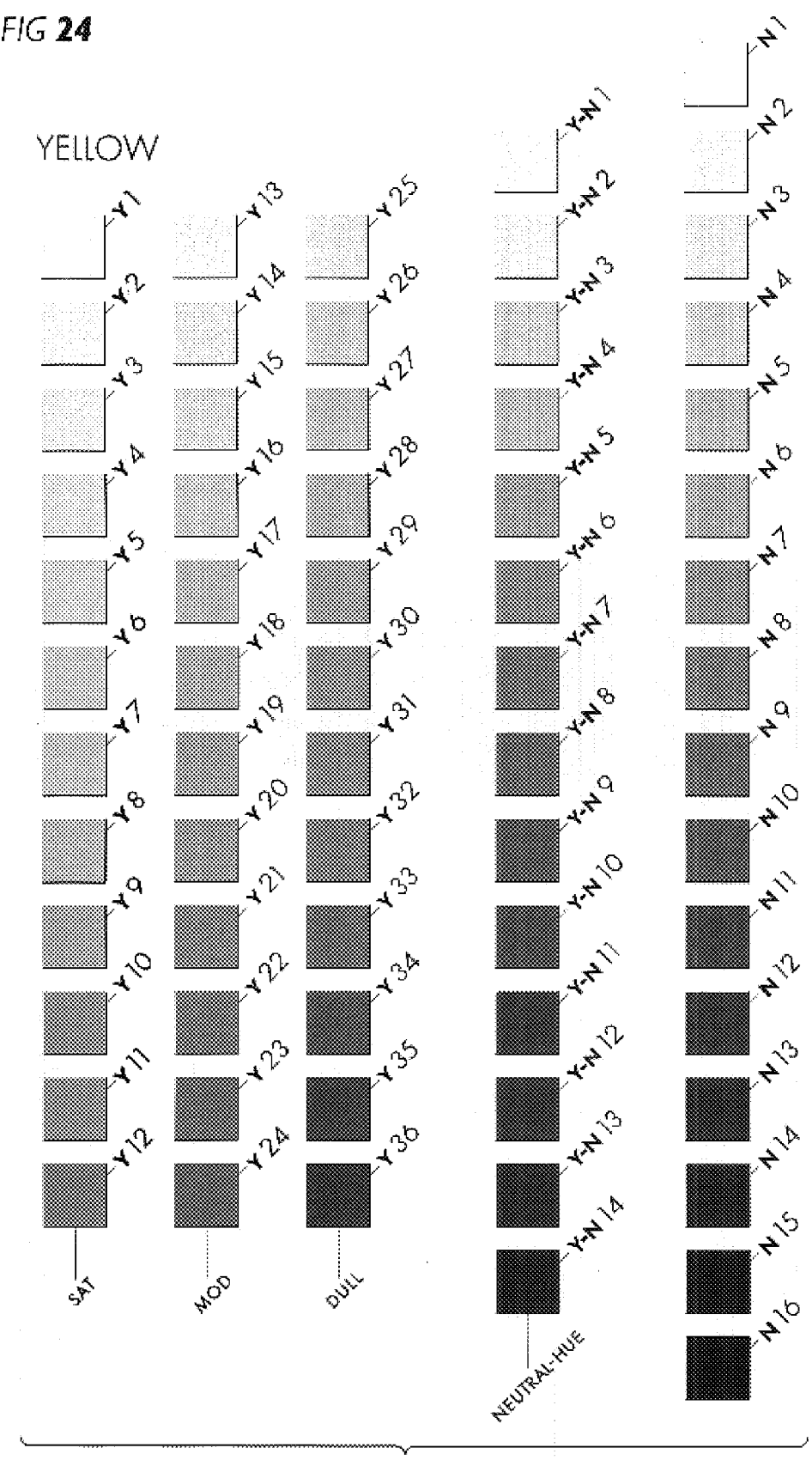

FIG. 24 shows the layout and identifying notation of color elements on a page of a color atlas of a main color family, a neutral-hue color family, and the neutral-gray color family, according to the present system.

Figure 25:
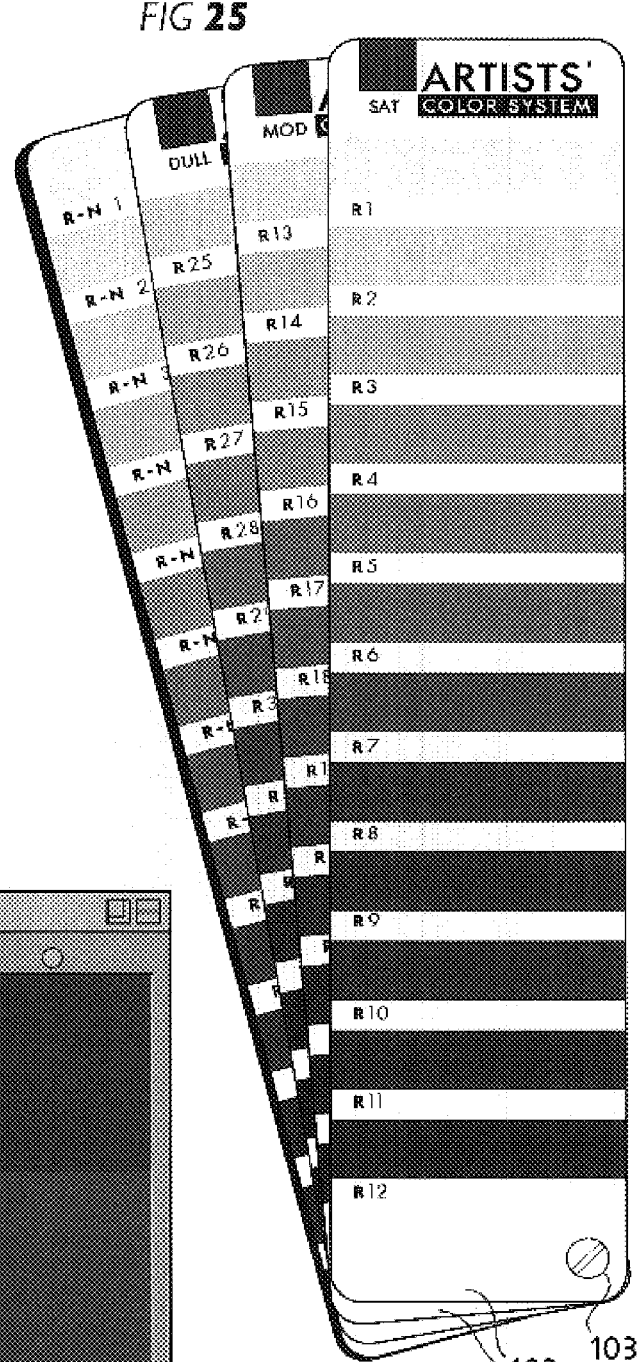

FIG. 25 shows the layout of a fan-fold swatch book which displays color elements of the present system.

Figure 26:
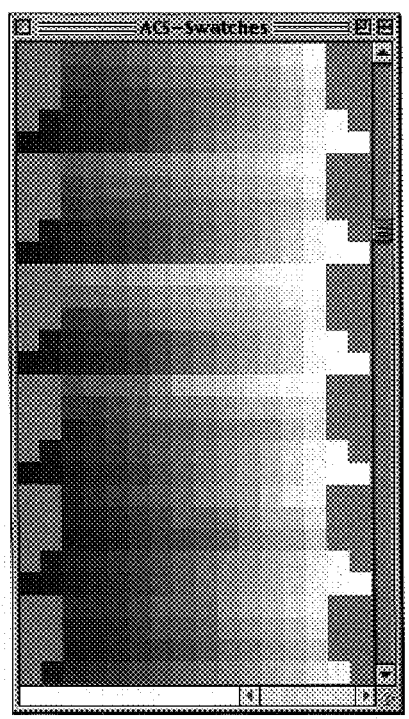

FIG. 26 shows a computer "window" displaying a color swatch set containing color elements in the format of the present system.

Figure 27:
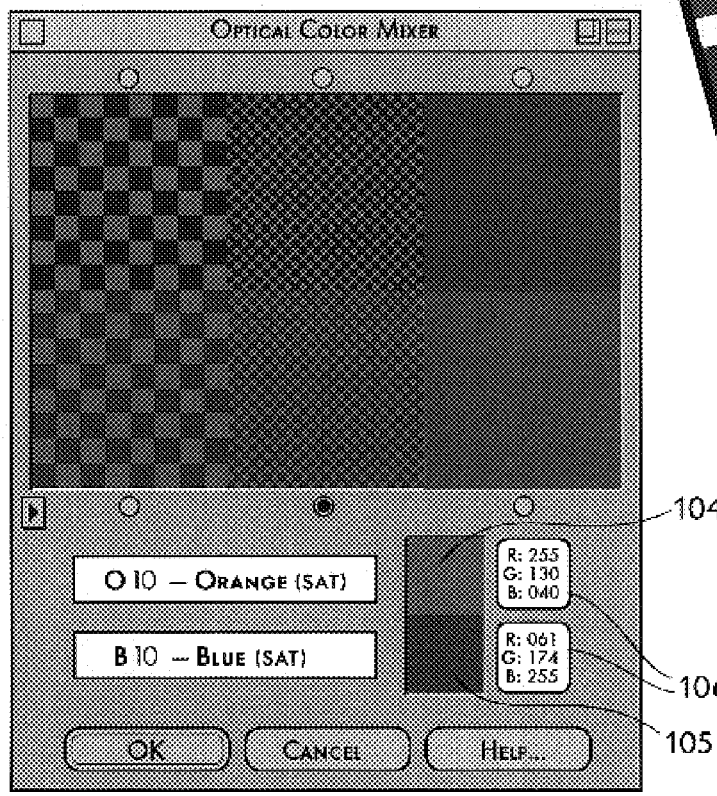

FIG. 27 shows a preferred embodiment of a computer-displayed optical color mixer displaying two colors of the present system in a checkerboard pattern.

FIGS. 28-A to 28-M show the RGB numerical data, according to the present system, for accurately displaying color elements of the Color Map (FIGS. 17-A and 17-B) on the screen of a calibrated color monitor.

Figure 29:
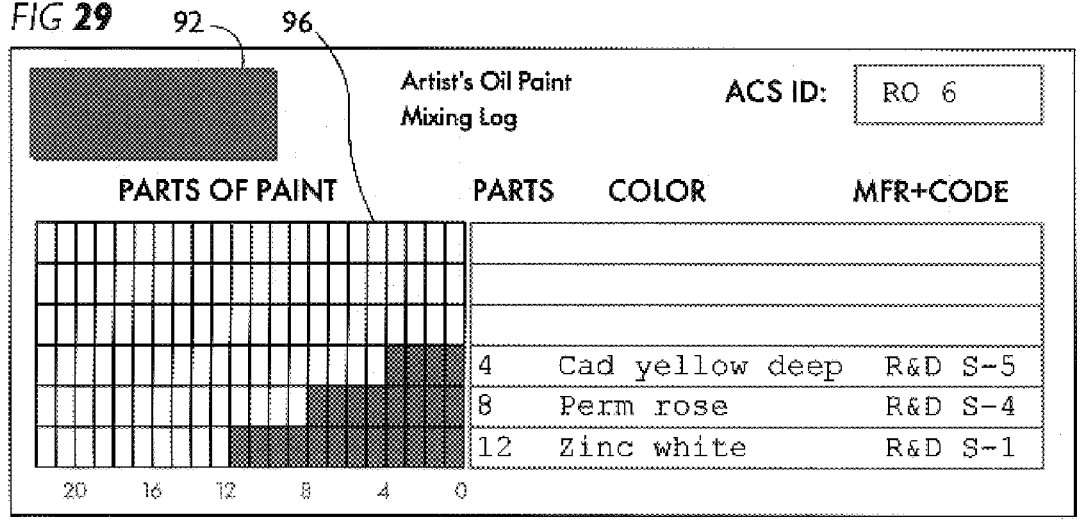

FIG. 29 shows a form for recording or presenting color formulation information for matching, with mixable-media, specified color elements of the present system.

Figure 30:
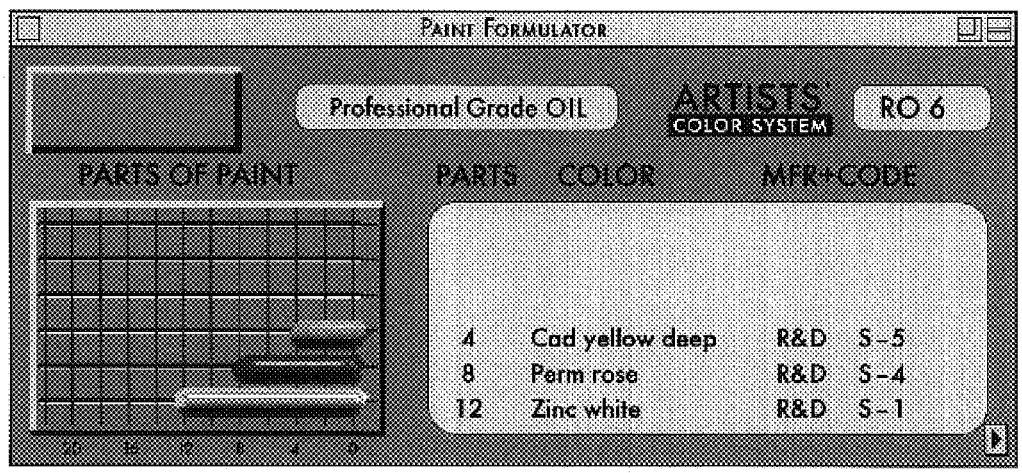

FIG. 30 shows a computer-displayed form which presents the color formulation information shown in FIG. 29.

FIGS. 31-A to 31-C show enlarged color renditions of the key color elements of the Color Map of FIGS. 17-A and 17-B organized into color families, each of which are respectively arranged in a color-family display according to the present system.

FIG. 32-A shows a main color circle of 48 hues, and a neutral-hue color circle of 36 hues.

FIG. 32-B diagrams the removal of 12 excluded-hues from the main color circle of FIG. 32-A.

FIG. 32-C diagrams the removal of 12 excluded-hues from the neutral-hue color circle of FIG. 32-A.

FIG. 32-D shows the main color circle and neutral-hue circle, according to the present system, reconstituted after the excluded-hues have been removed.

REFERENCE NUMERALS IN DRAWINGS 1 fully saturated hue
2 tint
3 tone
4 shade
10 colorant mixture gamut
11–14 touch-points
15 strongly-saturated color sample
16 weakly-saturated color sample
18 general hue sector
20 main color family
21 boundary-hue (a)
22 median-hue (b)
23 boundary-hue (c)
25 main active hue range
26 main excluded-hue range
27 main color circle division points
28 midway points
30 neutral-hue color family
31 neutral-hue boundary-hue (x)
32 neutral-hue boundary-hue (z)
33 neutral-hue active hue range
34 neutral-hue excluded-hue range
35 neutral-hue color circle division points
37–39 non-sampled areas
40 color elements
41 left boundary-hue constant-hue chart
41' left boundary-hue consolidation pattern
42 median-hue constant-hue chart
42' median-hue consolidation pattern
43 right boundary-hue constant-hue chart
43' right boundary-hue consolidation pattern
44 main variant-hue chart
45 main variant-hue chart (alternative)
46 left neutral-hue constant-hue chart
46' left neutral-hue consolidation pattern
47 right neutral-hue constant-hue chart
47' right neutral-hue consolidation pattern
48 neutral-hue variant-hue chart
49 main excluded-hue sector
49' main excluded-hue
50 main color circle
51 main color family columns
52 main color family saturated column
52' saturated color sample
53 main color family modified column
53' modified color sample
54 main color family dull column
54' dull color sample
55 inactive color area (outer)
56 row of color elements
57 primary point of gamut
59 neutral-hue excluded-hue sector
59' neutral-hue excluded-hue
60 neutral-hue color circle
61 neutral-hue color family column
61' neutral-hue color family sample
63 equilateral triangle
65 inactive color area (inner)
68 NearPrimaries™ color set
70 neutral core
71 neutral-gray color family column
71' neutral-gray color family group
72 color-element selection palette
73 palette selection panel
74 color closest to target color
75 target color
76 second color to mix target color
77 color family group
78 new-color
79 current-color
80 hue-range gadget
81 color-family tab
82 correspondingly-located color elements
83 general hue sector selection area
84 color element selection area 85 color-family display
86 color circle button
87 color circle array
88 painter's triangle button
89 painter's triangle array
90 group of main constant-hue charts
91 group of neutral-hue constant-hue charts
92 specified red-orange
93 color hexagon button
94 color hexagon array
95 color-diagram buttons
96 bar chart
97 toolbar
98 color rectangle button
99 color rectangle array
100 array of keys
101 color-family selection key
102 fan book page
103 connector
104 orange
105 blue
106 data display windows
110 main and neutral-hue only palette
112 main only palette
114 palette menu
115 palette menu button
118 palette selection panel menu
119 palette selection panel menu button
120 printer
121 scanner
122 computer
124 color monitor
126 keyboard
127 prescribed command key
128 mouse
130 GUI
132 pointer
134 pointer driver
136 display driver
138 control signal inputs
140 image processing program
142 small color elements tray
143 paint-pan palette
150 hue selection circle
152 constant-hue triangle
154 hue selection bar
156 constant-hue square
157 circular field
158 value slider
160 "popup" palette of neighboring colors
163 prescribed hue-range color elements
170–212 flowchart steps

DETAILED DESCRIPTION—OVERALL SYSTEM

According to the invention, my system provides samples of the visible spectrum as an assortment of discrete color elements. These color elements are selected and arranged according to the three well-known attributes of color, i.e., hue, value, and saturation: Hue, in scientific terms, is the wavelength of light reflected from, transmitted through, or emitted by an object. It also is the name of a color such as "red," "violet," or "green." Value is the darkness or lightness of a color relative to a scale of neutral or achromatic (colorless, having no hue) grays ranging from black to white. Saturation (also called chroma) is the purity or strength of a color's hue relative to a neutral gray of similar value. It is often indicated as a percentage from 0% (completely neutral), e.g, the just-mentioned neutral gray scale, to 100% (fully saturated) which indicates a pure hue, without any white, gray, or black added to it. (Saturation is well-illustrated by Ostwald's constant-hue chart [FIG. 3-B] which diagrams the intermediate levels of saturation achieved in pigment mixtures by combining a fully saturated hue 1 with various proportions of white, gray, and black to respectively create a series of tints 2, tones 3, and shades 4.) Since artists working with traditional media must effectively manage their coloring materials in actual physical locations, the present system provides a color assortment numbering in the hundreds, not thousands as in many other color systems. To achieve such a moderate size, while maintaining a wide range of variation, the preferred embodiment, as will be explained later, reduces a total of 1648 strategically sampled color elements into a configuration of 616 key color elements. The number of color elements specified here is used only as an example and may vary depending upon the characteristics of different media.

The system uses three major charts to selectively organize and present a comprehensive assortment of key color elements. First, a Circular Color Chart (FIGS. 10-A and 10-C) divides the spectrum into discrete hues, and defines groups of selected hues as color families. It also defines and establishes three general saturation levels. Second, a Columnar Chart (FIGS. 11-A and 11-B) sets the format for respectively organizing individual color elements within each of the color families defined by the Circular Color Chart. Third, a Color Map (FIGS. 17-A and 17-B) shows an ultimate assortment of key color elements grouped in color families.

FIG. 19-A is an alternative chart, derived from the Circular Color Chart (FIG. 10-A), which diagrams the hues of the system's color families on a painter's triangle. Other charts and diagrams show the system's method of sampling colorant gamuts and consolidating specified color elements into color families (FIGS. 12-A to 15-B), as well as various physical and digitally-displayed embodiments of these assortments of color elements grouped in color families (FIGS. 16 to 18-B, FIGS. 22-A to 22-D, FIGS. 23-A to 23-D, FIGS. 24 to 26, and FIGS. 31-A to 31-C).

Before considering the system's organization of color elements within color families, I will describe the overall arrangement and definition of color families, by saturation and hue. This is accomplished by the Circular Color Chart (FIG. 10-A) which differs significantly from the circles shown in the prior-art diagrams of FIGS. 1, 2, 3-A, and 4-A. These circular charts devised by Newton, Chevreul, Ostwald, and the Munsell color system, respectively, organize their colors into radial configurations in which (aside from Newton's simple color circle) densely packed adjacent colors are often barely distinguishable from one another. The disadvantages of these arrangements and the systems they represent will be apparent when compared to the present circular organization shown in FIGS. 10-A and 10-B (detail).

Separated Saturation Organization—FIGS. 10-A and 10-B.

Three general levels of relative saturation, according to the invention, are shown by the Circular Color Chart (FIG. 10-A) which contains three concentric circles diagramming the active color areas of the system. "Active color areas" means all areas or color ranges of the visible spectrum which may be represented as color elements of the system. Certain "inactive color areas" are so designated in order to exclude prescribed color ranges from representation as color elements in the system. This makes the active color areas more easily differentiated from one another, the advantages of which are explained below.

The Circular Color Chart (FIG. 10-A), then, shows the following three active color areas:

First, an outer or main color circle 50 diagrams the size and positions of a series of twelve main color families 20, each respectively representing one of the twelve general hue sectors 18 of the visible spectrum, i.e., red, red-orange, orange, yellow-orange, yellow, yellow-green, green, blue-green, blue, blue-violet, violet, and red-violet.

Second, a middle or neutral-hue color circle 60, FIGS. 10-A and 10-B (detail), diagrams the size and positions of a series of twelve neutral-hue color families 30, i.e., red neutral-hue, red-orange neutral-hue, orange neutral-hue, yellow-orange neutral-hue, yellow neutral-hue, yellow-green neutral-hue, green neutral-hue, blue-green neutral-hue, blue neutral-hue, blue-violet neutral-hue, violet neutral-hue, and red-violet neutral-hue (the neutral-hues are colors in the system that are nearest to gray).

Third, a central circle or neutral core 70 represents the achromatic or neutral-gray color family (black, a scale of neutral grays, and white).

These three active color areas define the various color families according to relative saturation, from strongest at the perimeter to zero saturation at the center. An inactive color area 55 (FIG. 10-A) and an inactive color area 65 (FIG. 10-B) lie in between them and serve as buffer zones, excluding specified saturation ranges of color from the system.

Figure 2:
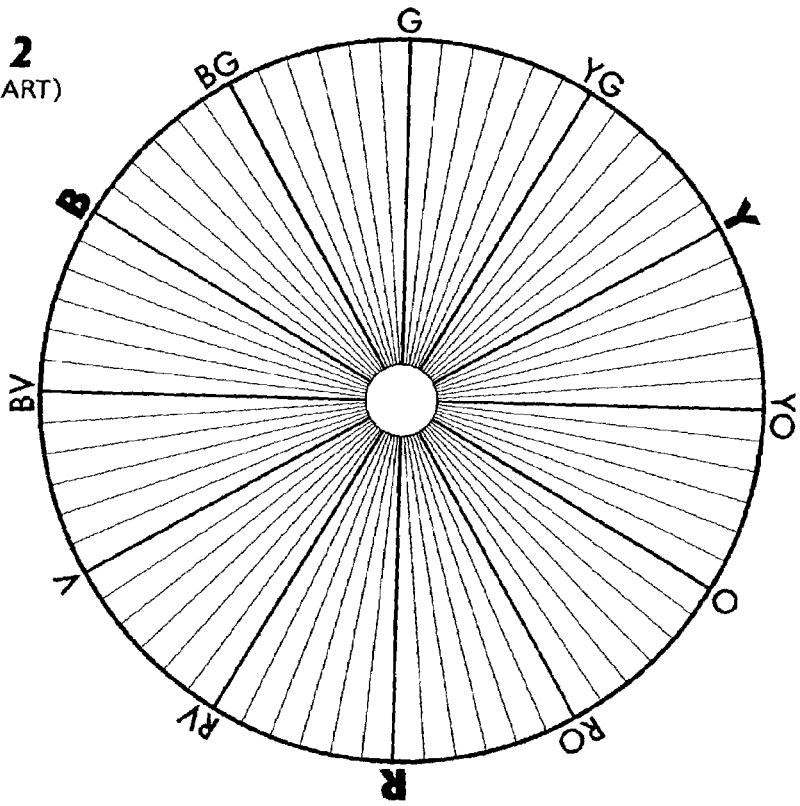
FIG. 2 (prior art) shows a color circle according to Chevreul.

For a better understanding of why it is important to make the color families and their elements more easily distinguishable from one another by separating the active color areas into three discrete saturation levels, consider the prior art. Previous systems organize their colors into a contiguous series of hues and saturation levels, each group beginning where the neighboring group ends, as shown in FIGS. 2, 3-A and 4-A. It is especially difficult to observe distinctions between the colors in the more weakly-saturated saturation levels found near their centers. Trying to distinguish between colors this close together is often impractical when using real color materials. Once a user puts such colors elements into active use (e.g., as when painting with pastels), too much time and attention is typically required to closely evaluate to where they should be returned. The present color-appearance system overcomes this defect by presenting different degrees of saturation noncontiguously, or separately. I.e., the Circular Color Chart (FIG. 10-A) positions the neutral-hue color circle 60 well apart from the main color circle and the neutral core. This separation into three general saturation levels greatly increases the distinguishability of the weakly-saturated color elements, and helps to make the level in which to look for and to return these colors more obvious to the user.

Separated Hue Organization—FIGS. 10-A and 10-B

The Circular Color Chart of FIG. 10-A also defines the present system's hues in a noncontiguous manner. I.e., it spaces each of the color families which lie within circles 50 and 60 apart from one another by designating a buffering zone or excluded-hue sector 49 and 59 in between each, respectively. These excluded-hue sectors represent inactive color areas (or specifically excluded hues) which are so designated to make hue discrimination between adjacent color families easier for the user.

I define main color families and their excluded-hue sectors as follows: Main color circle 50 evenly distributes its twelve main color families in reference to an equally-spaced 48-point division of its circumference 27. Separated from one another by excluded-hue sectors 49, each main color family 20 has a central or median-hue 22 which is flanked or bracketed by a pair of boundary-hues 21 and 23. Each median-hue and each boundary-hue's position lies midway 28 between a pair of division points 27, resulting in a configuration in which each main color family has an active hue range 25 of about 16° and is insulated from its neighbors by an excluded-hue sector with an excluded-hue range 26 measuring about 14° (the number of degrees between, but not including, the boundary-hue positions on either side).

By specifying excluded-hue sectors, hues which would fall nearly or exactly in between color families are eliminated, and the system's active hue-ranges are thus more clearly differentiated. This distinct interval of separation between color families lets the user more quickly find, choose, and replace colors.

Bi-Radial Hue Plan—FIGS. 10-A and 10-B

One of the criticisms of the Ostwald and the Munsell color systems, and many other prior-art color systems, is that the weakly-saturated hues they contain are difficult to distinguish. (As noted supra, the weakly-saturated colors are to be found near the centers of the Ostwald and Munsell color system charts, FIGS. 3-A and 4-A). As their hue divisions approach their neutral cores, they come closer together, becoming narrow and tightly packed. As Judd explains in "Color in Business, Science, & Industry," New York: Wiley (1952), pp. 224–25, this is a necessary defect of any system organized according to a radial plan (a plan which radiates from or converges to a common center).

The present system avoids this defect by rejecting the use of a single radial plan; that is, a plan in which the divisions between all color families lie on common radii. Instead, its weakly-saturated color elements are differently organized within the neutral-hue circle. FIG. 10-A and FIG. 10-B (detail view) show that the more broadly-divided format of neutral-hue color circle 60 reduces the range of hue in each color family to two discrete hues (instead of three hues as in each main color family). Such broader divisions make each of the relatively weakly-saturated neutral-hues represent a larger portion of the visible spectrum, and also magnifies the width of spacing between color families. These factors contribute toward making the respective hues within each of these near-gray color families more easily distinguishable from one another, and each color family more easily distinguishable from its neighbor.

I define neutral-hue color families and excluded-hue sectors (FIG. 10-B) as follows: Neutral-hue color circle 60 evenly distributes its twelve color families in reference to an equally-spaced 36-point division of its circumference 35. Separated from one another by excluded-hue sectors 59, each color family has a pair of adjacent boundary-hues 31 and 32. These boundary-hues are each positioned midway 28 between a pair of division points 35, resulting in a configuration in which each neutral-hue color family has an active hue range 33 of about 12° and is insulated from its neighbors by an excluded-hue sector with an excluded hue range 34 measuring about 18° (the number of degrees between, but not including, the boundary-hue positions on either side).

Although their hue-range divisions and saturation levels are different, the twelve color families organized in both the main color family circle and the neutral-hue color family circle represent identical general hue sectors 18 of the visible spectrum (i.e., red, red-orange, orange, yellow-orange, etc.) and each are respectively considered to be subsets of the same color family. Thus, the term "color family" (when used without specifying either "main" or "neutral-hue") may include both the main and neutral-hue color families. FIG. 10-A shows that the color families of the three fundamental pigment-primaries, red, yellow, and blue (RYB) are located 120° apart from one another in the pattern of an equilateral triangle 63. This equidistant triangular positioning of RYB is a traditional format (the painter's triangle) which diagrammatically disposes pigmented hues in such a way that complementary hues (i.e., hues which when mixed together in proper proportion make gray) lie substantially opposite one another.

Thus, a bi-radial hue plan for the Circular Color Chart (FIG. 10-A) is established. The organization of neutral-hue color circle 60 according to a more widely-spaced radial plan than that of main color circle 50 reduces the number of weakly-saturated hues (twenty-four) which are combined with the larger number of strongly-saturated hues (thirty-six). This allows the present system's ultimate assortment of color elements to be more compact.

While the neutral-hues are less frequently used by artists (and are easily achieved by mixing), having a selection of them on hand is convenient, allowing for the substitution of less expensive, and in many cases more lightfast pigments, when near-gray colors are needed.

(FIGS. 10-C and 10-D are color renditions respectively corresponding to FIGS. 10-A and 10-B.)

Saturation Organization of Color Elements—FIG. 11-A

FIG. 11-A is a Columnar Chart which diagrams the organization of a plurality of color elements 40 within color families. (While the Circular Color Chart of FIG. 10-A diagrams the organization of color families according to saturation and hue, FIG. 11-A diagrams the arrangement of individual color elements within the system's respective color families according to saturation and value.) In sequence, from most-saturated at the left to zero-saturation at the right, a plurality of organizational columns are shown, starting with a group of main color family columns 51, then a neutral-hue color family column 61, and ending in a neutral-gray color family column 71.

The group of main color family columns 51 arranges its color elements in three saturation levels: First, a saturated column 52 is designated for containing the main color family's relatively most-saturated elements. Second, a modified column 53 is designated for containing the main color family's relatively modified or moderately-saturated elements. Third, a dull column 54 is designated for containing the main color family's relatively dull or least-saturated elements. The sequence of columns in FIG. 11-A indicates that although the color elements of the main color family's dull column 54 are relatively weaker in saturation than those of columns 52 and 53, they are relatively stronger in saturation than the color elements of neutral-hue color family column 61.

Neutral-hue color family column 61 (FIG. 11-A) is a single column designated for containing the weakly-saturated color elements of the system. (An example of a neutral-hue, or weakly-saturated color, is the native earth pigment "raw umber.")

Finally, neutral-gray color family column 71 (FIG. 11-A) is a single column designated for containing the achromatic (without color), or neutral-gray color elements, including black and white. The position of this color family, having zero saturation and hue, is indicated in FIGS. 10-A and 10-B as neutral core 70.

As stated, the horizontal sequence of the columns described above indicate the arrangement of individual color elements according to their relative saturation level within the color assortment. The vertical sequence in which these color elements are arranged according to value will now be described.

Value Organization of Color Elements—FIG. 11-A

Within the columns shown in FIG. 11-A, each color family's color elements are arranged in a relative sequence of value-levels from top to bottom, with the lightest values at the top and the darkest at the bottom.

Within each main color family, then, color elements 40, organized into relative saturation levels, as diagrammed in columns 51, are organized sequentially within each column according to relative value, from light to dark. Within each neutral-hue color family, as diagrammed in column 61, color elements are also organized sequentially according to relative value, from light to dark.

Within the neutral-gray color family, diagrammed in column 71, gray color elements are organized, top to bottom, in a sequential range of values from white to black.

Value-levels in each column are independent of the other columns. Thus a row 56, reading horizontally across the entire width of FIG. 11-A for example, does not necessarily contain color elements of the same value level. Such independence from column to column is a flexible organizing factor which avoids uniformly prescribing a regimented pattern of values. This enables each main and neutral-hue color family to have color elements exhibiting values tailored to best represent their respective hue ranges.

(FIG. 11-B is a color rendition respectively corresponding to FIG. 11-A.)

Variant-Hue Charts—FIGS. 12-A to 14-B

Because colors, as will be explained below, are more easily assessed when seen in direct comparison to other similar colors, the present system organizes the arrangement of color elements within its main and neutral-hue color families to display variables in all three aspects of color (saturation, value, and hue). FIGS. 12-A to 12-C are diagrams showing how the assortment of color elements within a main color family, represented by a variant-hue chart 44 (FIG. 12-C) is derived. A trio of constant-hue charts 41, 42, and 43 (FIG. 12-A) respectively represent color elements derived from colorant samplings of a main color family's boundary-hue 21, median-hue 22, and boundary-hue 23 (FIG. 10-A). A trio of charts 41', 42', and 43' (FIG. 12-B) represent a set of consolidation patterns for respectively choosing color elements from this set of constant-hue charts which, when consolidated, form a single main color family assortment of color elements diagrammed by variant-hue chart 44 (FIG. 12-C).

The result is that variant-hue chart 44 (FIG. 12-C) contains a patterned assortment of strategically chosen color elements of the main color family's defined hue range. (The colorant sampling process will be explained under Operation.) This chart configures the color elements within the main color family to present variables in all three aspects of color, that is saturation, value, and hue.

Alternatively, a set of differently defined consolidation patterns can be used to choose color elements from a trio of differently sampled constant-hue charts (similar to charts 41, 42, and 43), which when consolidated form a main color family diagrammed by an alternative variant-hue chart 45 shown in FIG. 12-D.

By a similar process, FIG. 13-A shows a pair of neutral-hue constant-hue charts 46 and 47. FIG. 13-B shows a set of consolidation patterns 46' and 47', and FIG. 13-C shows a variant-hue chart 48 derived from them which diagrams a neutral-hue color family's assortment of color elements. The set of constant-hue charts 46 and 47 may be sampled in order to exhibit a distinguishable difference in saturation (falling within the neutral-hue color circle's defined range) so that the resulting variant-hue chart 48 also displays a distinguishable degree of saturation variation as well as hue and value variation.

The consolidation patterns just described, in each case create an arrangement wherein perpendicularly adjacent color elements always have different hues. In the case of the neutral-hue color family's variant-hue chart (FIG. 13-C) for example, each color element "x" is always adjacent to a color element "z" and never adjacent to another "x". In the main color family's variant-hue chart (FIG. 12-C), each color element "a" is always adjacent to "b" or "c", and never perpendicularly adjacent to another "a". A similar condition occurs for both "b" and "c". The side-by-side placement of distinguishably different hues (all falling within the respective prescribed range of hue) in each color family's variant-hue chart demonstrates the phenomenon described by Chevreul's law of "simultaneous contrast." This law states that two colors placed next to one another will appear as dissimilar as possible. Thus the variant-hue chart shows the variety of a color family's hue range in a way that clearly depicts the remarkable influence which surrounding hues have on any single hue's appearance.

FIG. 14-A diagrams the way in which the present system combines the variant-hue chart of the main color family 44 and its corresponding neutral-hue color family 48 with the neutral-gray color family 71 into a color-family display 85. Thus an artist may compare all color elements of a specific general hue sector, such as red for example (FIG. 14-B), displayed alongside the neutral-gray value scale.

FIGS. 12-E to 12-H, 13-D to 13-F, and 14-B are color renditions respectively corresponding to diagrams 12-A to 12-D, 13-A to 13-C, and 14-A, which illustrate the vibrant and unexpected effect that results from combining a range of hues in a single chart in the prescribed manner.

The creation and use of variant-hue charts, then, is an improvement over previous color systems. The Munsell color system, for example, which uses a constant-hue chart (FIG. 4-B) to display a color family as a single hue with only two variable aspects of color presented, saturation and value, requires 40 (or sometimes 100 or more) charts to present its entire assortment of color samples. Similarly, the conventional constant-hue chart shown in FIG. 3-B is one of 24 charts typically needed to present the Ostwald color system in its entirety.

Through variant-hue charts, the present system is able to consolidate 60 representative constant-hue charts into twelve color families.

Also, by prescribing a range of hue within each color family (except for the neutral-gray color family), and configuring their respective color elements using the specially patterned variant-hue charts, the hue characteristics of and contrast between individual color elements is enhanced. Adding the variable of hue, then, relieves the monotony otherwise presented by a color group whose only variables heretofore have been saturation and value. This gives the artist a livelier gamut within each color family, from which more refined color judgements and selections can be made.

Colorant Gamut Sampling—FIGS. 15-A and 15-B

FIG. 15-A is a diagram, analogous to the Munsell color system's constant-hue chart (FIG. 4-B), showing how the preferred embodiment of the present system samples a colorant mixture gamut at its most saturated points. Such strategically selected samples, taken respectively for each boundary-hue and each median-hue prescribed by color circle 50, and each boundary-hue prescribed by color circle 60, are used to create collections of color elements organized, as previously described, into constant-hue charts 41, 42, and 43 (FIG. 12-A), and 46, and 47 (FIG. 13-A). These constant-hue charts are then consolidated, as previously described, into a series of variant-hue charts (FIGS. 12-C and 13-C) respectively organizing color elements within each prescribed color family. When the variant-hue charts of each main color family and each corresponding neutral-hue color family are grouped and assembled with the neutral-gray color family group, they collectively form an assortment of color elements that will be referred to as a NearPrimaries™ color set 68, as shown in the preferred embodiment of the present system's Color Map (FIGS. 17-A and 17-B). The advantages of this assortment over previous systems' color assortments will be more fully discussed under Operation.

FIG. 15-B is a diagram, similar to FIG. 15-A, showing how an alternative embodiment of the present system samples a colorant mixture gamut at a more conventional series of saturation points, that is, at points which are more evenly distributed throughout the entire range of saturation. Accordingly, FIG. 15-B illustrates samples taken to create collections of color elements which, containing a substantial number of dull and very neutralized hues, display less saturation on average. Such a color collection can be the result of the constraints of a particular type of fixed-color (non-mixable) medium, i.e., beads, ceramic tiles, fabrics, papers, etc. Alternatively, a diagram like FIG. 15-B can be devised to represent the Munsell color system (or any other preexisting color system), and show how color elements of that system are to be sampled and rearranged according to the present system. Thus FIG. 15-B illustrates how, in various alternative embodiments, the present system is an "open" system, capable of organizing any type of palette or color collection, subject to the constraints imposed by the available color elements of a particular medium, or preexisting color system.

Color System Overview—FIGS. 16 to 19, 22-A to 23-D, 24 to 26, and 31-A to 32-D An overview of the results of sampling the colorant mixture gamuts for each color family, according to the preferred embodiment of the present system, is shown in FIG. 16. This sampling comprises 36 constant-hue charts for the main color families, 24 constant-hue charts for the neutral-hue color families, and 1 (zero-hue) chart for the neutral-gray color family. FIG. 16 shows these charts assembled to represent the visible spectrum in a comprehensive table of 1648 color elements.

From this table of color elements (FIG. 16), the constant-hue charts of each main and neutral-hue color family are consolidated into variant-hue charts, as previously described. The resultant variant-hue charts of the main and neutral-hue color families are each combined respectively, according to their general hue sector, into a series of twelve color family groups 77, and assembled, along with a neutral-gray color family group 71', to form the Color Map (FIGS. 17-A and 17-B). In the preferred embodiment, this Color Map displays an assortment of 616 key color elements.

The color family groups 77 and neutral-gray color family group 71' shown in the Color Map of FIGS. 17-A and 17-B may be suitably rotated and otherwise adapted and combined to configure the organizational format of a computer swatch set (FIG. 26), computer color palette, color picker (FIGS. 22-A to 22-C, and 23-D), or other form of physical, digital, or electronic color display for use as a color viewing and selection device in various catalogs, atlases, computer graphics applications, in-store kiosks, and on the Internet. The functions and advantages of such devices are further discussed under Operation.

FIG. 18-A shows an example of a main color family's variant-hue chart providing the organizational format for physical embodiments, such as a small color elements tray 142 for holding assortments of mosaic tiles, beads, stained glass, and other small fixed-color materials, or a paint-pan palette 143 for arranging assortments of paints or other mixable color materials. By simulating such physical embodiments on a computer screen, the system's color-family charts provides a GUI for selecting these color materials as well as others (fabrics, papers, and dry pigments) from a manufacturer's web site, or in a computer imaging application. Additionally, when indexed with a prepared database, the GUI can be used to reference color-matching formulas of a manufacturer's mixable color products such as paints, modeling clays, or hobby and crafts materials. Further uses for the system's organized assortments of color elements are discussed under Operation.

FIG. 19-A shows a triangular diagram which illustrates how the hues of the color families of the present system correspond to, and may be arranged on, the traditional painter's color triangle, a figure well known to artists. The triangle is an ideal figure for showing the mixing relationships of subtractive color (pigments), and thus is the color chart preferred by the artist or craftsperson, or anyone else who works with traditional coloring materials.

(FIGS. 17-B, 18-B, and 19-B are color renditions respectively illustrating and corresponding to FIGS. 17-A, 18-A, and 19-A.)

FIG. 24 shows the layout of color elements on a page of an atlas of the color system. Each color element is associated with a notational label which identifies its color family and assigned numerical position.

FIG. 25 illustrates a fan book displaying color swatches of the system. The fan book, comprising a stack of relatively long, narrow pages 102 pivoted together at their lower end by a connector 103, is a well-known arrangement which allows any page of color swatches to be compared with any other page, by fanning out only those pages. This is the type of selection guide commonly used by graphics professionals for comparing printed colors.

FIGS. 31-A to 31-C are color renditions of color-family displays 85 of the NearPrimaries™ color set (FIGS. 17-A and 17-B), illustrating the effect of presenting strongly-saturated color ranges in variant-hue charts. A trio of color elements 163 are extended in size to indicate each color family's prescribed hue-range (as defined on the Circular Color Chart of FIG. 10-A).

FIGS. 32-A to 32-D illustrate in color the process and effect of excluding specified hues from the main color circle and the neutral-hue color circle. FIG. 32-A shows the main color circle's 48-point division of the visible spectrum, and the neutral-hue color circle's 36-point division of the visible spectrum, before specified hues are excluded. FIG. 32-B diagrams a plurality of excluded-hues 49' of the main color circle as defined by the present system. FIG. 32-C diagrams a plurality of excluded-hues 59' of the neutral-hue color circle as defined by the present system. FIG. 32-D is a rendition of the main color circle and neutral-hue color circle reconstituted with their respectively defined excluded-hues removed, illustrating the resultant increase in distinguishability between adjacent color families.

Computer Color Selection—FIGS. 20 to 22-E, 23-A to 23-E, 26, 28-A to 28-M, and 30

FIG. 20 shows a computer imaging processing system, which typically incorporates a scanner 121 (or other digital image source), a personal computer 122 (or other digital image processor) with a color monitor 124, a keyboard 126, a mouse 128, and a color inkjet printer 120 (or other output device). Except for certain aspects of the software interface, to be discussed in more detail with respect to FIGS. 21 and 22-A through 23-H, the image processing system may comprise commercially available hardware and software components, assembled and operated in a manner that will be readily apparent to one skilled in the art.

In an exemplary embodiment as shown in simplified block diagram form in FIG. 21, the software that controls the computer includes an operating system having a graphical user interface (GUI) 130, a well-known operational means whereby the user may use a pointer 132 (FIG. 20) via a pointer driver 134 to select and operate various controls (such as buttons, sliders, and other "interactive" areas), or choose colors in various color selection tools or "color pickers" appearing on the screen of monitor 124 under the control of a display driver 136 thereby generating a plurality of control signal inputs 138 to an application program, such as an image processing program 140 (or a paint or drawing program).

Color pickers are now part of the interface of every computer imaging program. These provide the user with a way to visually compare and choose colors. Usually several types of color pickers are available in a program (or operating system), some allowing colors to be chosen from the entire (over 16 million colors in theory) RGB gamut (FIGS. 5-A, 6, and 8-A), others offering a set of predetermined colors from which to choose (FIGS. 5-B, 7, 8-B and 9). As noted supra, the color picker from the CorelDRAW 8 program (shown in FIG. 9) is particularly sophisticated. It allows a user to select a color element in the usual fashion by "clicking" on it with the mouse (mouse button depressed, then quickly released). In addition, however, when a "mouse press" (mouse button depressed and held down for a prescribed length of time) is made with the cursor placed over the selected color element, "popup" palette 160 of neighboring colors is displayed. This allows the user to examine and select color variations which are relatively close to the color element originally selected. As previously noted, however, this device presents more color options but fails to provide an artist-oriented organizational framework.

FIGS. 22-A through 22-D show embodiments of GUI color pickers organized according to the present system. Color-family display 85 in a color element selection area 84 has been rotated clockwise 90 degrees, so that value now reads light to dark, from right to left, and saturation now reads strong to weak, from top to bottom. FIG. 22-E diagrams the way in which various color elements of a color family's range of hue may be accessed from a specified color element position within a color family display. FIGS. 23-A through 23-D show alternative embodiments of GUI color pickers organized according to the present system. FIG. 23-E illustrates the way in which the present system provides for choosing specific color-family displays using the keyboard. These color pickers will be discussed in more detail under Operation.

FIG. 26 illustrates the way in which a color swatch set, organized according to the present system, appears when loaded into the window of a currently existing computer graphics program.

FIGS. 28-A to 28-M show the tabulated RGB values for displaying the NearPrimaries™ color set, organized according to the present system, on a calibrated color monitor. These tables provide the information necessary to create color assortments which can be loaded into conventional computer graphics programs (as shown in FIG. 26).

FIG. 29 illustrates a form for recording (or presenting) a formula of the proportions of component pigments which when mixed will match a specified color. In this example, the form indicates that to match a specified red-orange 92, three artists' oil paints are mixed in the proportions that are shown on a bar chart 96.

FIG. 30 illustrates a preferred embodiment for displaying the color formula presented in FIG. 29 on a computer screen. A computer database references the same information shown in FIG. 29, however instead of a simple bar chart, a GUI simulates the appearance of the component artists' oil paints having been squeezed out of their tubes in the correct mixing proportions.

For the purpose of color matching, as will be discussed under Operation, individual color elements as they appear in any of the forms of display which have been described (e.g., FIGS. 11-A to 14-B, 16 to 18-B, 22-A to 22-C, 23-D, 24 to 26, and 31-A to 31-C) may be indexed to color mixing formulas like those illustrated in FIGS. 29 and 30. The notation used for identifying color elements of the present system (i.e., YO 34, YO—N 12, N 3, etc.) is illustrated in the atlas page of FIG. 24, the swatch book of FIG. 25, and the tables of FIGS. 28-A to 28-M.

OPERATION—PREFERRED EMBODIMENT

A principle of the invention is that a moderately-sized assortment of well-chosen, strongly-saturated colors is of more practical use to artists, particularly painters, than are larger assortments containing many barely-distinguishable color variations. To this end, the system's color families, and their respective color elements, are defined to provide variety, strength, and effective organization.

These objectives in organizing artists' coloring media are accomplished as follows:

Hue Variety—FIGS. 10-A, 10-B, 12-C, and 13-C

In my previous U.S. Pat. No. 5,860,518 (1999), supra, I suggest that minor hue variations can be included within each pastel color family to provide the artist with a livelier, expanded assortment of colors.

The present system improves upon this idea, not only for pastels and other artists' pigments, but for color-appearance applications in general, by segmenting the visible spectrum into a series of discrete hue ranges of both the main and neutral-hue color families. As already described (FIG. 10-A), the Circular Color Chart's main color circle 50 divides the spectrum into 48 visually-distinguishable hue steps, and then excludes one of these steps between each of its twelve color families. Hue range 25 of each main color family, then, includes three distinguishable hues. (An easy way of characterizing this hue range is that the central, median-hue is interposed between a pair of prescribed "warm" and "cool" boundary-hues.) Thus, by excluding the intermediate hues between color families, the present system defines each main color family to have a separate and discrete hue range, and (as diagrammed in FIG. 12-C) to provide the artist with an assortment of color elements which vary in all three attributes of color, i.e., value, saturation, and hue.

Similarly, although according to a different radial plan, neutral-hue color circle 60 (FIGS. 10-A and 10-B), divides the visible spectrum into 36 visually-distinguishable hue steps, and then excludes one of these intermediate hue steps between each of its twelve color families. Hue range 33 of each neutral-hue color family (FIG. 10-B), then, is defined to include two distinguishable hues, and (as diagrammed in FIG. 13-C) to present for close comparison an assortment of color elements which varies in two attributes of color, i.e., value and hue. If sampled, however, as previously described, to exhibit a distinguishable difference in saturation (within its defined saturation level), the neutral-hue color family's assortment of color elements (FIG. 13-C) will also vary in saturation.

Ranges of hue within color families present advantages to the artist beyond simply adding more color alternatives. For instance, it is well known that the appearance of a color is always influenced or modified by the colors which surround it. Many color atlases even suggest using a neutral gray mask to cover adjacent colors when selecting a single hue. However, it is equally true that this same phenomenon ("simultaneous contrast" cited supra) causes similar colors to be more easily and accurately differentiated when seen immediately next to one another. In the variant-hue charts of the present system, each main and each neutral-hue color family's color elements are organized in patterns which prescribe perpendicularly adjacent color elements to have different hues. This enhances color comparison and enables the artist, depending upon the project at hand, to make either quicker, or more reliable color judgements and choices.

In regard to producing artists' materials, prescribing a range of hues within a color family also provides the flexibility to group color elements which are derived from several different pigments. For example, in the orange hue range both cadmium orange and burnt sienna (a pigment which is less expensive and more lightfast) may have the same hue in certain values, but a different hue in lighter values, with the burnt sienna exhibiting a cooler and less saturated tone. Since hue variations are acceptable within a defined range, an artist (or manufacturer) can elect to assemble, display, and use a wider variety of pigments within a single color family, thus taking advantage of the superior lightfastness, tinting characteristics, and economy of different pigments at various levels of value and saturation.

Saturation Variety—FIGS. 11-A and 15-A

A well-chosen saturation range is critical in creating color assortments which provide the kind of color variety that is useful to artists. FIG. 11-A shows that the color elements within the saturated 52, modified 53, and dull 54 columns, as well as the neutral-hue color family column 61 present color saturation at four different levels. This variety is a prerequisite when working with fixed-color elements such as mosaic tiles, fabrics, colored papers, etc., but it is also beneficial when using a medium such as pastel. Contrary to popular belief, pastel colors can be mixed, however this mixing is done on the painting surface, which is usually paper. Since the tooth of the paper will gradually becomes clogged with pigment, it is best to keep the amount of mixing to a minimum. Starting out with a pastel color of a suitable saturation level makes this possible.

A further advantage in having a varied range of saturation levels is faster and more accurate color mixing. The usual practice in painting is for the artist to make some initial color statements in a composition, after which each color note must subsequently be refined or made more accurate (by adding small amounts of other colors). While no color system can substitute for the necessary acquired skill that the artist must possess in choosing and mixing colors, the present system provides a wide sampling of available colors, meaning that a desired color which needs to be mixed is never far away. An example is shown in FIG. 15-A, where if a target color 75 is desired, instead of mixing it crudely from scratch, i.e., by starting with the pure hue, the artist may begin mixing with a color 74, which is already very close to the target color, adding perhaps a small proportion of a color 76. Essentially then, any "in-between" color can be quickly mixed by combining two or three neighboring system colors in adjusted proportions. (The present system's "excluded-hues," for example, can be mixed by combining the boundary-hues from two respectively adjacent color families.)

Value Variety—FIGS. 11-A, 11-B, and 24

In FIG. 11-A, as already described, color elements are organized, from light to dark, in a sequence of relative values particular to each column. This is a departure from the uniform, evenly-stepped grids of prior-art color systems (FIGS. 3-B and 4-B) which impose the same, rigid sequence of values upon every hue. The operational advantage of having relative values organized in each column independently of the other columns is the flexibility for the artist (or a color manufacturer) to stock each column with significantly different values which are missing or underrepresented in the others. Such values will differ depending on hue. For example, in the red-violet main color family, organized according to the present system (FIG. 11-B), there are many tints (mixtures with white) of relatively light value in saturated column 52, a range of values of relatively moderate to dark tones (mixtures with gray) in modified column 53, while in dull column 54 the number of tones and shades (mixtures with black) of relatively dark value predominate. FIG. 24, in comparison, shows the columns of the yellow main color family to be similarly related, but distributing, overall, a much lighter range of values. Thus each main color family represents an assortment of values tailored to a particular hue range, providing the artist with a compact selection of significantly different values which is far more comprehensive than those of prior-art systems of similar size.

Maximum Color Strength—FIGS. 4-B, 15-A, and 15-B

One of the chief criticisms of the Munsell color system (FIG. 4-B) and other color systems of its type is that it contains only a few strongly-saturated color samples 15, and a great many weakly-saturated color samples 16. FIG. 4-B shows that when the Munsell color system samples a colorant mixture gamut 10, a plurality of large areas including an area 37, 38, and 39 within the gamut are not represented within the Munsell color system's grid. This shortcoming results from the Munsell color system's methodology of sampling color in relatively large, evenly-stepped saturation increments. Because of this rigid sampling scheme, only at a few points 11, 12, 13, and 14 does the Munsell color system touch the full saturation limits of colorant mixture gamut 10.

While it is possible for the Munsell color system to more fully sample a colorant mixture gamut by using smaller saturation and value increments, to do so requires its number of color samples to rise to the tens of thousands.

FIG. 15-A shows how the preferred embodiment of the present system, by using a more flexible sampling method based on significantly distinguishable (not necessarily uniform) steps, can represent a colorant mixture gamut at its strongest saturation points with only a relatively small number of samples. As the diagram shows, saturated column 52 samples the most saturated colors at the very edge of colorant mixture gamut 10 with a series of color samples 52'. Likewise, modified column 53, dull column 54, and neutral-hue column 61 sample the relatively strongest colors in the colorant's significantly less saturated areas with a series of color samples 53', 54', and 61'. Such a strongly saturated sampling results in NearPrimaries™ color set 68 (FIGS. 17-A and 17-B), an assortment of colors, organized according to the present system, especially for artists' use. Each color element so sampled is significantly distinguishable from its neighbor, but clustered around or leaning towards a "primary" point 57 (the most strongly-saturated portion of the colorant mixture gamut). These strategically sampled color elements are the ones most useful and necessary to the painter since an axiom when mixing pigments is that one can always make a strong color dull, but not vice versa.

FIG. 15-B in contrast, as previously explained under Description, shows how the present system samples a colorant mixture gamut at points which yield a more conventionally distributed range of saturation, resulting in a color assortment closer to what one would expect from the Munsell methodology, comprising only a few strongly-saturated colors and many more relatively weakly-saturated colors.

As an aid to the artist in mixing color, the present system's NearPrimaries™ color set sampling (FIG. 15-A) provides several operational advantages. First, it is an assortment of relatively moderate size, showing only significant differences in value, saturation, and hue, without an overwhelming continuum of minor variations.

Secondly, it is focused on providing colors an artist needs. Impressionist color teacher Henry Hensche states in "The Art of Seeing and Painting," Thibodaux, La.: Portier Gorman (1988) p. 90, that the best palette for a painter is one that contains only those colors that cannot be mixed from others. From such a palette of unique, pure pigments a skilled colorist can mix a full gamut of color in various ranges of value, saturation and hue. Color-appearance systems are a convenient means of elaborating on collections of such basic pure pigments. By presenting a comprehensive sampling of the gamut available using these basic primaries they, in effect, perform some premixing for the artist, giving her a head start at achieving various targeted colors. While other color systems present their gamut at all levels in even steps, the NearPrimaries™ color set's emphasis is on presenting the strongly-saturated portion most useful for mixing.

Finally, it is often difficult to judge, while mixing color, exactly how much of another color to add to have a significant or desired effect. The present system's display of distinguishably different steps in value and saturation, clustered around a prescribed range of primary hues, gives the artist a gauge of how much color change is necessary within a color family to be noticeable and effective. Thus the sampling methodology of the NearPrimaries™ color set provides the artist with both a compact arsenal of powerful color elements, and a scale of significant color differences.

Effective Organization—FIGS. 10-A to 19-B, 24, and 25

The present system's effectiveness in organizing color for artists' use has been detailed in the description of its major organizational charts. The Circular Color Chart (FIG. 10-A) has been shown to establish increased distinguishability in saturation and hue. The Columnar Chart (FIG. 11-A) lends order and flexibility in organizing color elements. The variant-hue charts (FIGS. 12-C and 13-C) enhance color comparison and consolidate a relatively large sampling into a moderately sized assortment of key color elements. The assembled color families displayed in the Color Map (FIGS. 17-A and 17-B) demonstrate that a comprehensive set of key color elements can be presented to the artist in a concise, easily-managed format.

The system's emphasis on distinguishability presents a number of operational advantages: First, the color assortment is easier to keep organized since there are clear distinctions between color elements there is rarely a doubt as to where a color belongs. This is important to the artist who, when working with fixed-color elements, must often place colors back in order during or after use. Second, color elements with significantly noticeable differences are more quickly assessed and therefore more quickly utilized. Third, the significantly noticeable difference between color elements holds the system to a manageable number. This size limitation is essential to efficiently organizing an assortment of beads, mosaic tiles, crayons, markers, pencils, pastels, or other types of fixed-color materials which must occupy actual physical space.

The Color Map of FIGS. 17-A and 17-B serves to indicate that an array of 616 colors which can be displayed on a single chart, or in a computer "window," can also be confined to a reasonably-sized physical space. For example, in the form of artists' pastels measuring 12.7 mm (½") in diameter by 38.1 mm (1.5") long, this entire assortment of color elements fits into a 117 cm×40.6 cm (46"×16") area.

Ease of use is further afforded to artists by FIG. 19-A, which shows the hues of each of the color families arranged on the traditional painter's color triangle. As previously noted, the painter's triangle is a familiar diagram for visualizing complementary hue relationships, and predicting the results of color mixtures. Being able to visualize any color element in the system on this figure is especially important when mixing pigmented colors.

FIGS. 24 and 25 show the way in which the system's color assortments are presented in a conventional color atlas and fan-fold swatch book. These references allow an artist to compare color samples directly to a color being mixed. Proportional formulas for mixing matches to these samples may be furnished by a color manufacturer alongside these colors, or in separately printed tables, or through a computerized database, as described below.

Computer Color Selection—FIGS. 5-A to 9, 22-A to 22-F, 23-A to 23-H, 26, and 27

FIG. 26 shows a computer color picker in which, according to the present system, color elements are organized in color families. As already noted, color pickers are typical of the graphical user interface (GUI) which is now an industry-wide standard for computer operating environments. While the forms and capabilities of this specific type of color picker (sometimes referred to as a color palette or swatch set) will vary from one computer graphics application to the next (FIGS. 5-B, 7, 8-B and 9), they all share the same basic function of presenting an assortment of discrete color elements for use.

The swatch set of FIG. 26 is an improvement over the prior art. FIG. 7, for example, shows the "browser-safe" palette, a standardized "Internet" color assortment which, as Lynda Weinman points out in "Coloring Web Graphics.2," Indianapolis: New Riders (1997) p. 26, is presented in a mathematically-ordered arrangement that shows "no sense of organization." Comparing FIGS. 7 and 26 shows to what degree the arrangement of colors in such swatch sets can either make or lack visual logic.

An even greater degree of visual logic is evident in FIGS. 22-A to 22-D which show versions of a computer color picker arranged according to the present system. Operating within a general hue sector selection area 83, the user may cause color-family display 85 of a respective color family to be displayed in color-element selection area 84. The user does this by actuating a color-family tab 81, or any of the buttons configured as color diagrams such as a button 86 of a color circle array 87, or a button 88 of a painter's triangle array 89, or a button 93 of a color hexagon array 94. The user may also choose which color diagram to use by actuating any one of a series of correspondingly shaped color-diagram buttons 95.

FIGS. 23-A to 23-D illustrate alternative embodiments of computer color pickers arranged according to the present system. Operation is first conducted within general hue sector selection area 83 located on a palette selection panel 73 which may be displayed either attached to a toolbar 97 as shown in FIGS. 23-A and 23-B, or by itself as shown in FIG. 23-C. The user can, by actuating button 86 of color circle array 87 (FIG. 23-A), button 88 of painter's triangle array 89 (FIG. 23-B), or a button 98 of a color rectangle array 99 (FIG. 23-C), cause color-family display 85 of a respective color family to be displayed in a color-element selection palette 72 (FIG. 23-D). Multiple color-element selection palettes 72 may be so displayed and remain open on the computer screen in this embodiment. This "multi-display mode" enables the user to see and compare colors in several color families at the same time. When partially overlapped, as illustrated by the three palettes shown at the top of FIG. 23-D, the user can compare an original- or current-color 79 to a new-color 78 in a plurality of palettes and thus, seeing several different color relationships displayed side-by-side, be better able to decide on the most favored one.

To conserve screen space, the color-element selection palette and its associated color-family display may be partially collapsed to show only the main color family and neutral-hue color family, as shown in a palette 110, or only the main color family as shown in a palette 112 of FIG. 23-D. These collapsed configurations are controlled by a menu 114 which is displayed by actuating a menu button 115 in the lower right-hand corner of each palette. Similarly, a menu 118 actuated by a menu button 119 on palette selection panel 73 (FIG. 23-A) can make the respectively selected palettes visible for use, or hide them until needed. Further conservation of screen space, or quicker palette selection can be accomplished by foregoing the use of palette selection panel 73 altogether, and using instead a prescribed array of keys 100, as shown in FIG. 23-E, on the computer's keyboard to choose a respective color family to be displayed in color-element selection palettes 72, 110, or 112.

Thus the digital selection and display of respective color families is graphically related to the hue positions of traditional artists' color diagrams like the color circle in FIGS. 22-B and 23-A, or the painter's triangle in FIGS. 22-C and 23-B, or the color hexagon in FIG. 22-D (color-family tabs 81 in FIGS. 22-A to 22-C, color rectangle buttons 98 in FIG. 23-C, and prescribed array of keys 100 in FIG. 23-E are all arranged in a rectangular format related to the painter's triangle as described in my previous U.S. patent, supra). Some of the functions and advantages of incorporating these artists' diagrams into computer color selection can be better understood if we look at the prior art shown in FIGS. 5-A, 6, and 8-A.

FIG. 5-A diagrams a color selection device from the interface used in the computer paint program Painter 7 which is currently published by the Corel Corporation, of Ottawa, Ontario, Canada. This color picker simulates what (at first) appears to be an artist's color circle, and a constant-hue triangle similar to Ostwald's (FIG. 3-B). The user can choose a color by first selecting a hue (by moving the mouse pointer to and then clicking on an appropriate point) on a hue selection circle 150, and then choosing (once again by moving to and clicking on) the color's desired value and saturation from a contiguous graphical display of computer-based RGB colors inside a constant-hue triangle 152. In this case, however, note that there is no specific, indexed color assortment to select from. Since the hue selection circle and the constant-hue triangle both display unsegmented, contiguous RGB color, there is little chance, in using this method, of accurately and repeatedly choosing a desired hue family, and of confidently picking specific colors. Furthermore, the RGB (light-based) colors displayed in hue selection circle 150 are not distributed in the positions and proportions one would expect from a circle displaying pigmented color. (Compare the small area representing orange to the disproportionately larger area representing green.)

Similar disadvantages are encountered in the type of color pickers shown in FIGS. 6 and 8-A. In FIG. 6, the user chooses a hue from a hue selection bar 154 and then a desired value and saturation from a constant-hue square 156. In FIG. 8-A, both hue and saturation are chosen from a circular field 157 of contiguous color, and value is chosen by acting on a slider 158. In both cases, colors blend into one another and the user cannot easily visualize or pick a discrete color or color family.

Returning to the color pickers of FIGS. 22-A to 22-D, and FIGS. 23-A to 23-D, we see that the general hue sectors of the visible spectrum, based on the present system, are, in each case, effectively represented in a graphically-segmented and spatially-oriented arrangement of selection means (tabs 81, and arrays 87, 89, 94, 99, and 100). Thus, the user first has the opportunity to predictably choose a desired color family in an intuitive way, and then, secondly, to see, compare and choose between its discrete color elements, displayed in a format that enhances the visual distinctions between them. Most importantly, colors chosen with this indexible color selection arrangement can reliably correspond, if calibrated beforehand to a prescribed assortment of physical coloring materials, to specific elements of actual coloring media.

The basic operation of the color pickers shown in FIGS. 22-A to 22-D are described in more detail using the flow chart of FIG. 22-F. Starting at box 170, the user actuates the color-family selection means by placing the cursor over it and pressing down on the mouse button. At step 172 a determination is made whether the mouse button has been released. If the answer is no, than nothing need further be done. If the answer is yes, a second determination is made at step 174 as to whether the respectively selected color family is currently displayed. If the answer to that question is yes, than nothing need further be done. If the answer is no, than at step 176 the currently displayed color-family display is replaced by the newly selected color-family display in the color-element selection area. Additionally, any corresponding color-family selection means (i.e., tab 81, button 86, button 88, or button 93) is highlighted to indicate the color family that has been selected. At step 178, the user selects a specific color element for use by placing the cursor over it using the mouse, and pressing and releasing the mouse button. The selected color element is then highlighted in color-family display 85, and in addition is shown as new-color 78 (FIG. 22-C), ready for use.

Similarly, the basic operation of the alternative color pickers shown in FIGS. 23-A to 23-D, in multi-display mode, are described in more detail using the flow chart of FIG. 23-F. Starting at box 180, the user actuates color-family selection means located on palette selection panel 73, by placing the cursor over the color-family selection means (button 86, 88, or 98) and pressing down on the mouse button. At step 182 a determination is made whether the mouse button has been released. If the answer is no, than nothing need further be done. If the answer is yes, a second determination is made at step 184 as to whether the respectively selected color family is currently displayed. If the answer to that question is yes, than nothing need further be done. If the answer is no, than at step 186 the respectively selected color-family display is displayed in a new color-element selection palette (and the corresponding color-family selection means is highlighted). Thus the operation of this alternative embodiment, as previously noted, allows multiple color-element selection palettes 72 to be displayed at the user's discretion. At step 188, the user selects a specific color element for use by placing the cursor over it using the mouse, and pressing and releasing the mouse button. The selected color element is then highlighted in the color family display, and in addition is shown as new-color 78 (FIG. 23-D), ready for use.

The keyboard operation of the color pickers in FIGS. 22-A to 22-D are described in more detail using the flow chart of FIG. 23-G. Starting at box 190, the user actuates the color-family selection means by first holding down a prescribed command key 127 on the computer's keyboard (FIG. 20). At step 192, the user then presses a color-family selection key 101 in prescribed array of keys 100 (FIG. 23-E). At step 194, a determination is made whether the corresponding color-family display is currently displayed. If the answer is yes, than nothing need further be done. If the answer is no, then at step 196 the currently displayed color-family display is replaced by the newly selected color-family display in the color-element selection area, and any corresponding color-family selection means (tab 81, button 86, button 88, or button 93) is highlighted to indicate the color family that has been selected. At step 198, the user selects a specific color element for use by placing the cursor over it using the mouse, and pressing and releasing the mouse button. The selected color element is then highlighted in the color family display, and in addition is shown as new-color 78 (FIG. 22-C), ready for use.

The keyboard operation of the color pickers shown in FIGS. 23-A to 23-D are described in more detail using the flow chart of FIG. 23-H. Starting at box 200, the user actuates the color-family selection means by first holding down the prescribed command key on the computer keyboard. At step 202, the user then presses color-family selection key 101 (FIG. 23-E). At step 204, a determination is made whether a palette selection panel 73 is currently displayed. If the answer to that question is yes, then a second determination is made at step 206 whether the corresponding color-family display is being currently displayed in a color-element selection palette. If the answer is no, then a corresponding color-family display is displayed in a new color-element selection palette 72, and a corresponding color-family selection means on palette selection panel 73 is highlighted. If the answer is yes, than nothing need further be done. Returning to step 204, if the answer is no, then a determination is made at step 208 whether a corresponding color-family display is currently displayed. If the answer is yes, then nothing further need be done. If the answer is no, than at step 210 a corresponding color-family display is displayed in a new color-element selection palette 72. At step 212, a specific color element is selected for use by placing the cursor over it using the mouse, and pressing and releasing the mouse button. The selected color element is then highlighted in the color family display, and in addition shown as new-color 78 (FIG. 23-D), ready for use.

As previously noted, the present system's variant-hue chart can be characterized as a means for presenting three color dimensions (value, saturation, and hue) in a single, two dimensional chart. However when displayed on screen as a computer-program's GUI color selector (FIG. 22-A) the variant-hue chart performs an additional operational function of providing access to any color element of the constant-hue charts from which it is derived. The diagram of FIG. 22-E shows in a group 90, three constant-hue charts 41, 42, and 43 of a main color family in a layered arrangement, and in a group 91, two constant-hue charts 46 and 47 of a corresponding neutral-hue color family in a similarly layered arrangement. The variant-hue charts in color-family display 85 of FIG. 22-A contain the consolidated assortment of key color elements drawn from these two groups of charts 90 and 91 (FIG. 22-D). When suitably activated, a "popup" hue-range gadget 80 displays, in a side-by-side arrangement, a group of correspondingly-located color elements 82 from each of the color family's constant-hue charts. This enables the user to display and choose a color element from any of the constant-hue charts depicted in layers in FIG. 22-E. Hue-range gadget 80 is activated by selecting a color element in a specified manner, e.g., by holding down prescribed command key 127 on the computer's keyboard (FIG. 20), when clicking on the color element. In this way, a computer user can access any of the present system's 1648 constituent color elements if desired.

Color Formulation Databases—FIGS. 17-A, 22-A to 22-E, 23-A to 23-D, and 24 to 30

FIG. 17-A, in addition to diagramming the system's 616 key representative color elements arranged in color families, establishes a reference table of color standards.

These color standards can be used as the basis for creating, arranging and indexing an assortment of pastels, colored papers, mosaic tiles, beads, textiles, stained glass, and other fixed-color elements. Additionally, through careful mixing and record-keeping techniques, a database of formulas for matching these color standards with mixable-color media may be compiled.

Individual artists can build their own color-formulation databases, for example, by matching the colors of this reference table with their preferred media. FIG. 29 shows a form used to record formulas for mixing color matches to system color elements with artists' oil paints. Label information (color name, grade, manufacturer, etc.) of the various colors used in the mixture, and the proportions of each, are noted. The proportions of component colors can be indicated on bar graph 96 for easier comprehension.

Mixing matching colors, while time consuming, is a straightforward process. A color match to a target color can usually be made with four pigments or less; two pigments to bracket the hue are added to a base pigment (most often white) and the appropriate complementary pigment (or black) is added to gray the color to the desired degree of saturation. Proceeding methodically in this manner, a complete database of formulas can be compiled allowing artists to duplicate any of the color standards with their preferred media, in whatever quantity is needed.

Such a database of color formulas, in effect, offers the artist a head start for mixing a standard color which is very close to any conceivable color. Final hue, value, and saturation adjustments can be made by eye, and any necessary changes may be noted in order to record a formula for mixing a quantity of any desired "non-standard color" (any color not in the reference table). Thus, an artist can more quickly match non-standard colors (and generate formulas for them) without having to rely on technology, i.e., spectrophotometric measurements and color-formulation software.

Of course, it would be advantageous to artists if these reference materials and formulas were already prepared and available. A set of such color standards, fashioned according to the present system, can be developed by an art materials manufacturer using its own color products. By assembling assortments of pastels, mosaic tiles, and similar fixed-color elements based on these color standards, and compiling the formulas needed for matching these same color standards with oil, acrylic, gouache, or other traditional mixed-color media, an indexed color-matching database can be created which links a manufacturer's entire color product line to a variety of applications.

Such applications would include professional color communication between designers and illustrators, painting instruction and demonstration, general arts education, arts and crafts projects, home decoration and furnishing, as well as other forms of color merchandising and specification. The possible color products and technologies linked to would range from electronic to physical, including numerically-quantified digital colors, video colors, transparent colored gels, photographically-reproduced colors, spot-color inks, offset-printed colors, silk-screened colors, painted color swatches, pastels, crayons, markers, pencils, paints, inks, dyes, papers, textiles, plastics, stained glass, mosaic tiles, stones, clays, and beads.

These color standards and formulas can be presented to the artist, or other color user, in the form of published reference materials such as the color atlas shown in FIG. 24, the swatch book shown in FIG. 25, or computer colors specified for accurate display on the screen of a calibrated color monitor such as those tabulated in FIGS. 28-A to 28-M. Such color standards can be indexed to printed tables of formulas, or to a computerized database presenting color-mixing formulas using a GUI such as the one shown in FIG. 30. In addition, calibrated color palettes and color pickers (FIGS. 22-A to 22-C, 23-A to 23-D, and 26) can be developed and provided by an art materials or other color materials manufacturer to promote the use of its color products in conjunction with computer applications such as paint, graphics, and tutorial programs.

Making such reference materials available creates a strong incentive for an artist to use the providing manufacturer's products, since the formulas would aid an artist working in one medium to translate colors into another medium, quickly and accurately.

The incorporation of a computerized version of this color-formulation database in various software applications (especially arts-related tutorials) would also be an incentive for computer users to try their hand at using traditional coloring materials and techniques. By linking in this way to the current fields of digital image-processing, communication, and commerce, an art materials manufacturer can promote the cooperative use of its color products with technology, and expand its existing markets.

Furthermore, with suitable software, this color-formulation database can, by interpolation, allow the computer to do much of the work involved in generating formulas for mixing any desired non-standard color. Desired colors can be targeted by scanning photographs, sampling images created on a computer, or by taking spectrophotometric readings from traditionally-painted images (e.g., small sketches done in watercolor or pastel). Alternatively, the artist can gauge a close color match by eye using a swatch book, and use the associated formula as a starting basis for mixing an accurate color match. Such color-formulation techniques can automate or make more reliable many of the methods by which an artist arrives at formulas for translating colors into other media, mixing paints in quantity for large canvasses or murals, or repeating mixtures of colors for variously-sized, or multiple painted versions of the same image. Additionally, these computer-generated formulas may be processed in such a way as to provide adjusted proportions of the most economical pigments for mixing the most lightfast match to a target color.

Optical mixture of fixed-color elements is a common phenomenon which poses one further type of color-formulation database. Although widely encountered in today's computer graphics images, dithering (positioning small elements of color together in an area so they optically mix to create a new color) is not a new technique. Mosaic tiles were used as early as the 5th century to juxtapose small color elements which combine to form a new color when viewed at a distance. The previously discussed advantages of compiling databases for matching colors with mixable-color media, also hold true for optically mixing color matches with fixed-color elements (i.e., beads, tiles, yarns, stained glass, and other mosaic-like materials). While the artisans of yore developed their optical mixes through trial and error, it is now possible via the computer to previsualize optically mixed color combinations on screen or in printouts, as shown in FIG. 27. Here is illustrated an orange color 104 and a blue color 105 arranged in a checkerboard grid pattern. This grid pattern, when viewed from a few feet away, optically mixes the two colors to create a moderately-saturated red color. Data display windows 106 allow for recording the numerical indices of the two component colors for entry in an "optical-mixing" database. Such databases can be compiled and provided by manufacturers of fixed coloring materials to promote use of their products by artists and hobbyists who look to computers as an aid in designing their compositions and projects.

CONCLUSIONS, RAMIFICATIONS, AND SCOPE

Accordingly, the reader will see that whereas many previous color systems have used "just noticeable difference" as the criteria for assembling color assortments, resulting in unduly large numbers of color elements, my artists' color system discloses the means for selecting and organizing a moderately-sized assortment of color elements which exhibit "significantly noticeable difference."

By defining active and inactive color areas, the system is able to represent the visible spectrum with a relatively small number of color elements. Since any desired color may be achieved through skillful mixing, a balance is struck between having too few, and having too many color elements. The advantage to the artist is that the collection is manageable and accessible, yet comprehensive enough for her to be able to quickly close in on a target color by having colors already very near to it to mix with.

Furthermore, unlike other color systems which impose a rigid, uniformly-stepped sampling and organization in each general hue sector of the visible spectrum, the present system allows the sampling and placement of color elements within its color families to be flexibly determined by, and tailored to, the characteristics of each particular hue.

Another distinct advantage of the present system over prior art color systems is its segmentation of the spectrum, which clearly differentiates each color family from its immediate neighbor, and defines within each color family (except for the neutral core) a prescribed range of hue. The artist is thus afforded the order and simplicity of a manageable number of color families, and at the same time a useful and distinguishable variety of hue choices within each grouping.

Ease of use is also afforded to the artist by the present system's correspondence to the painter's triangle, a basic hue arrangement that is typically introduced at the grade school level of arts education. This figure, well known for its simplicity in diagramming the mixing relationships (primaries, complementary colors, etc.) of pigments, is ignored by other color systems.

In computer color selection, the division of the present system's segmented concordance with the painter's triangle is a significant improvement over the contiguous RGB-based color circles and arrays typical of computer color pickers, in that the positions and relative proportions of each general hue sector are more accurately related to artists' pigments. Thus the present color system presents an effective interface between traditional coloring materials and digital technology.

Finally, the variant-hue charts of the present system display individual color elements positioned in patterns which accentuate the contrasts within each color family's discrete hue range. Thus the artist is aided in actually seeing more hue difference within each color family, and helped to make faster, more reliable color judgements and choices.

Although the description above contains many specificities, these should not be construed as limiting the scope of the invention but as merely providing illustrations of some of its presently preferred embodiments. Many variations and ramifications are possible. For example, the system's number of color elements can be increased into a larger (or reduced into a more compact) collection of color elements organized along the same principles as described above; the general hue sectors and total number of color families may be adapted to correspond to, or reorganize, an existing color system; the colors organized are not limited to traditional artists' coloring materials, colors of computer palettes, color pickers, and other digitally or electronically displayed color devices or programs, but may also include commercial printing inks, fabric dyes, various consumer and professional coloring products and services, as well as home, business, architectural, and industrial coloring materials, coatings, etc. Also, the preferred format of the variant-hue charts need not be restricted to a matrix pattern of adjacent, contiguous squares or rectangles, but may instead comprise other geometric shapes (octagons, hexagons, circles, etc.) arranged in matrix patterns such that the shapes are spaced closely together within a predetermined distance, instead of touching each other. Additionally, the placement of such shapes need not be limited to a perpendicular grid array, but may be arranged in oblique rows and columns so that the same patterned relationship which prescribes that "adjacent" color elements have different hues occurs along oblique lines rather than perpendicularly. Regarding the color pickers set forth above, their size and configuration as well as the size and configuration of their associated color diagrams may vary in accordance with the computer application or operating system in which they are implemented, or the existing color system they are adapted to; furthermore, their operations may be accomplished by interfaces other than those described (i.e., commands may be issued by means of pull-down menus, alternatively-assigned keyboard combinations, etc.). One skilled in the art will be able to practice variations in the system described which fall within the teachings of this invention.

Thus the scope of the invention should be determined by the appended claims and their legal equivalents, rather than by the examples given.

What is claimed is:

1. A method for choosing on-screen color elements in a computer system, comprising:
    (a) providing a color selection arrangement which includes a plurality of color-family selection means, each of said color-family selection means respectively referencing one of a plurality of color family groups, each of said color family groups respectively referencing a plurality of ranges of hue, said ranges of hue each being of sufficient size to encompass a plurality of distinguishable hues of approximately a single general hue sector, but substantially no larger than two general hue sectors, of the general hue sectors of the visible spectrum from the group consisting of red, red-orange, orange, yellow-orange, yellow, yellow-green, green, blue-green, blue, blue-violet, violet, and red-violet,
    (b) providing an interface including said plurality of color-family selection means for enabling a user to choose one or more of said color family groups and cause to be respectively displayed by color display means on a computer screen one or more of a plurality of color-element selection palettes, each of said color-element selection palettes containing an arrangement of color elements respectively representing said range of hue of one of said chosen color-family groups, and
    (c) providing each of said chosen color-element selection palettes as an interface for enabling a user to choose a color for use from among said arrangement of color elements,
    (d) configuring said color-family selection means in a plurality of relative positions substantially corresponding to an arrangement of said general hue sectors on a color diagram, said color diagram distributing said general hue sectors in a circuit sequenced in the order of the visible spectrum, said color diagram having a shape selected from the group consisting of circles, ellipses, hexagons, octagons, decagons, trapezoids, triangles, rectangles, and squares, and
    (e) including a plurality of color-diagram selection means, said color-diagram selection means providing an interface for determining said color diagram to which said relative positions of said color-family selection means correspond,
        whereby a user can quickly choose any of said color diagrams as a preferred interface for color-family display, and subsequent color element selection.

2. A configuration of colors presented by color display means, comprising:
    (a) a plurality of arrangements of a plurality of color elements respectively selected from a plurality of sets of constant-hue charts,
    (b) each of said sets of constant-hue charts being respectively derived from and representing colorant samplings of a plurality of distinguishably different hues,
    (c) each of said distinguishably different hues selected from a plurality of prescribed ranges of hue,
    (d) each of said prescribed ranges of hue being a component of an array sequenced in the order of the visible spectrum,
    (e) said prescribed ranges of hue each being of sufficient size to encompass a plurality of distinguishable hues of approximately a single general hue sector, but substantially no larger than two general hue sectors, of the general hue sectors of the visible spectrum from the group consisting of red, red-orange, orange, yellow-orange, yellow, yellow-green, green, blue-green, blue, blue-violet, violet, and red-violet,
    (f) each of said arrangements of said plurality of color elements respectively organized in accordance with one of a plurality of sets of consolidation patterns into a single configuration,
    (g) said single configuration defined as a variant-hue chart, each of said variant-hue charts respectively representing one of a plurality of color families, and
    (h) means for displaying one or more of said variant-hue charts independently so that a plurality of said variant-hue charts may be stacked or overlapped,
        whereby any variant-hue chart, respectively representing a color family as a patterned assortment of color elements of a prescribed range of hue, arranged so that all three attributes of color, that is value, saturation, and hue, are organized and displayed in a single configuration, may be positioned adjacent to or overlapping another variant-hue chart, thus allowing a user to more closely and accurately compare and select displayed colors.

3. The configuration of claim 2 wherein each of said variant-hue charts, organized in accordance with one of said sets of consolidation patterns, prescribe each of said color elements, located either horizontally, vertically, or otherwise perpendicularly adjacent to another color element, to be a hue that is distinguishably different from the hue of any such adjacent color element,
    whereby each variant-hue chart enhances color comparison and selection by prescribing contrasting hues in adjacent color elements.

4. The configuration of claim 2, further including:
    (a) a color selection arrangement providing a plurality of color-family selection means,
    (b) said color-family selection means providing an interface by which a user can choose and cause to be respectively displayed on a computer screen one or more of a plurality of color family groups independently,
    (c) said color family groups each respectively consisting of at least one of said variant-hue charts containing said color elements corresponding to one of said color families, and
    (d) said color family groups providing an interface means by which a user can choose from among said color elements,
        whereby a user can cause color elements of one or more of said color families to be independently and simultaneously displayed on a computer screen by respectively actuating one or more of said color-family selection means, and is then able to overlap, and thus more easily and accurately compare color ranges when choosing a color for use.

5. The configuration of claim 4 wherein said color-family selection means are respectively presented in a circuit of relative positions corresponding to a prescribed arrangement of said general hue sectors on a color diagram, said general hue sectors organized in an array sequenced in the order of the visible spectrum, whereby such representation of traditional hue positions in a diagrammed circuit provides an interface which allows a user to select and display, by means of familiar spatial orientation, corresponding color family groups quickly and intuitively.

6. The configuration of claim 2, further including:

(a) a color selection arrangement presented by color display means on a computer screen of a plurality of color family groups, each of said color family groups respectively containing said color elements organized according to at least one of said variant-hue charts of one of said color families, (b) each of said color family groups referencing said color elements of said sets of constant-hue charts respective to said variant-hue charts of said color family, (c) each of said variant-hue charts providing an interface by which a user can choose from among said color elements organized and displayed therein, and (d) said interface also providing means by which selecting one of said color elements in a prescribed manner causes said color elements positioned in the same respective location in said set of constant-hue charts respective to said variant-hue chart to be displayed and selectable, whereby a user is able to display and choose color elements of hues belonging to a color family's prescribed hue range, but not currently displayed by said variant-hue charts, by selecting an individual color element in said color family group in a prescribed manner.

7. The configuration of claim 2 wherein said prescribed ranges of hue are each segmented from its neighbor by interposing an excluded-hue sector between them, whereby the interposition of excluded-hue sectors between prescribed ranges of hue makes it easier for a user to more clearly differentiate each color-family from its neighbor.

8. A method for choosing on-screen color elements in a computer system, comprising:

(a) providing a color selection arrangement which includes a plurality of color-family selection means, each of said color-family selection means respectively referencing one of a plurality of color family groups of a color assortment, and (b) providing an interface means for actuating said plurality of color-family selection means in such a way as to enable a user to choose a plurality of said color family groups and cause said chosen groups to be respectively, independently, and simultaneously displayed, each in its own individual color-element selection palette, (c) configuring said color-family selection means in a plurality of relative hue positions substantially corresponding to an arrangement of said general hue sectors on a color diagram, said color diagram distributing said general hue sectors in a circuit sequenced in the order of the visible spectrum, and (d) including a plurality of color-diagram selection means, said color-diagram selection means providing an interface for determining the type of said color diagram to which said relative hue positions of said color-family selection means correspond, whereby a user can quickly choose any of said color diagrams as a preferred interface for color-family selection and display.

\* \* \* \* \*